United States Patent [19]

Furui et al.

[11] Patent Number: 5,293,489
[45] Date of Patent: Mar. 8, 1994

[54] CIRCUIT ARRANGEMENT CAPABLE OF CENTRALIZING CONTROL OF A SWITCHING NETWORK

[75] Inventors: Toshiyuki Furui; Naoto Kaji; Gizo Kadaira; Kouji Kinoshita, all of Tokyo, Japan

[73] Assignee: NEC Corporation, Tokyo, Japan

[21] Appl. No.: 60,719

[22] Filed: May 13, 1993

Related U.S. Application Data

[63] Continuation of Ser. No. 829,622, Jan. 31, 1992, abandoned, which is a continuation of Ser. No. 393,843, Aug. 7, 1989, abandoned, which is a continuation of Ser. No. 822,196, Jan. 24, 1986, abandoned.

[30] Foreign Application Priority Data

| Jan. 24, 1985 | [JP] | Japan | 60-11564 |
| Jan. 24, 1985 | [JP] | Japan | 60-11565 |
| Jan. 30, 1985 | [JP] | Japan | 60-17628 |
| Jan. 30, 1985 | [JP] | Japan | 60-17629 |
| May 22, 1985 | [JP] | Japan | 60-109715 |
| May 22, 1985 | [JP] | Japan | 60-109716 |

[51] Int. Cl.$^5$ .............................................. G06F 13/00
[52] U.S. Cl. ............................... 395/200; 364/DIG. 1; 364/238.1
[58] Field of Search ............... 364/DIG. 1, DIG. 2; 395/200, 275, 325, 425, 800; 370/23, 29, 53, 112, 58.1, 58.2, 58.3, 59, 60, 85.1, 85.2, 85.3, 85.4, 85.5, 85.6, 85.7, 85.8, 85.9, 85.11, 85.12, 85.13, 85.14, 85.15; 380/4; 340/825, 825.01, 825.02, 825.03, 826, 827, 825.04

[56] References Cited

U.S. PATENT DOCUMENTS

| 3,428,946 | 2/1969 | Batcher | 370/60 |
| 3,781,819 | 12/1973 | Geng et al. | |
| 3,916,380 | 10/1975 | Fletcher et al. | 340/147 |
| 4,245,325 | 1/1981 | Kikuchi et al. | 370/23 |
| 4,365,292 | 12/1982 | Barnes et al. | 364/200 |
| 4,365,328 | 12/1982 | Merriaux et al. | 370/60 |
| 4,397,016 | 8/1983 | Broussaud | 370/58 |
| 4,425,640 | 1/1984 | Philip et al. | 370/58 |
| 4,484,262 | 11/1984 | Sullivan et al. | 364/200 |
| 4,488,288 | 12/1984 | Turner | 370/60 |
| 4,531,209 | 7/1985 | Knauer | 370/58 |
| 4,542,497 | 9/1985 | Huang et al. | 370/80 |
| 4,598,170 | 7/1986 | Piosenka et al. | 380/4 |
| 4,627,048 | 12/1986 | Larson | 370/60 |
| 4,731,724 | 3/1988 | Michel et al. | 364/200 |

FOREIGN PATENT DOCUMENTS

| 56-61892 | 5/1981 | Japan . |
| 57-43256 | 3/1982 | Japan . |
| 59-206960 | 11/1984 | Japan . |

OTHER PUBLICATIONS

Lawrie, D. H. "Access and alignment of data in an array processor", IEEE Transactions on Computer, vol. C-24, No. 12, Dec. 1975, pp. 1145-1155.

Primary Examiner—Robert B. Harrell
Attorney, Agent, or Firm—Foley & Lardner

[57] ABSTRACT

In a circuit arrangement for use in accessing selected address numbered with a preselected distance left between two adjacent ones of the selected addresses, a control circuit centralizes control operation of a switching network with reference to a reference one of the selected addresses and the preselected distance to make the switching network form internal paths between input and output port sets of the switching network. Alternatively, when ports of a selected one of the input and output port sets are accessed at a predetermined port interval, the control circuit controls the switching network with reference to the predetermined port interval and a reference port selected from the selected port set. A leading port of the other set is determined to be connected to the reference port. A rearranging circuit may be connected to one of the input and output port sets to rearrange an order of the ports of the one port set in consideration of the port distance. The reference and leading ports may be varied in a time division fashion when a conflict of internal paths otherwise occurs in relation to the port distance.

21 Claims, 39 Drawing Sheets

GI = (11)$_2$

| 52-1 | 52-2 | 52-3 | 52-4 | 52-5 | 52-6 | 52-7 | 52-8 |
|------|------|------|------|------|------|------|------|
| 0 | 1 | 2 | 3 | 4 | 5 | 6 | 7 |
| 8 | 9 | 10 | 11 | 12 | 13 | 14 | 15 |
| 16 | 17 | 18 | 19 | 20 | 21 | 22 | 23 |
| ⋮ | ⋮ | ⋮ | ⋮ | ⋮ | ⋮ | ⋮ | ⋮ |

| 52-1 | 52-2 | 52-3 | 52-4 | 52-5 | 52-6 | 52-7 | 52-8 |
|------|------|------|------|------|------|------|------|
| 0 | 1 | 2 | 3 | - | - | - | - |
| 4 | 5 | 6 | 7 | - | - | - | - |
| 8 | 9 | 10 | 11 | - | - | - | - |
| ⋮ | ⋮ | ⋮ | ⋮ | | | | |

| 52-1 | 52-2 | 52-3 | 52-4 | 52-5 | 52-6 | 52-7 | 52-8 |
|------|------|------|------|------|------|------|------|
| - | - | - | - | 0 | 1 | 2 | 3 |
| - | - | - | - | 4 | 5 | 6 | 7 |
| - | - | - | - | 8 | 9 | 10 | 11 |
| | | | | ⋮ | ⋮ | ⋮ | ⋮ |

FIG.2(C)

| $S_i$ | OP-{(i-1)x2+1} | OP-{(i-1)x2+2} |
|---|---|---|
| 0 | I-{(i-1)x2+1} | I-{(i-1)x2+2} |
| 1 | I-{(i-1)x2+2} | I-{(i-1)x2+1} |

| $S_i$ | OP-{(i-5)x2+9} | OP-{(i-5)x2+10} |
|---|---|---|
| 0 | OP-{(i-5)x4+1} | OP-{(i-5)x4+3} |
| 1 | OP-{(i-5)x4+3} | OP-{(i-5)x4+1} |

| $S_i$ | OP-{(i-5)x2+9} | OP-{(i-5)x2+10} |
|---|---|---|
| 0 | OP-{(i-7)x4+2} | OP-{(i-7)x4+4} |
| 1 | OP-{(i-7)x4+4} | OP-{(i-7)x4+2} |

| $S_i$ | O-{i-8} | O-{i-4} |
|---|---|---|
| 0 | OP-{(i-9)x4+9} | OP-{(i-9)x4+11} |
| 1 | OP-{(i-9)x4+11} | OP-{(i-9)x4+9} |

| $S_i$ | O-{i-8} | O-{i-4} |
|---|---|---|
| 0 | OP-{(i-9)x4+2} | OP-{(i-9)x4+4} |
| 1 | OP-{(i-9)x4+4} | OP-{(i-9)x4+2} |

| DECODED SIGNALS | $cj_0$ | $cj_1$ | $cj_2$ | $cj_3$ | $cj_4$ | $cj_5$ | $cj_6$ | $cj_7$ | $cj_8$ | $cj_9$ | $cj_{10}$ |
|---|---|---|---|---|---|---|---|---|---|---|---|
| 1st DECODER (j=0) | 1 | 0 | / | / | / | / | / | / | / | / | / |
| 2nd DECODER (j=1) | $d_1$ | 1 | $\overline{d_1}$ | 0 | $d_1$ | / | / | / | / | / | / |
| 3rd DECODER (j=2) | $d_0$ | $d_1$ | $d_0$ | 1 | $\overline{d_0}$ | $\overline{d_1}$ | $\overline{d_0}$ | 0 | $d_0$ | $d_1$ | $d_0$ |

FIG.6

| $d_0 d_1 d_2$ | $(C0_0 C0_1)_2$ |
|---|---|
| $(0)_{10}$ | $(10)_2$ |
| $(1)_{10}$ | $(10)_2$ |
| $(2)_{10}$ | $(10)_2$ |
| $(3)_{10}$ | $(10)_2$ |
| $(4)_{10}$ | $(10)_2$ |
| $(5)_{10}$ | $(10)_2$ |
| $(6)_{10}$ | $(10)_2$ |
| $(7)_{10}$ | $(10)_2$ |

FIG.7(A)

| $d_0 d_1 d_2$ | $(C1_0 \ldots C1_4)_2$ |
|---|---|
| $(0)_{10}$ | $(01100)_2$ |
| $(1)_{10}$ | $(01100)_2$ |
| $(2)_{10}$ | $(11001)_2$ |
| $(3)_{10}$ | $(11001)_2$ |
| $(4)_{10}$ | $(01100)_2$ |
| $(5)_{10}$ | $(01100)_2$ |
| $(6)_{10}$ | $(11001)_2$ |
| $(7)_{10}$ | $(11001)_2$ |

FIG.7(B)

| $d_0 d_1 d_2$ | $(C2_0 \ldots C2_{10})_2$ |
|---|---|
| $(0)_{10}$ | $(00011110000)_2$ |
| $(1)_{10}$ | $(00011110000)_2$ |
| $(2)_{10}$ | $(01011010010)_2$ |
| $(3)_{10}$ | $(01011010010)_2$ |
| $(4)_{10}$ | $(10110100101)_2$ |
| $(5)_{10}$ | $(10110100101)_2$ |
| $(6)_{10}$ | $(11110000111)_2$ |
| $(7)_{10}$ | $(11110000111)_2$ |

FIG.7(C)

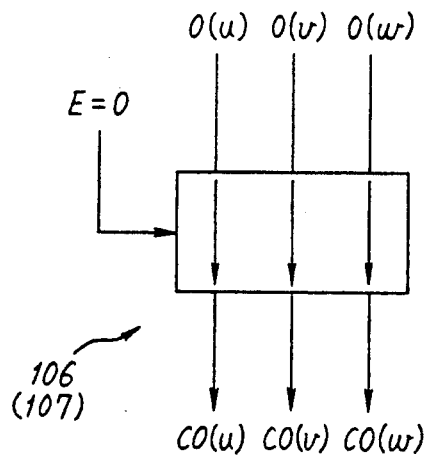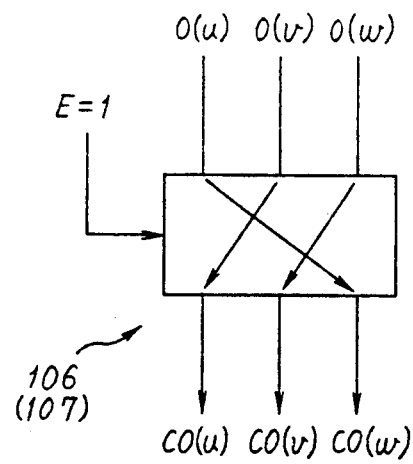
FIG.17(A)    FIG.17(B)
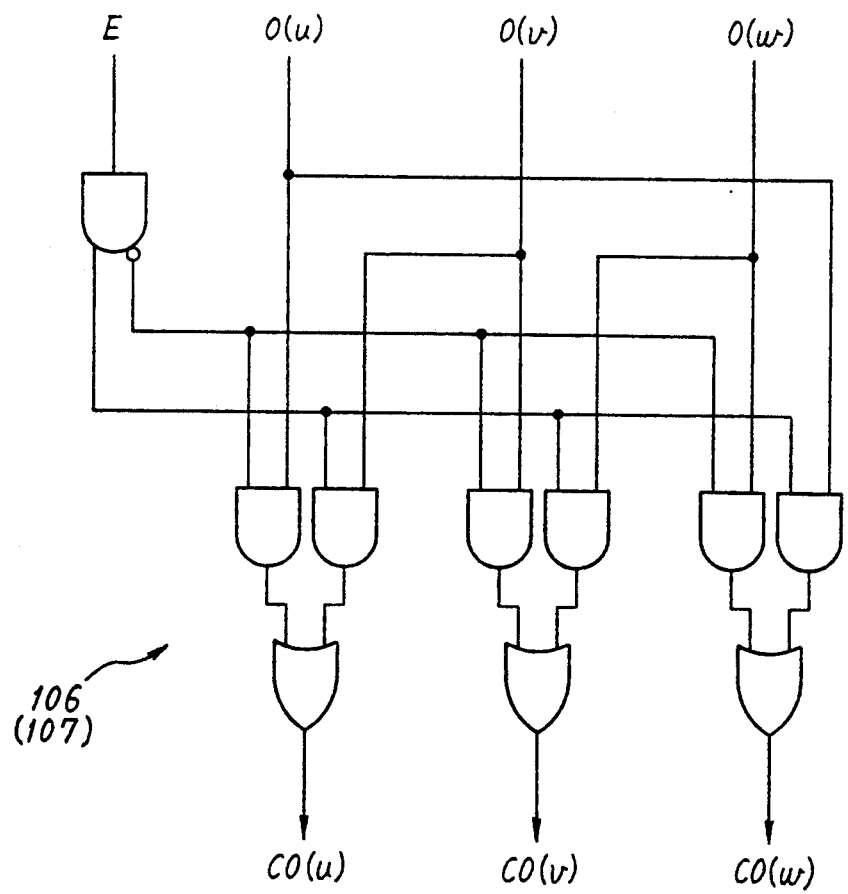
FIG.18

| $d_0d_1d_2$ | 0 | 1 | 2 | 3 | 4 | 5 | 6 | 7 |
|---|---|---|---|---|---|---|---|---|
| E | 0 | 0 | 1 | 0 | 0 | 0 | 1 | 0 |

FIG.19(A)

| E | 0 | | 1 | |
|---|---|---|---|---|
| $b_1$ | | | 0 | 1 |
| $b_2$ | 0 | 1 | | |
| $s_1$–$s_4$ | 0 | 1 | 0 | 1 |

FIG.19(B)

| E | 0 | | | | 1 | | | |
|---|---|---|---|---|---|---|---|---|
| $b_0b_1$ | | | | | 0 | 1 | 2 | 3 |
| $b_1b_2$ | 0 | 1 | 2 | 3 | | | | |
| $s_5=s_6$ | 0 | $\overline{d_1}$ | 1 | $d_1$ | 0 | $\overline{d_0}$ | 1 | $d_0$ |
| $s_7=s_8$ | $d_1$ | 0 | $\overline{d_1}$ | 1 | $d_0$ | 0 | $\overline{d_0}$ | 1 |

FIG.19(C)

| E | 0 | | | | | | | | 1 |
|---|---|---|---|---|---|---|---|---|---|
| $b_0b_1b_2$ | 0 | 1 | 2 | 3 | 4 | 5 | 6 | 7 | |
| $s_9$ | 0 | $\overline{d_0}$ | $\overline{d_1}$ | $\overline{d_0}$ | 1 | $d_0$ | $d_1$ | $d_0$ | $b_2$ |
| $s_{10}$ | $d_0$ | 0 | $\overline{d_0}$ | $\overline{d_1}$ | $\overline{d_0}$ | 1 | $d_0$ | $d_1$ | $b_2$ |
| $s_{11}$ | $d_1$ | $d_0$ | 0 | $\overline{d_0}$ | $\overline{d_1}$ | $\overline{d_0}$ | 1 | $d_0$ | $b_2$ |
| $s_{12}$ | $d_0$ | $d_1$ | $d_0$ | 0 | $\overline{d_0}$ | $\overline{d_1}$ | $\overline{d_0}$ | 1 | $b_2$ |

FIG.19(D)

| $d_0 d_1 d_2$ | 0 | 1 | 2 | 3 | 4 | 5 | 6 | 7 |
|---|---|---|---|---|---|---|---|---|
| E | 0 | 0 | 1 | 0 | 0 | 0 | 1 | 0 |

FIG.24(A)

| E | 0 | | | | | | | | 1 |
|---|---|---|---|---|---|---|---|---|---|
| $b_0 b_1 b_2$ | 0 | 1 | 2 | 3 | 4 | 5 | 6 | 7 | |
| $S_1$ | 0 | $\overline{d_0}$ | $\overline{d_1}$ | $\overline{d_0}$ | 1 | $d_0$ | $d_1$ | $d_0$ | $b_2$ |
| $S_2$ | $d_0$ | 0 | $\overline{d_0}$ | $\overline{d_1}$ | $\overline{d_0}$ | 1 | $d_0$ | $d_1$ | $b_2$ |
| $S_3$ | $d_1$ | $d_0$ | 0 | $\overline{d_0}$ | $\overline{d_1}$ | $\overline{d_0}$ | 1 | $d_0$ | $b_2$ |
| $S_4$ | $d_0$ | $d_1$ | $d_0$ | 0 | $\overline{d_0}$ | $\overline{d_1}$ | $\overline{d_0}$ | 1 | $b_2$ |

FIG.24(B)

| E | 0 | | | | 1 | | | |
|---|---|---|---|---|---|---|---|---|
| $b_0 b_1$ | | | | | 0 | 1 | 2 | 3 |
| $b_1 b_2$ | 0 | 1 | 2 | 3 | | | | |
| $S_5 = S_6$ | 0 | $\overline{d_1}$ | 1 | $d_1$ | 0 | $\overline{d_0}$ | 1 | $d_0$ |
| $S_7 = S_8$ | $d_1$ | 0 | $\overline{d_1}$ | 1 | $d_0$ | 0 | $\overline{d_0}$ | 1 |

FIG.24(C)

| E | 0 | | 1 | |
|---|---|---|---|---|
| $b_1$ | | | 0 | 1 |
| $b_2$ | 0 | 1 | | |
| $S_9 - S_{12}$ | 0 | 1 | 0 | 1 |

FIG.24(D)

| 1st CONDITION SIGNAL (CS$_1$) | 2nd CONDITION SIGNAL (CS$_2$) | S$_9$ | S$_{10}$ | S$_{11}$ | S$_{12}$ |
|---|---|---|---|---|---|
| 1   1 | - | h$_0$ | h$_1$ | h$_2$ | h$_3$ |
| 1   0 | 0 | h$_0$ | h$_1$ | h$_2$ | h$_3$ |
|  | 1 | $\overline{h_0}$ | $\overline{h_1}$ | $\overline{h_2}$ | $\overline{h_3}$ |
| 0   1 | 0 | $\overline{h_0}$ | $\overline{h_1}$ | $\overline{h_2}$ | $\overline{h_3}$ |
|  | 1 | h$_0$ | h$_1$ | h$_2$ | h$_3$ |

FIG. 29

CIRCUIT ARRANGEMENT CAPABLE OF CENTRALIZING CONTROL OF A SWITCHING NETWORK

This application is a continuation of application Ser. No. 07/829,622, filed Jan. 31, 1992, which is a continuation of application Ser. No. 07/393,843, filed Aug. 7, 1989, which is a continuation of parent application Ser. No. 06/822,196, filed Jan. 24, 1986, all now abandoned.

BACKGROUND OF THE INVENTION

This invention relates to a circuit arrangement for use in distributing a plurality of input signals to a plurality of memory addresses, a plurality of array processors, or the like.

Various attempts have been made to connect a plurality of transmission ends to a plurality of reception ends. In an information processing system comprising a central processing unit and a memory, a plurality of memory addresses of the memory are often accessed by the central processing unit so as to distribute a plurality of parallel data signals, such as vector data signals, from the central processing unit to the memory.

A similar operation is also carried out in a data processing system comprising a plurality of processing array elements and a control computer for controlling all of the processing array elements. Specifically, a plurality of transmission signals may be transmitted in parallel from the control computer to selected ones of the processing array elements.

Under the circumstances, a circuit arrangement or switching network must be placed between the transmission and the reception ends, such as the central processing unit, the memory, the control computer, the array elements, to form a connection path or paths therebetween.

In an article contributed by D. H. Lawrie to IEEE Transactions on Computers, Vol. C-24, No. 12 (December 1975), pages 1145-1155, and titled "Access and Alignment of Data in an Array Processor," a switching network is described which comprises a plurality of consecutively numbered input ports connected to the transmission ends, a plurality of consecutively numbered output ports connected to the reception ends, and a plurality of switching elements between the input and the output ports. The switching elements are divided into a plurality of stages which are interconnected in a perfect shuffle connection manner. With this structure, each input port can selectively be connected to all of the output ports through internal paths.

In order to selectively form the internal paths in the switching network, an input port number and an output port number are indicated by the transmission end to control the switching network each time when each input signal is transmitted from the transmission end to destined reception end or ends. In this event, each of the switching elements in question must calculate the input port number and the output port number in accordance with a predetermined algorithm to select a following one of the internal paths. Such operation is successively carried out in each stage for connection between input and output port indicated by the input and the output port numbers. In addition, each switching element must detect or monitor whether or not a conflict of the internal paths occurs on selection of the internal paths. This means that a complex control circuit is indispensable to every one of the switching elements included in the switching network. This results in an increase of hardware in the switching network.

Thus, control operation is decentralized or distributed to the respective switching elements. The decentralization of control operation may reduce performance of the switching network when a plurality of input signals must simultaneously be distributed to the corresponding output ports, as are the cases with the vector data signals.

SUMMARY OF THE INVENTION

It is an object of this invention to provide a circuit arrangement which can reduce an amount of hardware necessary therefor.

It is another object of this invention to provide a circuit arrangement of the type described, which can dispense with complex switching elements.

It is still another object of this invention to provide a circuit arrangement of the type described, which is suitable for simultaneous distribution of a plurality of parallel input signals, such as vector data signals.

It is yet another object of this invention to provide a circuit arrangement of the type described, which can rapidly distribute the parallel input signals to destined output ports.

A circuit arrangement to which this invention is applicable is for use in combination with a plurality of units each of which is assigned with at least one of addresses consecutively numbered among the units and is for accessing a selected ones of the addresses at a preselected distance with reference to a reference one of the addresses. The circuit arrangement comprises a control circuit for producing a group of control signals in consideration of the preselected distance and the reference address and path setting circuit coupled to the control circuit for setting up internal paths to access the selected ones of the addresses.

According to an aspect of this invention, there is provided a circuit arrangement comprising a switching network which has a set of consecutively numbered input ports and a set of consecutively numbered output ports each of which is connectible to every one of the input ports through internal paths formed in the switching network. The ports of a selected one of the input and the output port sets include a reference port and are connected from the reference port at a predetermined port interval to the ports of the other set which are arranged in numerical order. The arrangement comprises a control circuit coupled to the switching network for delivering a group of control signals to the switching network with reference to the reference port and the predetermined port interval to make the switching network connect the ports of the selected set to the ports of the other set from the reference port at the predetermined port interval.

BRIEF DESCRIPTION OF THE DRAWING

FIGS. 2(A), 2(B) and 2(C) shows a chart for use in describing an address allocation of the memory illustrated in FIG. 1;

FIGS. 3(A), 3(B), 3(C), 3(D), and 3(E), show charts for use in describing operation of the circuit arrangement illustrated in FIG. 1;

FIG. 6 is a chart for use in describing control signals produced by the control circuit;

FIGS. 7(A), 7(B) and 7(C), are charts for use in describing the control signals more in detail;

FIGS. 17(A) and (B) are block diagrams for use in describing operation of a circuit element of the circuit arrangement illustrated in FIG. 16;

FIG. 18 is a circuit diagram of the circuit element illustrated in FIG. 17;

FIGS. 19(A), 19(B), 19(C) and (D) are charts for use in describing operation of the circuit arrangement illustrated in FIG. 16;

FIGS. 24(A), 24(B), 24(C) and 24(D) overcharts for use in describing control signals produced in a control circuit of the circuit arrangement illustrated in FIG. 23;

FIG. 29 is a chart for use in describing operation of a part of the control circuit illustrated in FIG. 28;

DESCRIPTION OF THE PREFERRED EMBODIMENTS

Figure 1:
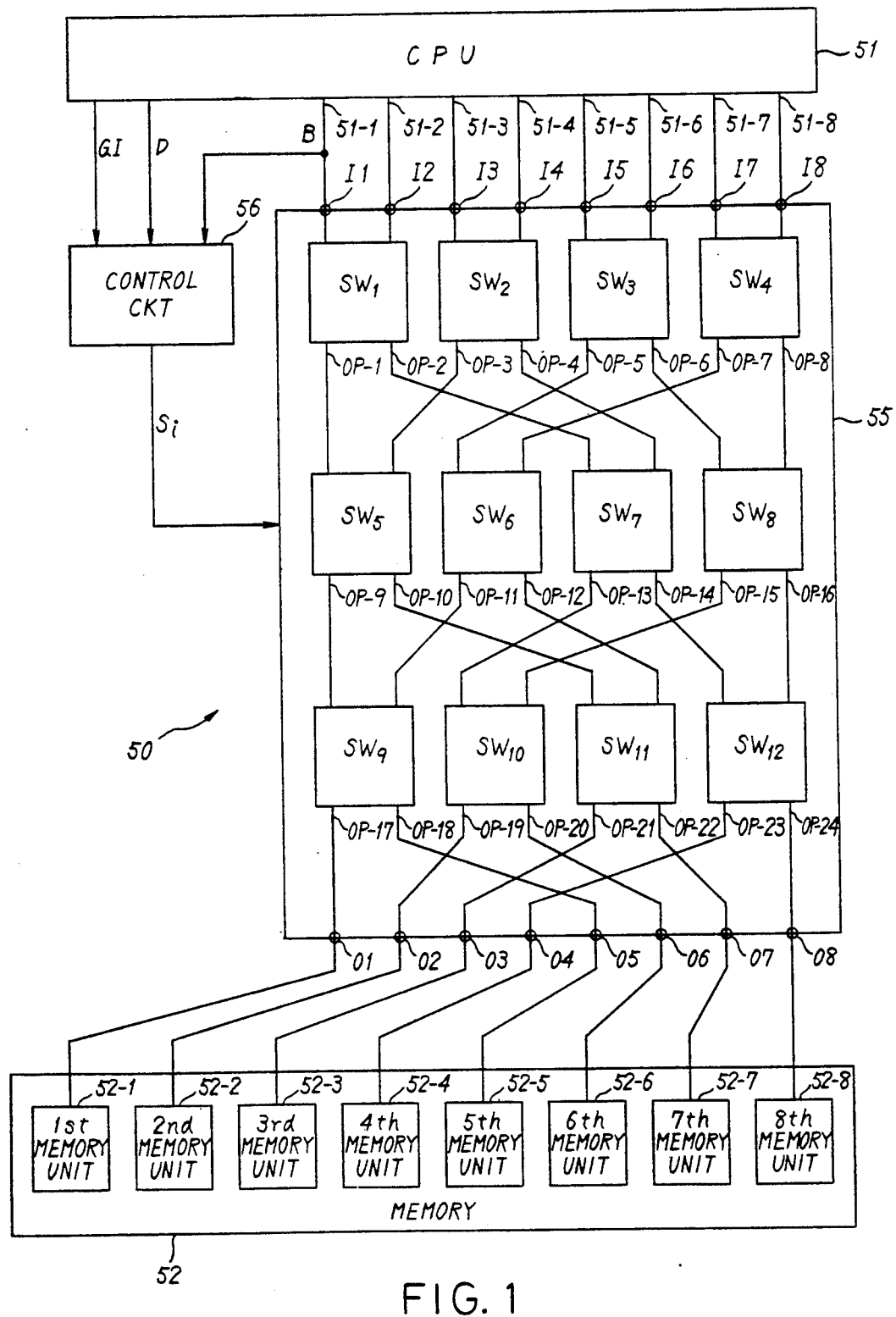
FIG. 1 shows a block diagram of a circuit arrangement according to a first embodiment of this invention together with a central processing unit and a memory.

Referring to FIG. 1, a circuit arrangement 50 according to a first embodiment of this invention is interposed between a central processing unit 51 and a memory 52. In the example being illustrated, it is assumed that the central processing unit 51 delivers a plurality of parallel data signals, such as vector signals, to the memory 52 through the circuit arrangement 50. The parallel data signals are to be stored in those addresses of the memory 52 which are specified by address signals included in the parallel data signals, respectively.

As to the vector signals, a leading one B of the addresses is indicated to store a leading one of the vector signals. The remaining vector signals are successively stored in the memory 52 from the leading address at a predetermined address distance. Thus, it is possible to store the vector signals in the memory 52 by indicating the leading address B and the address distance.

The illustrated memory 52 has first through eighth memory units 52-1 to 52-8 which are classified into a first group of the first through fourth memory units 52-1 to 52-4 and a second group of the fifth through eighth memory units 52-5 to 52-8. The first and second groups are selectively put into an accessible state. For this purpose, the central processing unit 51 produces a group indication signal GI of two bits representative of accessible group or groups of the memory units. In other words, the group indication signal GI is indicative of structure or formation of the memory 52 and may be called a structure signal. Anyway, the group indication signal GI is specified by a binary representation of $(11)_2$, namely, a decimal notation of $(2)_{10}$ when both the first and second groups are accessible. When only the first group is accessible and the second group is not accessible, two bits of the group indication signal GI take $(10)_2$. Likewise, the group indication signal GI is represented by $(01)_2$ when the second group alone is accessible.

Referring to FIG. 2 together with FIG. 1, the allotment of addresses to the memory units 52-1 to 52-8 is varied with reference to the group indication signal GI. More particularly, when the group indication signal GI takes $(11)_2$ to put all of the memory units 52-1 to 52-8 into the accessible state, the first through eighth memory units are successively and recurrently assigned with address numbers in an ascending order from zero one by one, as illustrated in FIG. 2(A). As a result, each memory unit is assigned with integral multiples of eight as the address numbers.

When the group indication signal GI takes $(10)_2$ to put the first through fourth memory units 52-1 to 52-4 into the accessible state, the address numbers are allotted to the first through fourth memory units 52-1 to 52-4, as shown in FIG. 2(B). Consequently, each memory unit has integral multiples of four as the address numbers. Likewise, the fifth through eighth memory units 52-5 to 52-8 become accessible when the group indication signal GI takes $(01)_2$, as shown in FIG. 2(C), with the address numbers counted up by four for each memory unit.

On delivery of the vector signals, the central processing unit 51 illustrated in FIG. 1 can simultaneously access at maximum eight addresses placed at an invariable address number, namely, the predetermined address distance by the use of the address signals representative of the address numbers, as described before. An address distance signal D is produced by the central processing unit 51 to specify the address distance together with the group indication signal GI. Thus, the central processing unit 51 is operable to produce the address signals, the address distance signal D, and the group indication signal GI which can be produced in a usual manner in the central processing unit 51. However, they are not usually used for connections of the circuit arrangement 50.

In the example, the address distance D may usually be smaller than eight, as will become clear as the description proceeds, and can be specified by three lower bits $(d_0 d_1 d_2)_2$ which are successively arranged from the most significant bit $d_0$.

Without loss of generality, it may be presumed that first through eighth ones of the address signals are produced by the central processing unit 51 to specify first through eighth ones of the addresses for memorizing first through eighth vector signals or elements, respectively. The first address signal may be called the leading or beginning address signal B (the same reference letter being used) and is sent from the central processing unit 51 through a first line 51-1. The second through eighth address signals are sent through second through eighth lines 51-2 to 51-8, respectively.

Inasmuch as the first through eighth memory units 52-1 to 52-8 can be specified by three bits, each of the first through eighth address signals may be considered as a three-bit signal. For convenience of description, three bits of the first address signal B are represented by three bits $(b_0 b_1 b_2)_2$ successively arranged from the most significant bit $b_0$ to the least significant bit $b_2$.

In FIG. 1, the circuit arrangement 50 comprises a switching network 55 and a control circuit 56 for controlling the switching network 55 in cooperation with the central processing unit 51 in a manner to be described later. The switching network 55 has first through eighth input ports I1 to I8 connected to the first through eighth lines 51-1 to 51-8, respectively, and first through eighth output ports O1 to O8 connected to the first through eighth memory units 52-1 to 52-8. The switching network 55 comprises first through twelfth switch units which are depicted at $SW_1$ to $SW_{12}$ and which are divided into first through third stages. The first stage consists of the first through fourth switch units $SW_1$ to $SW_4$ while the second and the third switch units consist of the fifth through eighth switch units $SW_6$ to $SW_8$ and of the ninth through twelfth switch units $SW_9$ to $SW_{12}$, respectively.

The first through twelfth switch units $SW_1$ to $SW_{12}$ are connected to one another so that each input port can be connected to all of the output ports O1 to O8 through internal paths formed by the switch units. Such a connection is referred to in the art as a perfect shuffle connection.

More particularly, each switch unit SW (suffix omitted) has two input paths and two output paths (depicted at OP). The input paths of the first switch unit $SW_1$ are connected to the first and second input ports I1 and I2. Likewise, the input paths of the second through fourth switch units $SW_2$ to $SW_4$ are connected to the third through eighth input ports I3 to I8 in pairs.

The output paths of the first switch unit $SW_1$ are connected to the one input path of the fifth switch unit $SW_5$ on the one hand and to the one input path of the seventh switch unit $SW_7$ on the other hand. The output paths of the second switch unit $SW_2$ are connected to the other input path of the fifth switch unit $SW_5$ on the one hand and to the other input path of the seventh switch unit $SW_7$ on the other hand. The output paths of the third switch unit $SW_3$ are connected to the input paths of the sixth and the eighth switch units $SW_6$ and $SW_8$ in a similar manner. Likewise, the output paths of the fourth switch unit $SW_4$ are individually connected to the input paths of the sixth and the eighth switch units $SW_6$ and $SW_8$, respectively.

Interconnections between the fifth through eighth switch units $SW_5$ to $SW_8$ and the ninth through twelfth switch units $SW_9$ to $SW_{12}$ are similar to those between the first through fourth switch units $SW_1$ to $SW_4$ and the fifth through eighth switch units $SW_5$ to $SW_8$. Specifically, the output paths of the fifth and the sixth switch units $SW_5$ and $SW_6$ are connected to the ninth and the eleventh switch units $SW_9$ and $SW_{11}$ while the output paths of the seventh and the eighth switch units $SW_7$ and $SW_8$ are connected to the tenth and the twelfth switch units $SW_{10}$ and $SW_{12}$, as shown in FIG. 1.

In addition, the output paths of the ninth switch unit $SW_9$ are connected to the first output port O1 on the one hand and to the fifth output port O5 on the other hand. The output paths of the tenth switch unit $SW_{10}$ are connected to the second output port O2 on the one hand and to the sixth output port O6 on the other hand. Likewise, the output paths of the eleventh switch unit $SW_{11}$ are connected to the third and the seventh output ports O3 and O7, respectively. The output paths of the twelfth switch unit $SW_{12}$ are connected to the fourth and the eighth output ports O4 and O8, respectively.

The switching network 55 serves to set up internal paths between the input and the output ports I1 to I8 and O1 to O8 and may be referred to as a path setting circuit.

Referring to FIG. 3 in addition to FIG. 1, the first through twelfth switch units $SW_1$ to $SW_{12}$ are controlled by first through twelfth control signals $S_1$ to $S_{12}$, respectively, which are collectively shown at $S_i$ in FIG. 1. Each of the first through twelfth control signals $S_1$ to $S_{12}$ is a single bit signal and takes a logic "1" or a logic "0" level to connect each input path thereof to either one of the output paths in a manner shown in FIG. 3. In short, the two input paths are connected straightforwardly to the two output paths in each switch unit when the control signal $S_i$ takes the logic "0" level. The connection may be called a straight connection. On the other hand, the two input paths are exchanged by each switch unit to be connected crosswise or diagonally to the output paths when the control signal $S_i$ takes the logic "1" level. This connection may be called a crossed connection.

More particularly, each of the output path pairs OP-1 to OP-8 of the first through fourth switch units $SW_1$ to $SW_4$ can collectively be represented by OP-$\{(i-1)\times 2+1\}$ and OP-$\{(i-1)\times 2+2\}$, as shown in FIG. 3(A). The output path pairs are connected to the input ports which are collectively represented by I-$\{(i-1)\times 2+1\}$ and I-$\{(i-1)\times 2+2\}$ when the control signal $S_i$ takes the logic "0" level, where $i=1, 2, 3,$ or 4. Otherwise, each of the output path pairs is switched to I-$\{(i-1)\times 2+2\}$ and $\{(i-1)\times 2+1\}$.

Likewise, the output path pairs of the fifth and the sixth switch units $SW_5$ and $SW_6$ can be represented by OP-$\{(i-5)\times 2+9\}$ and OP-$\{(i-5)\times 2+10\}$ and are connected to the output paths represented by OP-$\{(i-5)\times 4+1\}$ and OP-$\{(i-5)\times 4+3\}$ when the control signal $S_i$ takes the logic "0" level, where i is equal to 5 or 6, as shown in FIG. 3(B). Otherwise, inner connections of the fifth and sixth switch units $SW_5$ and $SW_6$ are switched from one to another, as indicated at OP-$\{(i-5)\times 4+3\}$ and OP-$\{(i-5)\times 4+1\}$ in FIG. 3(B).

As illustrated in FIG. 3(C), the output path pairs of the seventh and the eighth switch units $SW_7$ and $SW_8$ can collectively be represented by OP-$\{(i-5)\times 2+9\}$ and OP-$\{(i-5)\times 2+10\}$, where i is equal to 7 or 8. When the control signal $S_i$ takes the logic "0" level, the above-mentioned output paths are connected to OP-$\{(i-7)\times 4+2\}$ and OP-$\{(i-7)\times 4+4\}$ and are otherwise switched to OP-$\{(i-7)\times 4+4\}$ and OP-$\{(i-7)\times 4+2\}$.

The output ports connected to the ninth and the tenth switch units $SW_9$ and $SW_{10}$ can be represented by O-$(i-8)$ and O-$(i-4)$ and are changeably connected to OP-$\{(i-9)\times 4+2\}$ and OP-$\{(i-9)\times 4+11\}$ in accordance with the control signal $S_i$, where i is equal to 9 or 10, as illustrated in FIG. 3(D).

Similarly, the output ports connected to the eleventh and twelfth switch units $SW_{11}$ and $SW_{12}$ can be represented by O-$(i-8)$ and O-$(i-4)$, where i is equal to 11 or 12, and are selectively connected to OP-$\{(i-9)\times 4+2\}$ and OP-$\{(i-9)\times 4+4\}$, as illustrated in FIG. 3(E).

Figure 4:
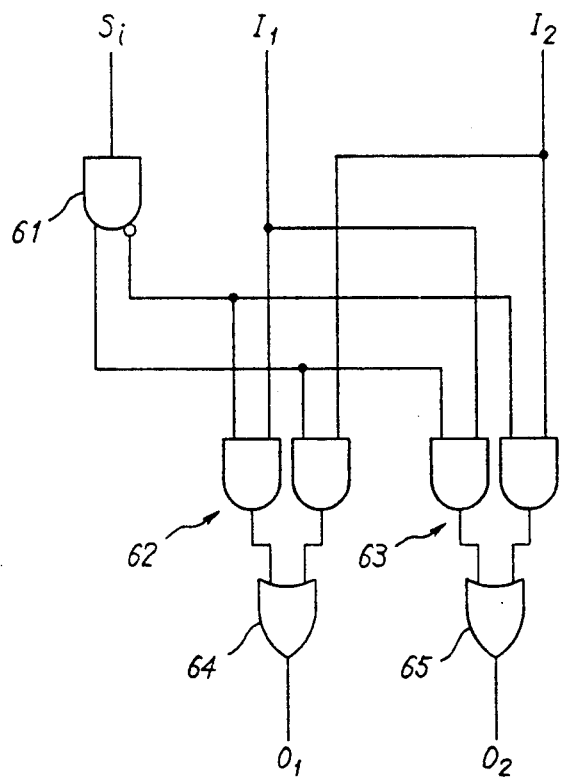
FIG. 4 shows a circuit diagram for use in describing a switch unit included in the circuit arrangement.

Referring to FIG. 4, each of the first through twelfth switch units $SW_1$ and $SW_{12}$ is supplied with first and second switch input signals $I_1$ and $I_2$ together with the control signal $S_i$ and produces first and second switch output signals $O_1$ and $O_2$. The illustrated switch unit comprises a control gate 61, two pairs 62 and 63 of AND gates, and two OR gates 64 and 65. As readily understood from FIG. 4, the first and second switch input signals $I_1$ and $I_2$ are produced as the first and second switch output signals $O_1$ and $O_2$, respectively, when the control signal $S_i$ takes the logic "0" level. Otherwise, the first and second switch input signals $I_1$ and $I_2$ are produced as the second and first switch output signals $O_2$ and $O_1$, respectively.

Thus, the switch unit carries out switching operation in response to the control signal $S_i$ and comprises no control circuit therein. Therefore, the illustrated switch circuit is very simple in structure.

Figure 5:
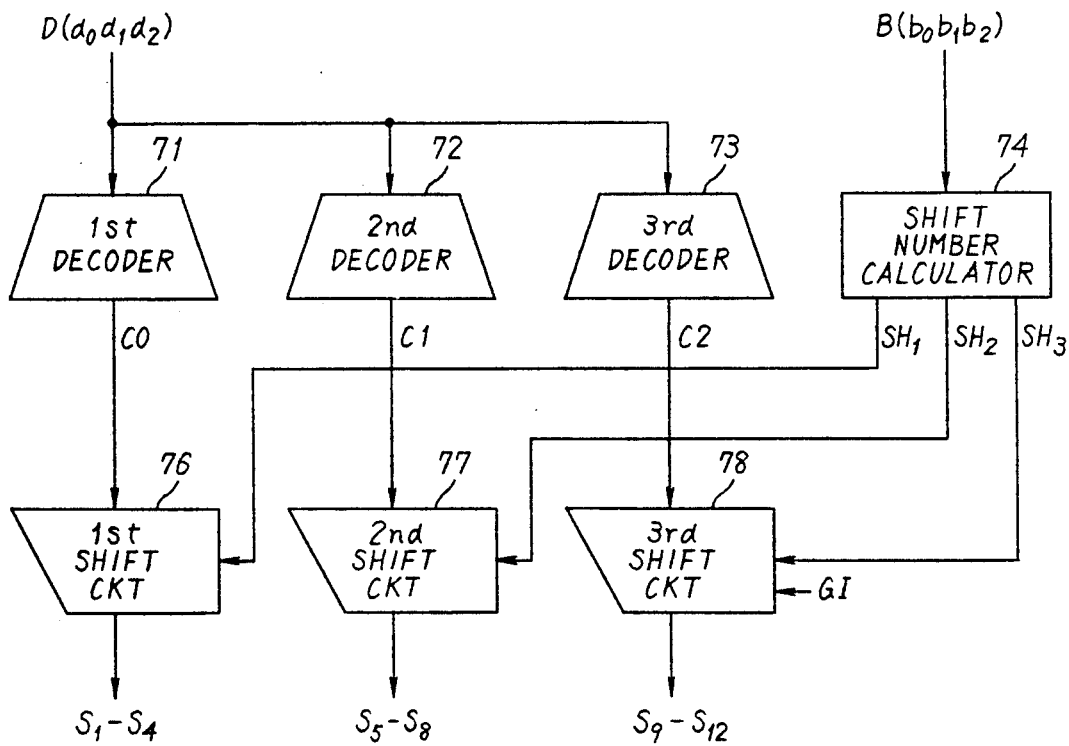
FIG. 5 is a block diagram of a control circuit included in the circuit arrangement illustrated in FIG. 1.

Referring to FIG. 5 afresh and FIG. 1 again, the control circuit 56 is operable in response to the group indication signal GI of two bits, the leading or first address signal B of three bits, and the address distance signal D of three bits. The address distance signal D is delivered to first, second, and third decoders 71, 72, and 73 while the first address signal B is delivered to a shift number calculator 74 for calculating a shift number determined by the leading or first address for the first one of the vector signals and by the group indication signal GI. This is because a sequence of addresses for the vector signals is arranged at each address distance represented by the address distance signal and is shifted in the memory 52 by the first address B, as will become clear later.

For example, when the first address B specifies an address included in the first memory unit 52-1, no shift is necessary. Therefore, the shift number may be equal to zero. Likewise, when the first address B specifies an address included in the second through eighth memory units 52-2 to 52-8, the shift number is equal to 1, 2, ... or 7. The shift number is delivered as first, second, and third shift signals $SH_1$, $SH_2$, and $SH_3$, respectively. Specifically, the first shift signal $SH_1$ is equal to $b_2$ while the second and third shift signals $SH_2$ and $SH_3$ are equal to $b_1 b_2$ and $b_0 b_1 b_2$, respectively.

Referring to FIGS. 6 and 7 afresh and FIG. 5 again, the first through third decoders 71 to 73 produce first, second, and third decoded signals depicted at C0, C1, and C2 in FIGS. 5 and 6, respectively, in response to the address distance signal D of three bits $d_0 d_1 d_2$. The first decoder 71 decodes the address distance signal D into the first decoded signal C0 of two bits represented by $C0_0$ and $C0_1$. The two bits $C0_0$ and $C0_1$ of the first decoded signal C0 are the most significant bit and the least significant bit, respectively, and always take a binary representation of $(10)_2$ even when the address distance signal D is varied between $(0)_{10}$ and $(7)_{10}$, respectively, as shown in FIG. 6 and FIG. 7(A).

The second decoder 72 decodes the address distance signal D into the second decoded signal C1 of five bits in accordance with an algorithm as readily understood from FIG. 6. The five bits of the second decoded signal C1 are successively numbered from the most significant bit $C1_0$ to the least significant bit $C1_4$ and are equal to $d_1$, 1, $\bar{d}_1$, 0, and $d_1$, respectively. As a result, the five bits of the second decoded signal C1 are varied in dependency upon the address distance signal D and take pattern illustrated in FIG. 7(B).

The third decoder 73 decodes the address distance signal D into the third decoded signal C2 of eleven bits $C2_0$ to $C2_{10}$ arranged from the most significant bit thereof. As illustrated in FIG. 7(C), the eleven bits from $C2_0$ to $C2_{10}$ are equal to $d_0$, $d_1$, $d_0$, 1, $\bar{d}_0$, $\bar{d}_1$, $\bar{d}_0$, 0, $d_0$, $d_1$, and $d_0$, respectively, and take patterns which are illustrated in FIG. 6 and which are determined by the address distance signal D.

It is readily possible to practically design the first through third decoders 71 to 73 with reference to FIGS. 6 and 7. The first through third decoders 71 to 73 will not be described hereafter.

Figure 8:
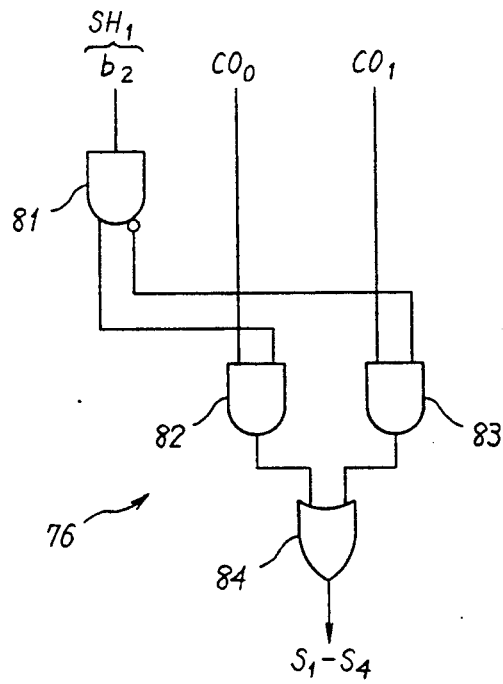
FIG. 8 is a circuit diagram for use in describing a part of the control circuit illustrated in FIG. 5.

Referring to FIG. 8 in addition to FIGS. 5 and 7, the first shift circuit 76 is supplied with the least significant bit $b_2$ of the first address signal B and the first decoded signal C0 of two bits represented by $C0_0$ and $C0_1$. The first shift circuit 76 comprises an input circuit 81, AND gates 82 and 83, and an OR gate 84. As readily seen from FIG. 8, the bit $C0_0$ is produced through the AND gate 82 and the OR gate 84 when the bit $b_2$ takes the logic "1" level. Otherwise, the bit $C0_1$ is produced through the AND gate 83 and the OR gate 84. This means that the first decoded signal C0 is shifted rightwards of FIG. 7(A) in response to the first shift signal $SH_1$ to produce a first shifted signal and that the least significant bit is extracted or separated from the first shifted signal. Specifically, the first decoded signal C0 is shifted by one bit rightwards in response to the bit $b_2$ of the logic "1" level. On the other hand, such a rightward shift is stopped in response to the bit $b_2$ of the logic "0" level.

At any rate, the least significant bit of the first shifted signal is delivered to the first through fourth switches $SW_1$ to $SW_4$ as the first through fourth control signals $S_1$ to $S_4$, respectively. Thus, the first through fourth control signals $S_1$ to $S_4$ are common to one another.

Figure 9:
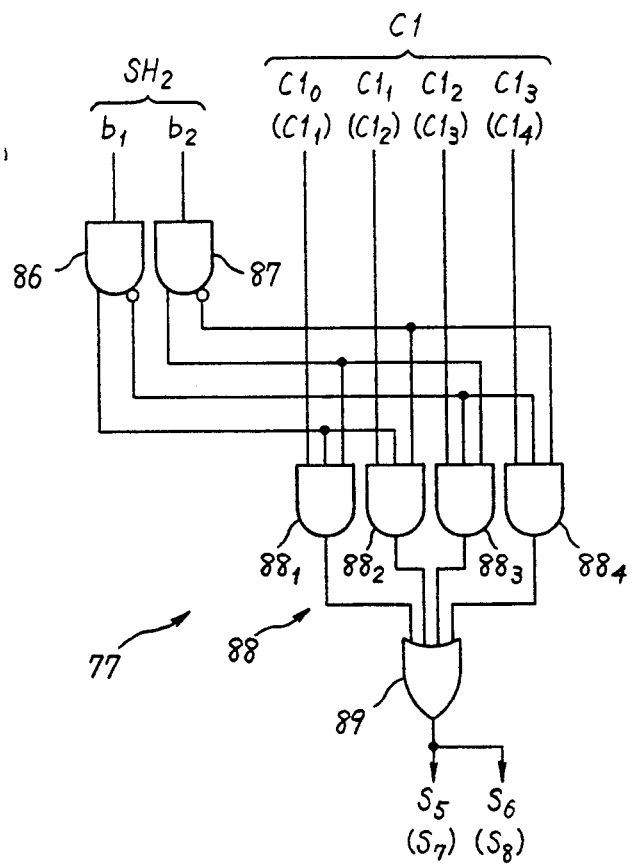
FIG. 9 is a circuit diagram of another part of the control circuit illustrated in FIG. 5.

Referring to FIG. 9 together with FIGS. 5 and 7, the second shift circuit 77 is operable in response to the second shift signal $SH_2$ formed by two lower bits $b_1b_2$ of the first address signal B and to the second decoded signal C1. The second shift circuit 77 comprises two circuits similar to each other, although a single circuit alone is illustrated in FIG. 9. The illustrated one of the circuits is for shifting four bits $C1_0$ to $C1_3$ of the second decoded signal C1 in accordance with the second shift signal $SH_2$ to supply the fifth and sixth control signals $S_5$ and $S_6$ to the fifth and sixth switch units $SW_5$ and $SW_6$, respectively. The other circuit is for shifting four bits of the second decoded signal C1 to supply the seventh and eighth control signals $S_7$ and $S_8$ to the seventh and eighth switch units $SW_7$ and $SW_8$.

More particularly, the illustrated circuit comprises two input gates 86 and 87 responsive to the two bits $b_1b_2$ of the second shift signal $SH_2$, a group 88 of four AND gates $88_1$ to $88_4$ connected to the input gates 86 and 87, and an OR gate 89 connected to the four AND gates. When the bits $b_1b_2$ are equal to $(11)_2$, the bit $C1_0$ or $C1_1$ is selected by the AND gate group $88_1$ and the OR gate 89. This is equivalent to the fact that the bit $C1_0$ and $C1_1$ are shifted rightwards of FIG. 7(B) by three bits to form a second shifted signal of two bits and that high and low significant bits of the second shifted signal are produced as the fifth and sixth control signals $S_5$ and $S_6$ and the seventh and eighth control signals $S_7$ and $S_8$, respectively.

Likewise, the bit $C1_1$ or $C1_2$ is selected through the AND gate $88_2$ by the second shift circuit 77 when the two bits $b_1b_2$ of the second shift signal $SH_2$ take $(10)_2$, respectively. The bit $C1_1$ is produced as the fifth and sixth control signals $S_5$ and $S_6$ while the bit $C1_2$ is produced as the seventh and eighth control signals $S_7$ and $S_8$. This is equivalent to the fact that the second decoded signal C1 shown in FIG. 7(B) is shifted rightwards by two bits to form the second shifted signal and that a least significant bit but one and the least significant bit are selected as the fifth and sixth control signals $S_5$ and $S_6$ and the seventh and eighth control signals $S_7$ and $S_8$, respectively.

Similarly, the bit $C1_2$ or $C1_3$ is selected through the AND gate $88_3$ in response to the two bits $b_1b_2$ of $(01)_2$. The bit $C1_2$ is delivered to the fifth and sixth switch units $SW_5$ and $SW_6$ as the fifth and sixth control signals $S_5$ and $S_6$ while the bit $C1_3$ is delivered to the seventh and the eighth switch units $SW_7$ and $SW_8$ as the seventh and eighth control signals $S_7$ and $S_8$. This means that the second decoded signal C1 shown in FIG. 7(B) is shifted rightwards by one bits to form the second shifted signal and that a least significant bit but one and the least significant bit of the second shifted signal are produced as the fifth and sixth control signals $S_5$ and $S_6$ and the seventh and eighth control signals $S_7$ and $S_8$, respectively.

Responsive to the two bits $b_1b_2$ of $(00)$, the second shift circuit 77 selects the bit $C1_3$ or $C1_4$ through the AND gate $88_4$ to produce the fifth and sixth control signals $S_5$ and $S_6$ or the seventh and eighth control signals $S_7$ and $S_8$, respectively. This implies that no shift is carried out and that the least significant bit but one and the least significant bit of the second decoded signal are selected as the fifth and sixth control signals $S_5$ and $S_6$ or the seventh and eighth control signals $S_7$ and $S_8$, respectively.

Figure 10:
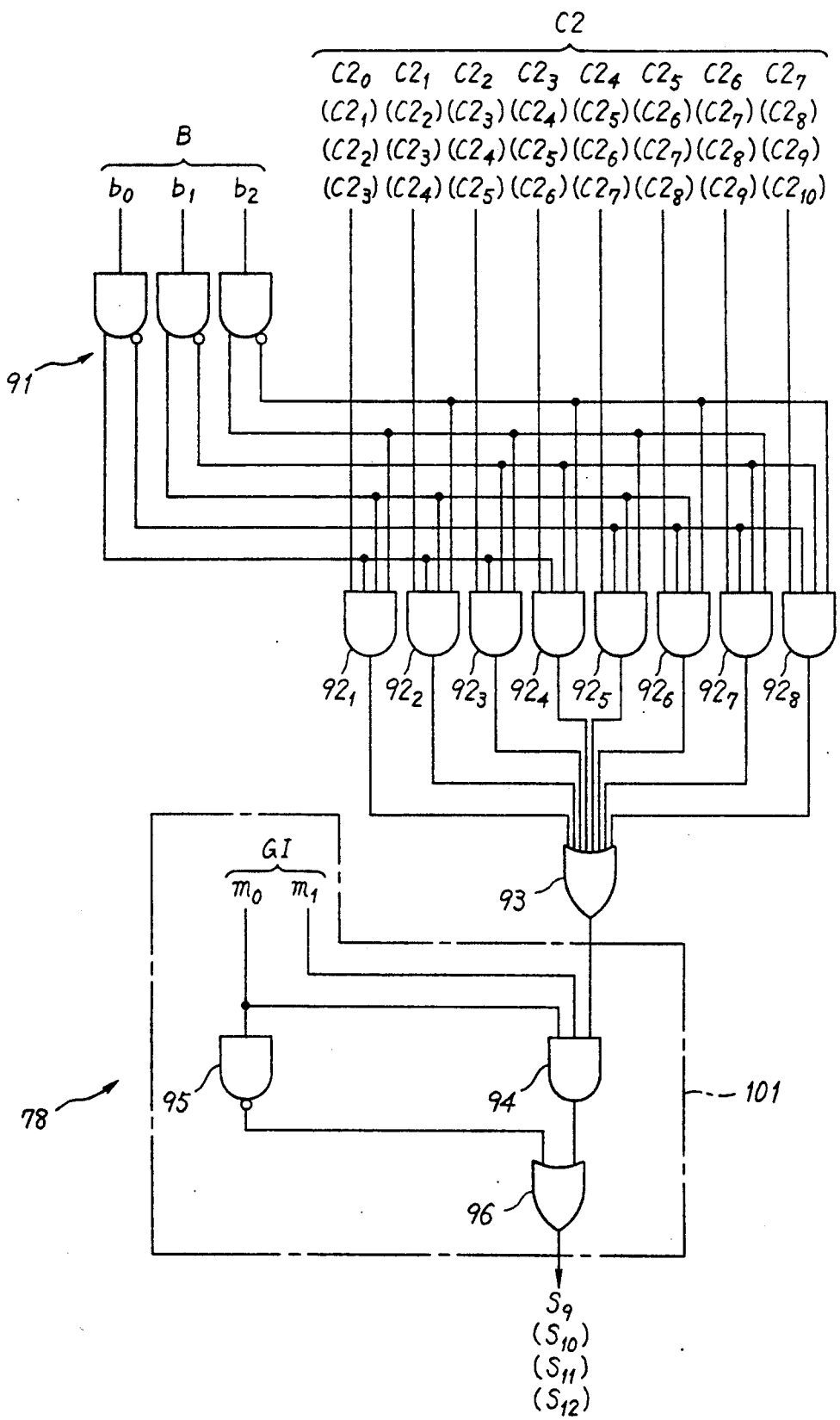
FIG. 10 is a circuit diagram of a further part of the control circuit.

Referring to FIG. 10 together with FIGS. 5 and 7, the third shift circuit 78 is operable in response to the first or leading address signal B, the group indication signal GI, and the third decoded signal C2 illustrated in FIG. 7(C). The third shift circuit 78 comprises a combination of four logic circuits similar in structure to one another. Therefore, a single logic circuit alone is illustrated in FIG. 10. Each of the $b_0b_1b_2$ of the first address signal B and two bits $(m_0m_1)_2$ of the group indication signal GI.

A first one of the logic circuits is given eight bits of the third decoded signal C2 which are depicted at $C2_0$ to $C2_7$ while a second one of the logic circuits is given eight bits of the third decoded signal C2 which are shifted by a single bit relative to the eight bits given to the first logic circuit and which are depicted at $C2_1$ to $C2_8$. Likewise, a third one of the logic circuits is given eight bits depicted at $C2_2$ to $C2_9$ while a fourth one of the logic circuits is given eight bits depicted at $C2_3$ to $C2_{10}$.

The first through fourth logic circuits are for delivering the ninth through twelfth control signals $S_9$ to $S_{12}$ to the ninth through twelfth switch units $SW_9$ to $SW_{12}$, respectively.

Each logic circuit comprises three input gates collectively shown at 91, eight AND gates depicted at $92_1$ to $92_8$, a first OR gate 93, an additional AND gate 94, an inverter 95, and a second OR gate 96.

In the example being illustrated, when two bits $m_0m_1$ of the group indication signal GI are equal to $(10)_2$, the ninth through twelfth control signals $S_9$ to $S_{12}$ take the logic "0" level in common. Similarly, when two bits $m_0m_1$ are equal to $(01)_2$, the ninth through twelfth control signals $S_9$ to $S_{12}$ take the logic "1" level in common. From this fact, it is readily understood that the ninth through twelfth switch units $SW_9$ to $SW_{12}$ carry out a similar operation when the memory units 52-1 and 52-8 (FIG. 1) are partially accessed in the manner illustrated in conjunction with FIG. 2.

In other words, each bit of the third decoded signal C2 is selected in response to the three bits $b_0b_1b_2$ of the first address signal B only when the two bits $m_0m_1$ of the group indication signal GI take $(11)_2$.

Let the two bits $m_0m_1$ of the group indication signal GI be equal to $(11)_2$. In this event, the first through fourth logic circuits select the bits $C2_0$, $C2_1$, $C2_2$, and $C2_3$ of the third decoded signal C2 through the AND gate $92_1$, the first OR gate 93, the additional AND gate 94, and the second OR gate 96 when the three bits $b_0b_1b_2$ of the first address signal B take $(111)_2$. Selection of the bits $C2_0$, $C2_1$, $C2_2$, and $C2_3$ is equivalent to the fact that the third decoded signal C2 (FIG. 7(C)) is shifted rightwards by seven bits to form a third shifted signal and that four lower bits of the third shifted signal are produced as the ninth through twelfth control signals $S_9$ to $S_{12}$, respectively.

In a similar manner, four bit sets, such as $C2_1$, $C2_2$, $C2_3$, $C2_4$; $C2_2$, $C2_3$, $C2_4$, $C2_5$; and the like, are selected as the ninth through twelfth control signals $S_9$ to $S_{12}$ in response to the first address signal B.

As mentioned in conjunction with FIGS. 8 to 10, the first through twelfth control signals $S_1$ to $S_{12}$ are produced by shifting the first through third decoded signals C0, C1, and C2 in accordance with the first address signal B in the first through third shift circuits 76 to 78.

Now, the operation of the system will be described with reference to FIGS. 1, 2, 5, and 7. It is assumed that the group indication signal GI takes $(11)_2$ to indicate all of the first through eighth memory areas 52-1 to 52-8 and that the first or leading address signal B specifies the zeroth address "0" and that the address distance D is equal to three. Under the circumstances, the line 51-1 (FIG. 1) is given the zeroth address "0" while the lines 51-2 to 51-8 are given (3, 6, 9, 12, 15, 18, and 21) calculated by successively adding three, respectively.

As shown in FIG. 2(A), the above-mentioned addresses of (0, 3, 6, 9, 12, 15, 18, 21) are assigned to the memory units 52-1, 52-4, 52-7, 52-2, 52-5, 52-8, 52-3, and 52-6, respectively. Therefore, the first through eighth input ports I1 to I8 should be connected to the first, fourth, seventh, second, fifth, eighth, third, and sixth output ports O1, O4, O7, O2, O5, O8, O3, and O6, respectively.

In this event, the central processing unit 51 produces the first address signal B specifying the zeroth address "0" and the address distance signal D representative of the address distance $3)_{10}$. Responsive to the address distance signal D representative of the address distance $(3)_{10}$, the first through third decoders 71 to 73 supplies the first through third shift circuits 76 to 78 with the first through third decoded signals C0, C1, and C2 which are represented by $(10)_2$, $(11001)_2$, and $(01011010010)_2$, as shown in FIGS. 7(A) to (C), respectively.

On the other hand, the shift number calculator 74 delivers the first shift signal $SH_1$ of $(0)_2$, the second shift signal $SH_2$ of $(00)_2$, and the third shift signal $SH_3$ of $(000)_2$ to the first through third shift circuits 76 to 78 in response to the first or leading address signal B of $(000)_2$, respectively.

In FIGS. 5, 7, and 8, the first shift circuit 76 produces the first through fourth control signals $S_1$ to $S_4$ of the logic "0" level in response to the first shift signal $SH_1$ of $(0)_2$, as readily understood from FIGS. 7(A) and 8.

Responsive to the second shift signal $SH_2$ of $(00)_2$, the second shift circuit 77 selects the bit $C1_3$ or $C1_4$ of the second decoded signal C1. The bit $C1_3$ is delivered as the fifth and sixth control signals $S_5$ and $S_6$ to the fifth and sixth switch units $SW_5$ and $SW_6$. As shown in FIG. 7(B), the bit $C1_3$ of the second decoded signal C1 takes $(0)_2$ when the address distance is equal to $(3)_{10}$.

The bit $C1_4$ is delivered to the seventh and eighth switch units $SW_7$ and $SW_8$ as the seventh and eighth control signals $S_7$ and $S_8$ and takes $(1)_2$ when the address distance is equal to 10.

Responsive to the third shift signal $SH_3$ of $(000)_2$, the third shift circuit 78 selects the bits $C2_7$, $C2_8$, $C2_9$, and $C2_{10}$ as the ninth through twelfth control signals $S_9$ to $S_{12}$, as readily understood from FIG. 10. When the address distance is equal to $(3)_{10}$, the bits $C2_7$, $C2_8$, $C2_9$, and $C2_{10}$ of the third decoded signal C2 are equal to $(0010)_2$, respectively, as illustrated in FIG. 7(C). Accordingly, the ninth through twelfth control signals $S_9$ to $S_{12}$ take $(0010)_2$, respectively.

Figure 11:
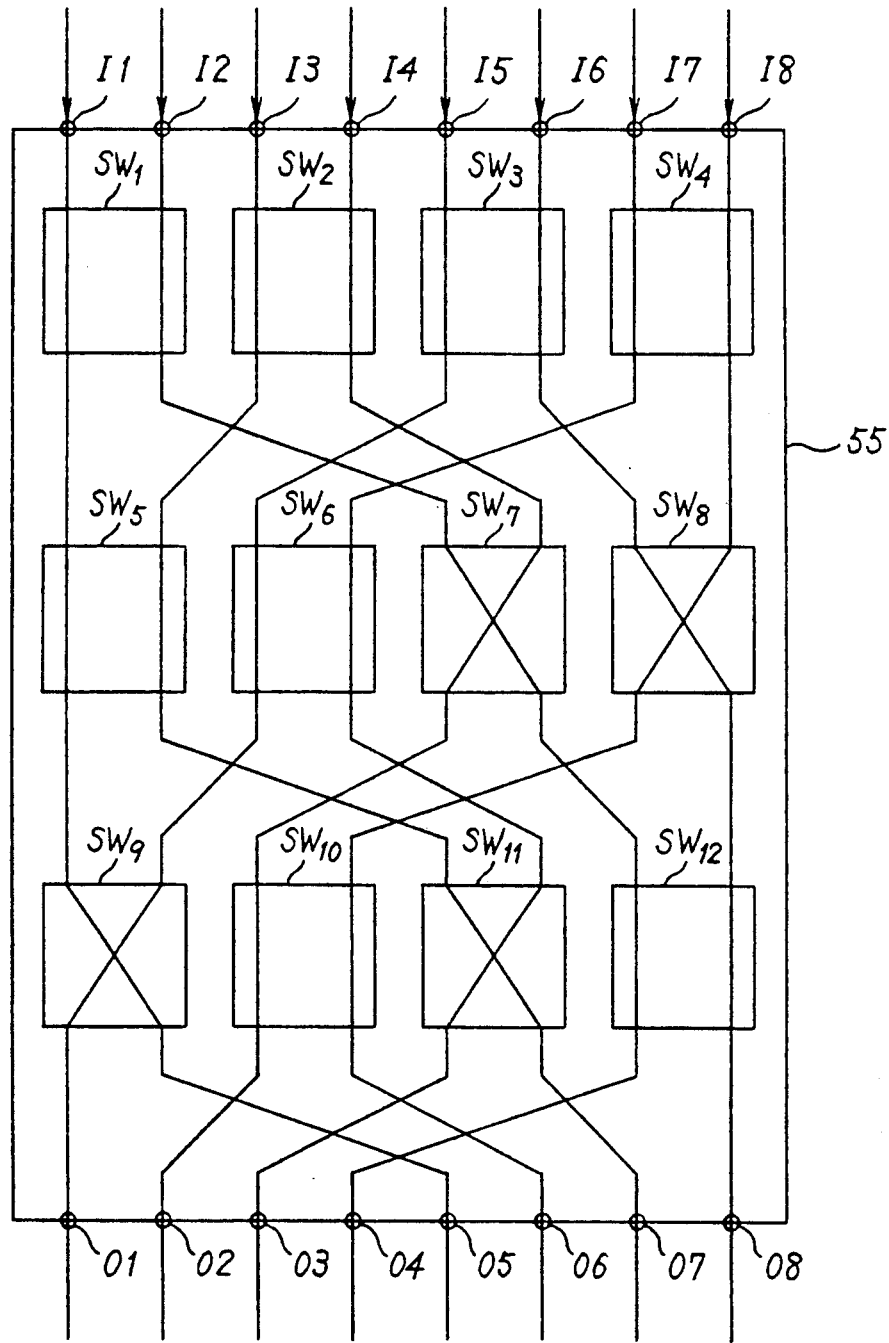
FIG. 11 is a diagrammatical view for use in describing operation of the circuit arrangement on a certain condition.

Referring to FIG. 11, internal paths are formed in the switching network 55 in response to the above-mentioned first through twelfth control signals $S_1$ to $S_{12}$ of $(000000110010)_2$. As shown in FIG. 11, the first through eighth input ports I1 to I8 are linked to the first, fourth, seventh, second, fifth, eighth, third, and sixth output ports O1, O4, O7, O2, O5, O8, O3, and O6, respectively. Thus, the input ports I1 to I8 are connected to destination ones of the output ports O1 to O8 and are therefore connected to the memory units in question.

In FIGS. 1, 5, 7, and 8 through 10, let the group indication signal GI be represented by $(11)_2$ to put all of the first through twelfth memory units 52-1 to 52-8 into the accessible states. In addition, let the first or leading address B be $(3)_{10}$ and the address distance D be equal to $(3)_{10}$ In this case, the first through third decoders 76 to 78 produce the first through third decoded signals C0 to C2 which are equal to $(10)_2$, $(11001)_2$, and $(01011010010)_2$, respectively, as readily understood from FIG. 7, and which are identical with the above-mentioned example.

Responsive to the first address signal B of $(3)_{10}$, the shift number calculator 74 supplies the first through third shift signals $SH_1$ to $SH_3$ which are representative of $(1)_2$, $(11)_2$, and $(011)_2$, respectively.

Under the circumstances, the first shift circuit 76 (FIG. 8) selects the bit $C0_0$ of $(1)_2$ in response to the first shift signal $SH_1$ of $(1)_{10}$ to supply the first through fourth switch units $SW_1$ to $SW_4$ with the first through fourth control signals $S_1$ to $S_4$ which all take $(1)_2$.

Supplied with the second shift signal $SH_2$ of $(11)_2$, the second shift circuit 77 (FIG. 9) delivers the bits $C1_0$ and $C1_1$ of the second decoded signal C1 to the fifth and sixth switch units $SW_5$ and $SW_6$ and to the seventh and eighth switch units $SW_7$ and $SW_8$, respectively. As shown in FIG. 7(B), the bits $C1_0$ and $C1_1$ are equal to $(1)_2$ and $(1)_2$, respectively, and serve as the fifth and sixth control signals $S_5$ and $S_6$ and the seventh and eighth control signals $S_7$ and $S_8$, respectively. Thus, all of the fifth through eighth control signals $S_5$ to $S_8$ take the logic "1" level.

Responsive to the third shift signal $SH_2$ of $(011)_2$, the third shift circuit 78 (FIG. 10) selects the bits $C2_4$, $C2_5$, $C2_6$, and $C2_7$, as seen from FIG. 10, and produces the selected bits $C2_4$, $C2_5$, $C2_6$, and $C2_7$ as the ninth through twelfth control signals $S_9$ to $S_{12}$, respectively. Inasmuch as the selected bits $C2_4$, $C2_5$, $C2_6$, and $C2_7$ of the third decoded signal C2 are equal to 1, 0, 1, and 0, respectively, provided that the address distance is equal to three, the ninth through twelfth control signals $S_9$ to $S_{12}$ take $(1010)_2$, respectively.

Thus, the first through twelfth switch units $SW_1$ to $SW_{12}$ are controlled by the first through twelfth control signals $S_1$ to $S_{12}$ of $(111111111010)_2$, respectively.

Figure 12:
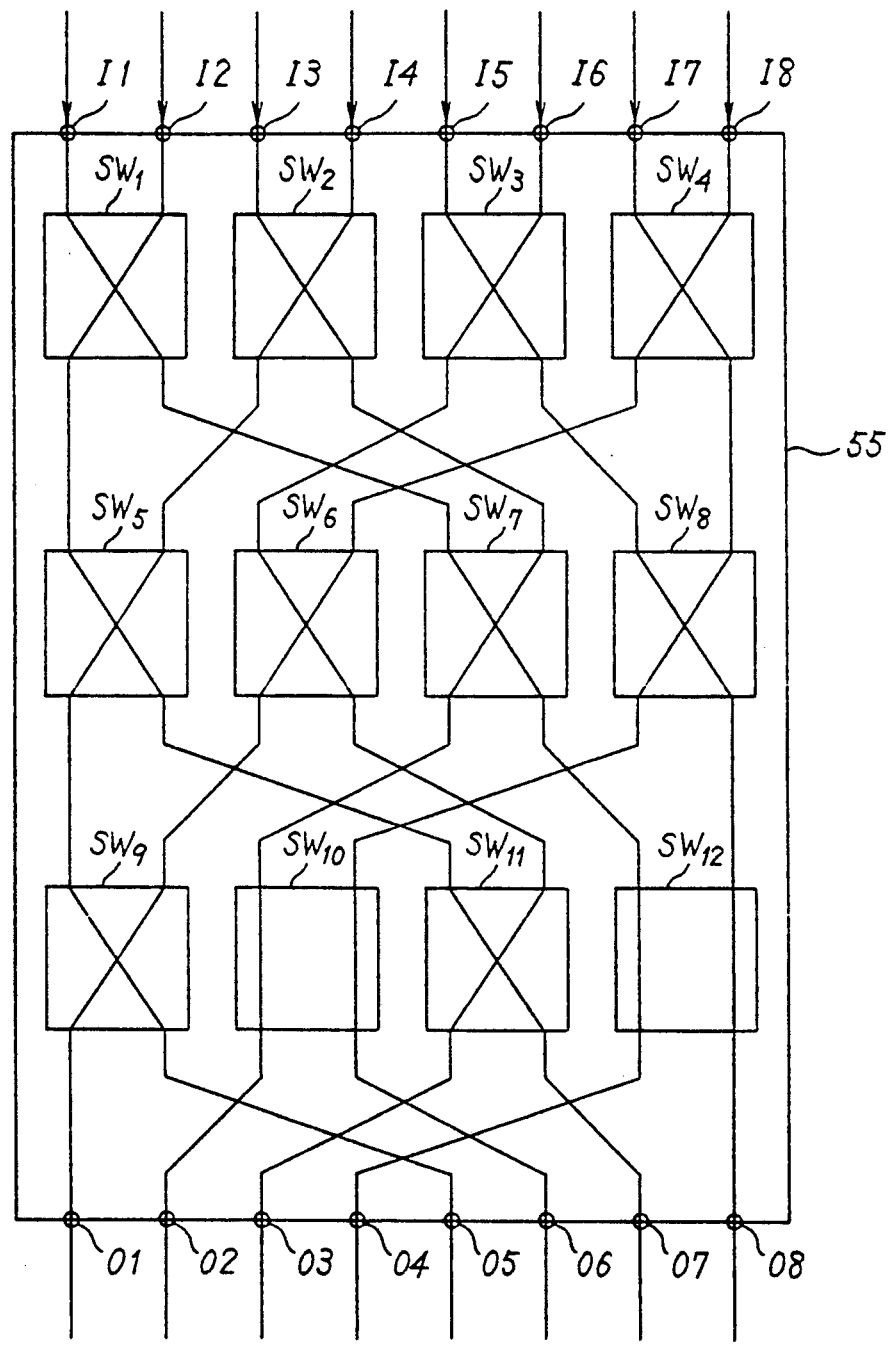
FIG. 12 is a similar view for use in describing operation of the circuit arrangement on another condition.

Referring to FIG. 12, the first through twelfth switch units $SW_1$ to $SW_{12}$ of the switching unit 55 are controlled by the above-mentioned first through twelfth control signals $S_1$ to $S_{12}$ to form internal paths in the switching network 55. As shown in FIG. 12, the first through eighth input ports I1 to I8 are interconnected to the fourth, seventh, second, fifth, eighth, third, sixth, and first output ports O4, O7, O2, O5, O8, O3, O6, and O1 which are linked to the corresponding memory units 52-4, 52-7, 52-2, 52-5, 52-8, 52-3, 52-6, and 52-1, respectively.

As readily understood from the first address of $(3)_{10}$ and the address distance of $(3)_{10}$, the first through eighth input ports I1 to I8 are supplied with the memory addresses of 3, 6, 9, 12, 15, 18, 21, and 24 which are assigned to the fourth, seventh, second, fifth, eighth, third, sixth, and first memory units, respectively. Therefore, these memory units are correctly connected to the first through eighth input ports I1 to I8 and are correctly accessed through the switching network 55 by the central processing unit 51.

It is assumed that only the fifth through eighth memory units 52-5 to 52-8 are accessible by the central processing unit 51 while the first through fourth memory units 52-1 to 52-4 are not accessible. Therefore, the fifth through eighth memory units 52-5 to 52-8 are assigned with the memory addresses in the manner illustrated in FIG. 2(C). Let the first or leading address for a leading one of the vector signals be the third address $(3)_{10}$ and the address distance be equal to $(3)_{10}$. In this event, the first through third decoders 71 to 73 (FIG. 5) produce the first through third decoded signals C0 to C2 which are identical with those illustrated in conjunction with FIG. 12. Accordingly, the two bits $C0_0$ and $C0_1$ of the first decoded signal C0, the five bits $C1_0$ to $C1_4$ of the second decoded signal C1, and the eleven bits $C2_0$ to $C2_{10}$ of the third decoded signal C2 become equal to $(10)_2$, $(11001)_2$, and $(01011010010)_2$, respectively, as seen from FIGS. 7(A) to (C), and are delivered to the first through third shift circuits 76 to 78, respectively.

The first through third shift circuits 76 to 78 are supplied with the first shift signal $SH_1$ of $(1)_2$, the second shift signal $SH_2$ of $(11)_2$, and the third shift signal $SH_3$ of $(011)_2$, respectively.

The first shift circuit 76 selects the bit $C0_0$ of the logic "1" level to produce the first through fourth control signals $S_1$ to $S_4$ each of which takes $(1)_2$. The second shift circuit 77 selects the bits $C1_0$ and $C1_1$ each of which takes the logic "1" level and which are produced as the fifth and sixth control signals $S_5$ and $S_6$ and the seventh and eighth control signals $S_7$ and $S_8$, respectively.

On the other hand, the third shift circuit 78 is supplied with the group indication signal GI of $(01)_2$ because the fifth through eighth memory units 52-5 to 52-8 are accessible. In this case, the third shift circuit 78 produces the ninth through twelfth control signals $S_9$ to $S_{12}$ which all take the logic "1" level, as readily understood from FIG. 10.

Figure 13:
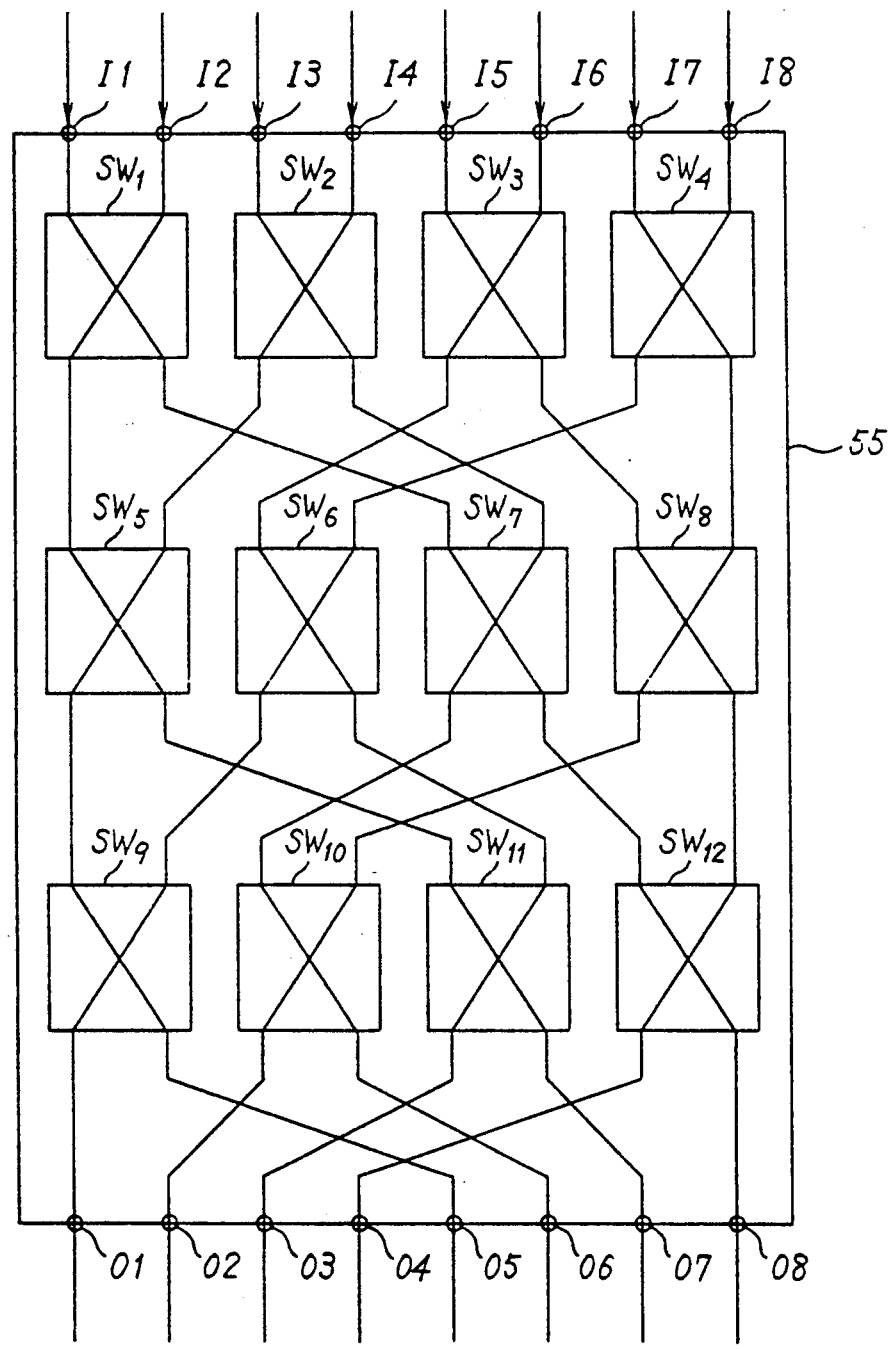
FIG. 13 is a similar view for use in describing operation of the circuit arrangement on a further condition.

Referring to FIG. 13, internal paths are formed in the switching network 55 by the above-mentioned set of the first through twelfth control signals $S_1$ to $S_{12}$ which all take $(1)_2$. As a result, the first through eighth input ports I1 to I8 are interconnected to the eighth, seventh, sixth, fifth, fourth, third, second, and first output ports O8, O7, O6, O5, O4, O3, O2, and O1, respectively.

Herein, it is noted that valid or usable ones of the address signals are given only to the first through fourth input ports I1 to I4 and specify the memory addresses of 3, 6, 9, and 12 which are assigned to the eighth, seventh, sixth, and fifth memory units 52-8, 52-7, 52-6, and 52-5, as shown in FIG. 2(C).

The internal paths illustrated in FIG. 13 are correctly interconnected to the eighth, seventh, sixth, and fifth memory units 52-8, 52-7, 52-6, and 52-5, respectively, as readily understood from the above.

In the example being illustrated, when the address distance is represented by an even number, the illustrated circuit arrangement 50 fails to correctly distribute the address signals to the memory units 52-1 to 52-8. Such incorrect distribution is possible by enabling the circuit arrangement 50 by the central processing unit 51 only when the address distance is represented by an odd number.

Figure 14:
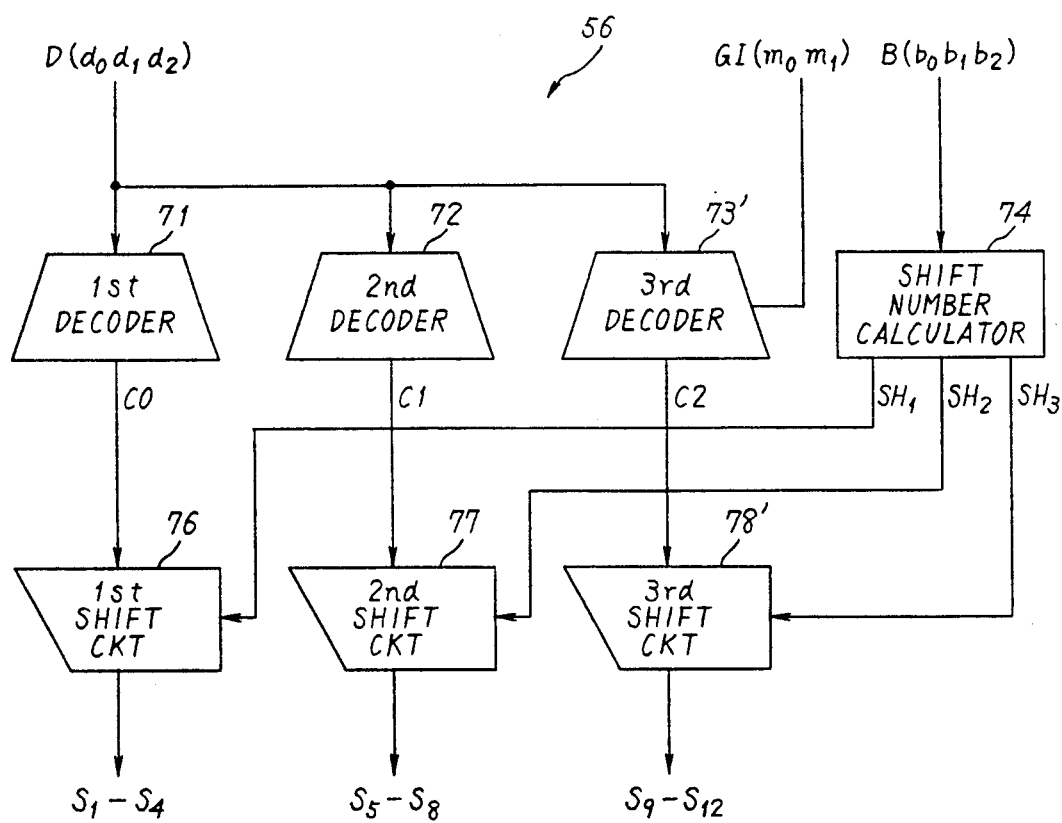
FIG. 14 is a block diagram of a control circuit according to a modification of this invention.

Referring to FIG. 14, a control circuit 56 is applicable to the circuit arrangement according to the first embodiment of this invention and is similar to that illustrated in FIG. 5 except that the group indication signal GI of two bits $m_0m_1$ is supplied to a third decoder 73' which is somewhat modified from the third decoder 73 illustrated in FIG. 5 and which is coupled to a third shift circuit 78'.

In FIG. 14, the illustrated third decoder 73' comprises a control signal section similar to the third decoder 73 illustrated in FIG. 5 and a logic signal section operable in response to the group indication signal GI in a manner to be described later. Therefore, the control signal section produces the third control signal C2 of eleven bits $C2_0$ to $C2_{10}$ (as shown in FIG. 6) in response to the address distance signal D of three bits $b_0b_1b_2$. The eleven bits $C2_0$ to $C2_{10}$ of the third decoded signal C2 are represented by $d_0$, $d_1$, $d_0$, 1, $\bar{d}_0$, $\bar{d}_1$, $\bar{d}_0$, 0, $d_0$, $d_1$, and $d_0$, respectively.

The logic signal section comprises a plurality of circuit units each of which is similar to a part depicted at 101 in FIG. 10. The circuit units are for logically processing the respective bits of the third decoded signal C2. As a result, the eleven bits of the third decoded signal C2 pass through the circuit units as they stand when the two bits $m_0m_1$ of the group indication signal GI are equal to $(11)_2$. On the other hand, all of the eleven bits of the third decoded signal C2 are decoded into the logic "1" level when the two bits $m_0m_1$ of the group indication signal GI are equal to $(01)_2$ while they are all decoded into the logic "0" level when the two bits $m_0m_1$ are equal to $(10)_2$.

The illustrated third shift circuit 78' is similar to the third shift circuit 78 illustrated in FIG. 10 except that the part 101 is removed from FIG. 10. This means that the ninth through twelfth control signals $S_9$ to $S_{12}$ are produced from the OR gate 94 (FIG. 10).

With this structure, it is possible to connect the first through eighth input ports I1 to I8 to the first through eighth output ports O1 to O8 in the manner illustrated in conjunction with FIG. 11 when the two bits of the group indication signal GI are equal to $(11)_2$.

Let the two bits $m_0m_1$ of the group indication signal GI be $(10)_2$ and the first through fourth memory units 52-1 to 52-4 be accessible by the central processing unit 51 (FIG. 1). The memory addresses are assigned to the first through fourth memory units 52-1 to 52-4 in the manner illustrated in FIG. 2(C). In this event, valid address signals are given only to the first through fourth input ports I1 to I4.

It is presumed that the leading or first address signal B is indicative of the second address assigned to the third memory unit 52-3 and that the address distance D is equal to three.

Figure 15:
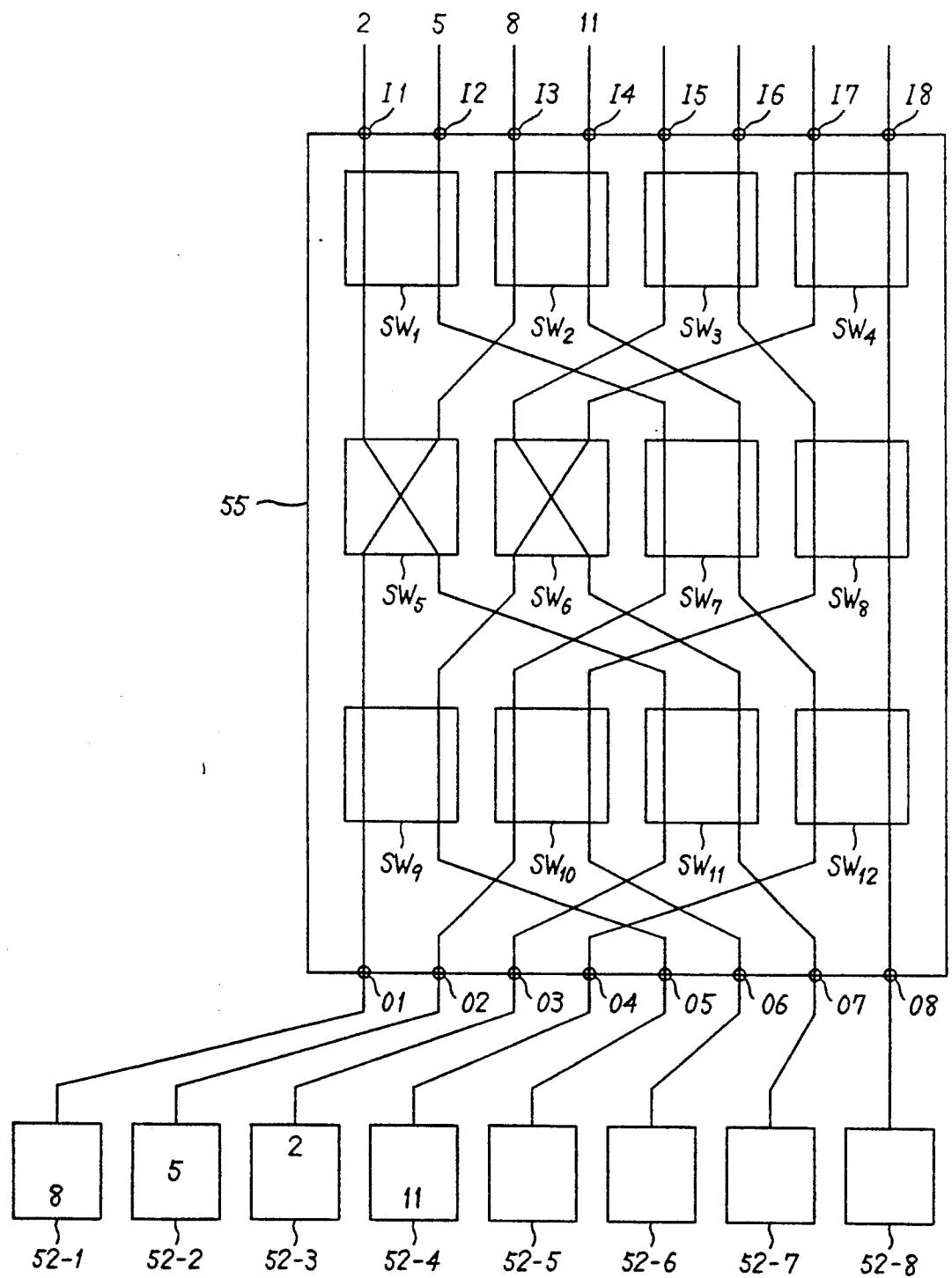
FIG. 15 is a block diagram for use in describing connections according to the control circuit illustrated in FIG. 14.

Referring to FIG. 15, the first through fourth input ports I1 to I4 are supplied with the memory addresses 2, 5, 8, and 11, respectively, on the above-mentioned condition. As shown in FIG. 15, the memory addresses 2, 5, 8, and 11 are assigned to the third, second, first, and fourth memory units 52-3, 52-2, 52-1, and 52-4, respectively. Therefore, the first through fourth input ports I1 to I4 must be connected to the third, second, first, and fourth memory units 52-3, 52-2, 52-1, and 52-4, respectively.

In FIGS. 7(A), 8, and 14, the first decoder 71 produces the first decoded signal C0 of $(10)_2$ in response to the address distance signal D of $(011)_2$. The second decoder 71 produces the second decoded signal C1 of $(11001)_2$, as shown in FIG. 7(B). On the other hand, the third decoder 73' (FIG. 14) produces the third decoded signal C2 of the eleven bits $C2_0$ to $C2_{10}$ which all take $(0)_2$, because the two bits $m_0m_1$ of the group indication signal GI are equal to $(10)_2$, respectively.

Responsive to the first or leading address signal B of $(010)_2$, the shift number calculator 74 delivers the first shift signal $SH_1$ of $(0)_2$, the second shift signal $SH_2$ of $(10)_2$, and the third shift signal $SH_3$ of $(010)_2$ to the first through third shift circuits 76, 77, and 78', respectively. Accordingly, the first through fourth control signals $S_1$ to $S_4$ take $(0)_2$, as understood from FIG. 8. The fifth and sixth control signals $S_5$ and $S_6$ take $(1)_2$ while the seventh and eighth control signals $S_7$ and $S_8$ take $(0)_2$, as readily understood from FIG. 9. In addition, the ninth through twelfth control signals $S_9$ to $S_{12}$ take $(0)_2$ because the eleven bits $C2_0$ to $C2_{10}$ are all equal to $(0)_2$, as mentioned above. As a result, the first through twelfth switch units $SW_1$ to $SW_{12}$ are connected in the manner illustrated in FIG. 15.

From this fact, it is seen that the first through fourth input ports $I_1$ to $I4$ are connected through the circuit arrangement 50 to the memory units 52-3, 52-2, 52-1, and 52-4, respectively.

Similar operation is possible by the use of the control circuit 56 illustrated in FIG. 14 when the two bits $m_0m_1$ of the group indication signal GI are equal to $(01)_2$ and will not be described any longer because the operation is similar to that illustrated in conjunction with FIG. 13.

Figure 16:
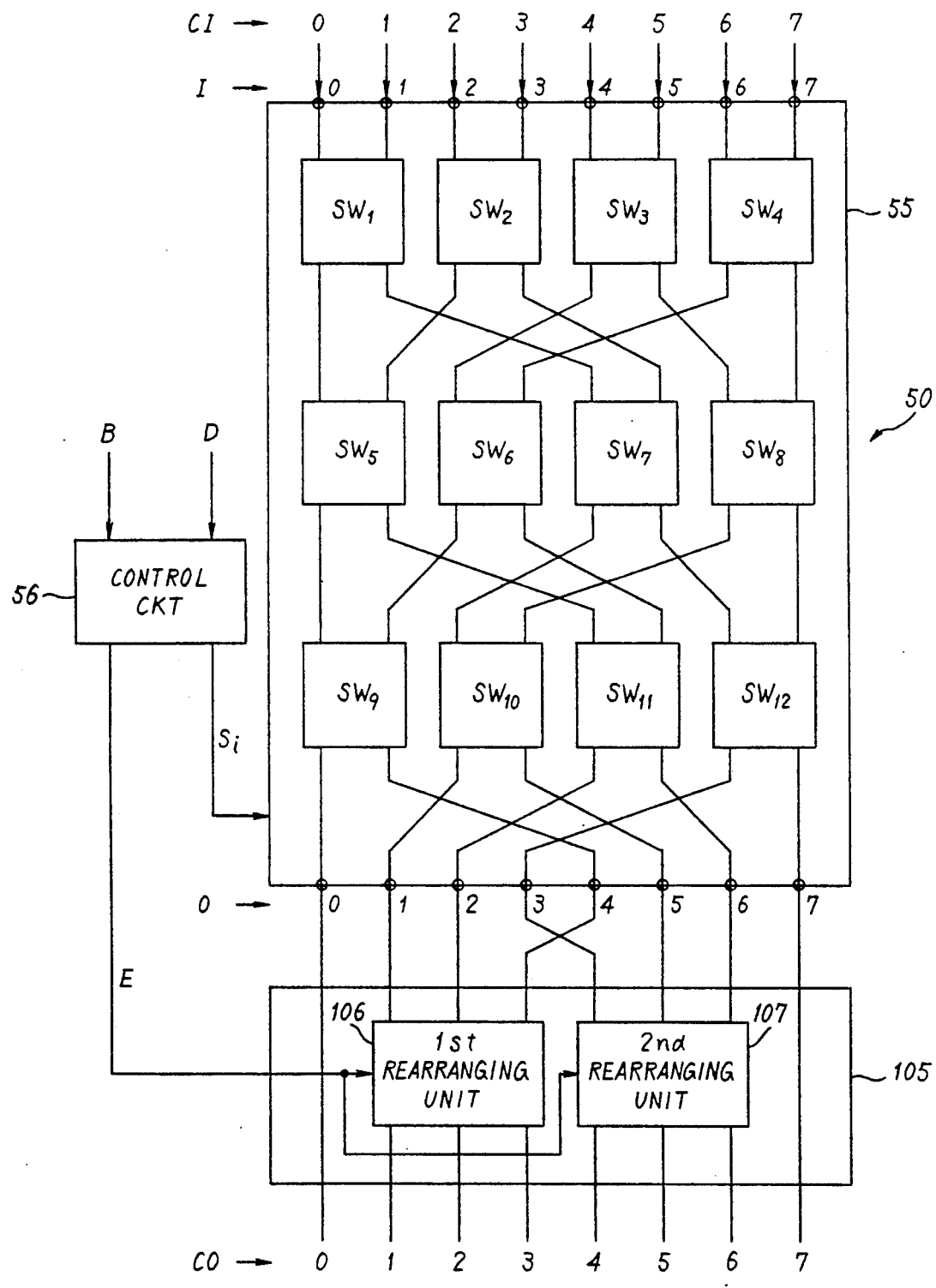
FIG. 16 is a block digram of a circuit arrangement according to a second embodiment of this invention.

Referring to FIG. 16, a circuit arrangement 50 according to a second embodiment of this invention comprises a switching network 55 which is similar to that illustrated in FIG. 1 and which has first through eighth input ports I1 to I8 and first through eighth output ports O1 to O8. The first through eighth input ports I1 to I8 are consecutively numbered from zero to seven, respectively, and will be indicated at I(0) to I(7), respectively, as shown in FIG. 16. Likewise, the first through eighth output ports O1 to O8 are consecutively numbered from zero to seven and will be indicated at O(0) to O(7), respectively. In order to avoid confusion, the terms, such as "first," "eighth," will be omitted from the name of the input and output ports, hereinunder.

The switching network 55 comprises first through twelfth switch units $SW_1$ to $SW_{12}$ controlled by first through twelfth control signals $S_1$ to $S_{12}$ (depicted at $S_i$ in FIG. 16) like in FIG. 1.

The illustrated circuit arrangement 50 has eight circuit input ports CI(0) to CI(7) consecutively numbered in a manner similar to the input ports I(0) to I(7) and connected to the input ports I(0) to I(7), respectively, and eight circuit output ports CO(0) to CO(7) consecutively numbered like the output ports O(0) to O(7). The circuit input ports CI (suffixes omitted) are connected to the central processing unit 51 (FIG. 1) while the circuit output ports CO are coupled to either the memory units 52-1 to 52-8 or array processors (not shown).

A rearranging circuit 105 is placed between the output ports O(0) to O(7) and the circuit output ports CO(0) to CO(7) so as to modify connections between the output ports 0(0) to 0(7) and the circuit output ports CO(0) to CO(7) in a manner to be described later in detail. The rearranging circuit 105 comprises a first rearranging circuit 106 between the output ports O(1), O(2), and O(4) and the circuit output ports CI(1), CI(2), and CI(4) and a second rearranging unit 107 between the output ports O(3), O(5), and o(6) and the circuit output ports CO(3), CO(5), and CO(6). The output ports O(0) and 0(7) are connected direct to the circuit output ports CO(0) and CO(7), respectively.

Each of the first and the second rearranging units 106 and 107 is similar in structure and operation to each other and is synchronously operated in response to a unit control signal E of a single bit.

Referring to FIGS. 17 and 18, description will be made as regards each of the first and second rearranging units 106 and 107. In FIG. 17, the output ports and the circuit output ports are depicted at O(u), O(v), and O(w) and CO(u), CO(v), and CO(w), respectively. As shown in FIG. 17(A), the output ports O(u), O(v), and O(w) are connected through the rearranging unit to the corresponding circuit output ports CO(u), CO(v), and CO(w), respectively, when the unit control signal E is equal to $(0)2$. This implies that port numbers u, v, and w of the output ports are coincident with those of the circuit output ports.

Supplied with the unit control signal E of $(1)_2$, the rearranging unit connects the output ports O(u), O(v), and O(w) to the circuit output ports CO(w), CO(u), and CO(v), respectively. From this fact, it is to be understood that the port numbers u, v, and w of the output ports are converted into w, u, and v, respectively. Thus, the rearranging unit serves to rearrange the output ports O(u), O(v), and O(w) in the above-mentioned manner in response to the unit control signal E of $(1)_2$.

Referring to FIG. 18, each rearranging circuit 106 and 107 comprises an input gate circuit responsive to the unit control signal E, three pairs of AND gates connected to the input gate circuit and the output ports O(u), O(v), and O(w), and three OR gates connected to the respective pairs of AND gates and to the circuit output ports CO(u), CO(v), and CO(w), respectively. As readily understood from FIG. 18, the illustrated rearranging circuit can carry out the above-mentioned rearranging operation.

Let each of the numbers u, v, and w of the output ports be given by three bits of $(A_0A_1A_2)_2$. When the unit control signal E takes $(0)_2$, the binary number $A_0A_1A_2$ is not changed by the rearranging unit. Accordingly, the output ports O(u), O(v), and O(w) are connected to the circuit output ports CO(u), CO(v), and CO(w), respectively. On the other hand, the binary number $A_0A_1A_2$ is changed into $A_1A_2A_0$ by the rearranging unit when the unit control signal E takes $(1)_2$. As a result, the output port represented by $A_0A_1A_2$ is connected to the circuit output port represented by $A_1A_2A_0$.

Referring back to FIG. 16, the first rearranging unit 106 connects the output ports O(1), O(2), and O(4) to the circuit output ports CO(1), CO(2), and CO(4), respectively, in response to the unit control signal E of $(0)_2$. Otherwise, the output ports O(1), O(2), and O(4) are connected to the circuit output ports CO(2), CO(4), and CO(1), respectively.

Likewise, the second rearranging unit 107 connects the output ports O(3), O(5), and O(6) to the circuit output ports CO(3), CO(5), and CO(6), respectively, in response to the unit control signal E of $(0)_2$. Supplied with the unit control signal E of $(1)_2$, the second rearranging unit 107 connects the output ports O(3), O(5), and O(6) to the circuit output ports CO(6), CO(3), and CO(5), respectively. Thus, this suggests that the order of 3, 5, and 6 assigned to the output ports O(3), O(5), and O(6) are rearranged into an order of 5, 6, and 3, as shown in FIG. 16.

In FIG. 16, the illustrated circuit arrangement 50 further comprises a control circuit 56 for controlling the switching unit 55 and the rearranging circuit 105.

It is to be noted here that a sequence of vector signals can also be delivered to the memory 52 (FIG. 1) in a manner similar to that illustrated in conjunction with FIG. 1 by indicating a leading one of the output ports O(0) to O(7) for a leading vector signal and a port interval of the output ports through which the remaining vector signals are fed, if the vector signals are memorized in the memory 52 in the manner described with reference to FIG. 2.

Under the circumstances, the control circuit 56 is supplied from the central processing unit 51 with a leading output port signal B and with a port interval signal D representative of the above-mentioned interval of the output ports. The leading output port signal B is representative of the number of the leading output port to which the input port I(0) is to be connected. The leading output port signal B serves as reference information while the port interval signal D serves as distance information.

Anyway, the leading output port signal B and the port interval signal D can be represented by binary numbers of three bits $b_0 b_1 b_2$ and $d_0 d_1 d_2$, respectively, because the illustrated input and output ports are equal in number to eight, respectively.

Referring to FIG. 19 together with FIG. 16, the control circuit 56 illustrated in FIG. 16 delivers the first through twelfth control signals $S_1$-$S_{12}$ to the switch units $SW_1$ to $SW_{12}$ and the unit control signal E to the first and second rearranging units 106 and 107 by carrying out logic operation in accordance with FIG. 19. Specifically, the unit control signal E takes $(1)_2$ only when the port interval is equal to $(2)_{10}$ and $(6)_{10}$, as shown in FIG. 19(A). Accordingly, the first and second rearranging circuits 106 and 107 rearrange the output ports in the manner described before only when the control circuit 56 is supplied with the port interval signal D of $(2)_{10}$ or $(6)_{10}$.

As shown in FIG. 19(B), the control circuit 56 produces the first through fourth control signals $S_1$ to $S_4$ with reference to the least significant bit $b_2$ of the leading output port signal B when the unit control signal E takes $(0)_2$. On the other hand, the least significant bit but one $b_1$ of the leading output port signal B is referenced by the control circuit 56 when the unit control signal E takes $(1)_2$.

In FIG. 19(C), it is apparent that the fifth through eighth control signals $S_5$ to $S_8$ are produced with reference to the port interval signal D, bit pairs $b_0 b_1$ and $b_1 b_2$ of the leading output port signal B, and the unit control signal E.

Likewise, the ninth through twelfth control signals $S_9$ to $S_{12}$ are produced with reference to the port interval D, three bits $b_0 b_1 b_2$ of the leading output signal B, and the unit control signal E, as shown in FIG. 19(D). In FIG. 19(D), the ninth through twelfth control signals $S_9$ to $S_{12}$ are determined by $b_2$ of the leading output port signal B when the unit control signal E takes $(1)_2$.

Figure 20:
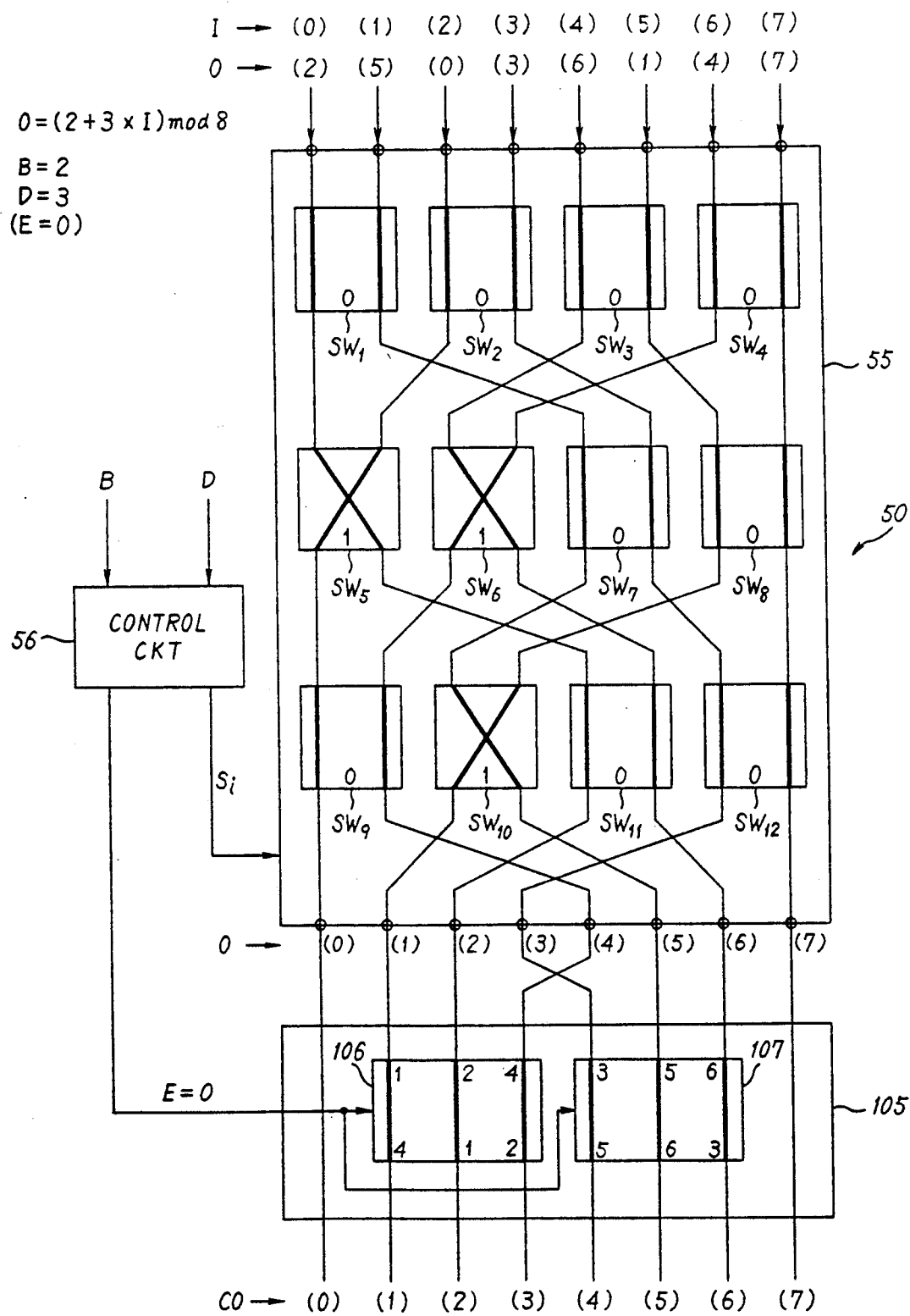
FIG. 20 is a block diagram for use in describing operation of the circuit arrangement illustrated in FIG. 16.

Referring to FIG. 20 together with FIGS. 16 and 19, it is assumed that the leading output port (B) is the number 10 of the output port O(2) and that the port interval (D) is equal to $(3)_{10}$, namely, $(011)_2$. In this case, the input ports I(0) to I(7) are to be linked to the output ports O(2), O(5), O(0), O(3), O(6), O(1), O(4), and O(7), respectively, because a relationship between the input ports I and the output ports O is given by:

$$O = (2 + I \times 3) \mod 8, \qquad (1)$$

and, therefore, $$O = (2 + I \times 3) \mod 8.$$

The unit control signal E takes $(0)_2$ because $D = (3)_{10}$, as shown in FIG. 19(A). In addition, three bits $b_0 b_1 b_2$ of the leading output port B are represented by $(010)_2$. Accordingly, the first through fourth control signals $S_1$ to $S_4$ take $(0)_2$, as shown in FIG. 19(B). Inasmuch as the two lower bits $b_1 b_2$ of the leading output port B are equal to $(10)_2$, namely, $(2)_{10}$, the fifth and sixth control signals take $(1)_2$ while the seventh and eighth control signals $S_7$ and $S_8$ are equal to $\bar{d}_1$, namely, $(0)_2$, as seen from FIG. 19(C).

Likewise, the ninth through twelfth control signals $S_9$ to $S_{12}$ are given by $\bar{d}_1$, $\bar{d}_0$, 0, and $d_0$, as illustrated in FIG. 19(D) and therefore take $(0)_2$, $(1)_2$, $(0)_2$, and $(0)_2$, respectively.

The first through twelfth control signals $S_1$ to twelfth switch units $SW_1$ to $SW_{12}$, respectively. Consequently, the first through twelfth switch units $SW_1$ to $SW_{12}$ are internally connected in the manner illustrated in FIG. 20.

On the other hand, the first rearranging unit 106 connects the output ports O(1), O(2), and O(4) to the circuit output ports CO(1), CO(2), and CO(4), respectively, in response to the unit control signal E of $(0)_2$. Likewise, the output ports O(3), O(5), and O(6) are connected to the circuit output ports CO(3), CO(5), and CO(6) through the second rearranging unit 107, respectively.

As shown in FIG. 20, the input ports I(0) to I(7) are certainly connected to CO(2), CO(5), CO(0), CO(3), CO(6), CO(1), CO(4), and CO(7), respectively. Thus, eight input ports can simultaneously be switched to eight circuit output ports in the illustrated circuit arrangement 50. Similar operation is possible when the port interval (D) is equal to any other odd numbers, such as 1, 5, and 7.

Figure 21:
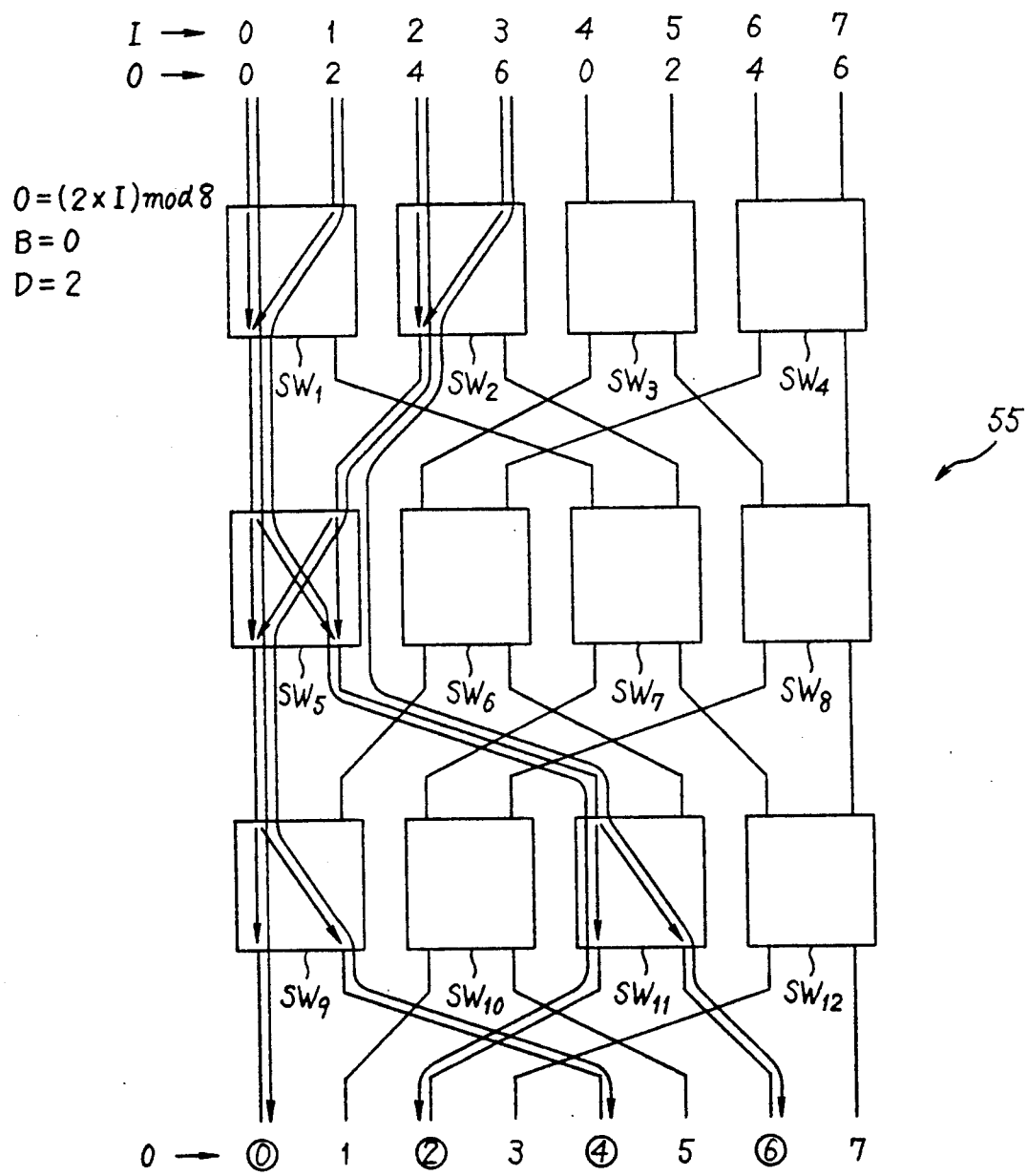
FIG. 21 is a block diagram for use in describing an objectionable conflict of internal paths occurring in a switching network on a predetermined condition.

Referring to FIG. 21, a description follows about the operation of the switching network 55 which is carried out when the port interval (D) is equal to even numbers, such as 2, 6. Let the leading output port (B) be $(0)_{10}$ and the port interval (D) be equal to $(2)_{10}$. In this event, the input ports I(4) to I(7) must be connected to the output ports common to the input ports I(0) to I(4), respectively. Therefore, the input ports I(4) to I(7) cannot be connected to the output ports in question simultaneously with the input ports I(0) to I(3). Under the circumstances, it is understood that only four input ports are available when the port interval D is equal to $(2)_{10}$.

In FIG. 21, the input port I(0) is linked to the output port O(0) through an internal path formed by the first switch unit $SW_1$, the fifth switch unit $SW_5$, and the ninth switch unit $SW_9$.

For connection of the input port I(1) to the output port O(2), an internal path must be formed between the input port I(1) and the output port O(4) through the first, fifth, and eleventh switch units $SW_1$, $SW_5$, and $SW_{11}$. As shown in FIG. 21, the internal path for the input port I(1) conflicts with the internal path for the input port I(0).

Similarly, internal paths for the input ports I(2) and I(3) conflict with each other at the second switch unit $SW_2$ and with the internal paths for the input ports I(0) and I(1) at the fifth switch unit $SW_5$ and the eleventh switch unit $SW_{11}$, as illustrated in FIG. 21.

The switch units can not be operated with the occurrence of a conflict.

Figure 22:
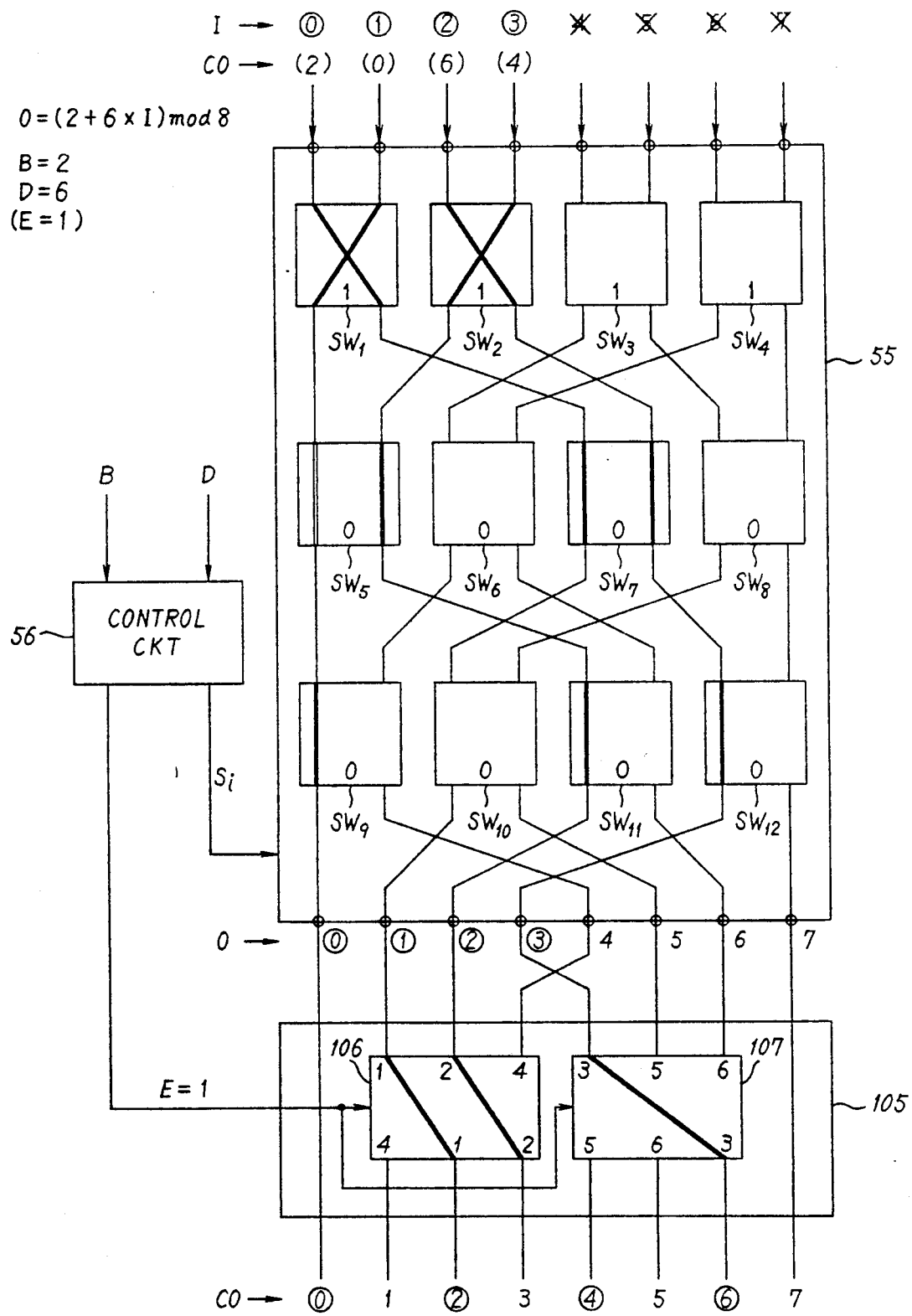
FIG. 22 is a block diagram for use in describing that operation of the circuit arrangement illustrated in FIG. 16 which is carried out on the predetermined condition.

Referring to FIG. 22, it will be proved that four internal paths can be formed in the circuit arrangement 50 illustrated in FIG. 16 without any conflict of the internal paths even when the port interval (D) is equal to $(2)_{10}$ or $(6)_{10}$.

In FIG. 22, let the leading output port B be $(2)_{10}$, namely, $(10)_2$, and the port interval (D) be equal to $(6)_{10}$, namely, $(110)_2$. As mentioned before, only the input ports I(0) to I(3) are accessed to form the four internal paths. In this case, the unit control signal E takes $(1)_2$, as shown in FIG. 19(A). According to Equation (1), the input ports I(0) to I(3) have to be connected to the circuit output ports CO(2), CO(0), CO(6), and CO(4), respectively.

As shown in FIGS. 19(B), (C), and (D), the first through fourth control signals $S_1$ to $S_4$ and the fifth through eighth control signals $S_5$ to $S_8$ are produced as the bit $b_1$ and the bits $b_0 b_1$ of the leading output port signal B, respectively, when E=1. From this fact, it is seen that the three bits of the leading output port signal B are shifted by one bit leftwards and that the leading output port number is divided by two into a half number of the leading output port number. This applies to the port interval (D), as shown in FIG. 19(C). Accordingly, the bits $d_2$, $d_1$, $b_1$, and $b_2$ are changed or adjusted to $d_1$, $d_0$, $b_0$, and $b_1$, respectively. The adjustment of the leading output port signal B and the port interval signal D enables similar operation to the case where the port interval (D) is equal to an odd number and therefore serves to avoid the conflict of the internal paths.

Under the circumstances, only the first and second switch units $SW_1$ and $SW_2$ are connected to the input ports I(0) to I(3) and controlled by the first and second control signals $S_1$ and $S_2$ produced in the manner illustrated in FIG. 19(B). The first and second control signals $S_1$ and $S_2$ take (1) because $E=(1)_2$ and $b_1=(1)_2$. Each of the third and fourth control signals $S_3$ and $S_4$ is identical with the first and second control signals $S_1$ and $S_2$ but it may be neglected in FIG. 22.

The fifth through eighth control signals $S_5$ to $S_8$ are produced with reference to two bits $b_0 b_1$ of the leading output port signal B and the bit $d_0$ of the port interval signal D in the manner shown in FIG. 19(C). Accordingly, the fifth and sixth control signals $S_5$ and $S_6$ are specified by $\bar{d}_0$ and take $(0)_2$. The seventh and eighth control signals $S_7$ and $S_8$ are specified by The ninth through twelfth control signals $S_9$ to $S_{12}$ are determined by the bit $b_2$ of the leading output port signal B and are therefore equal to $(0)_2$, as shown in FIG. 19(D).

Thus, the input ports I(0) to I(3) are linked to the output ports O(1), O(0), O(3), and O(2) through the internal paths, respectively, in response to the above-mentioned first through twelfth control signals $S_1$ to $S_{12}$.

It is to be noted here that a half (O(0) to O(3)) of the output ports O(0) to O(7) is collectively used when the leading output port is represented by an even number. On the other hand, the remaining half of the output ports O(4) to O(7) are collectively connected to the input ports when the leading output port is represented by an odd number. This is because the ninth through twelfth control signals $S_9$ to $S_{12}$ are determined by $b_2$ of the leading output port signal B.

Thus, the internal paths are converged into a half of the output ports O(0) to O(7) in accordance with the bit $b_2$ of the leading output port signal B when E=1.

In FIG. 22, the first and second rearranging units 106 and 107 are controlled in response to the unit control signal E of $(1)_2$ to rearrange the output ports O(1), O(2), and O(4) and O(3), O(5), and O(6) in the manner described before. Therefore, the output ports I(0) to I(3) are linked to the circuit output ports CO(0), CO(2), CO(4), and CO(6), respectively, as illustrated in FIG. 22. As a result, the input ports I(0) to I(3) are connected to the circuit output ports CO(2), CO(0), CO(6), and CO(4), respectively.

Similar operation is possible when the port interval is equal to $(2)_{10}$. Thus, the four input ports can concurrently be connected to the circuit output ports without any conflict even when the port interval (D) is equal to $(2)_{10}$ or $(6)_{10}$.

It will be understood from FIG. 19 that the input port I(0) alone is connected to a desired one of the circuit output ports CO(0) to CO(7) when D=0 or connect two input ports to desired circuit output ports by preparing an additional pattern for rearrangement of each rearranging unit along with the above-mentioned rearrangement pattern and by adjusting internal paths of the switching unit 55 in compliance with the additional pattern.

Figure 23:
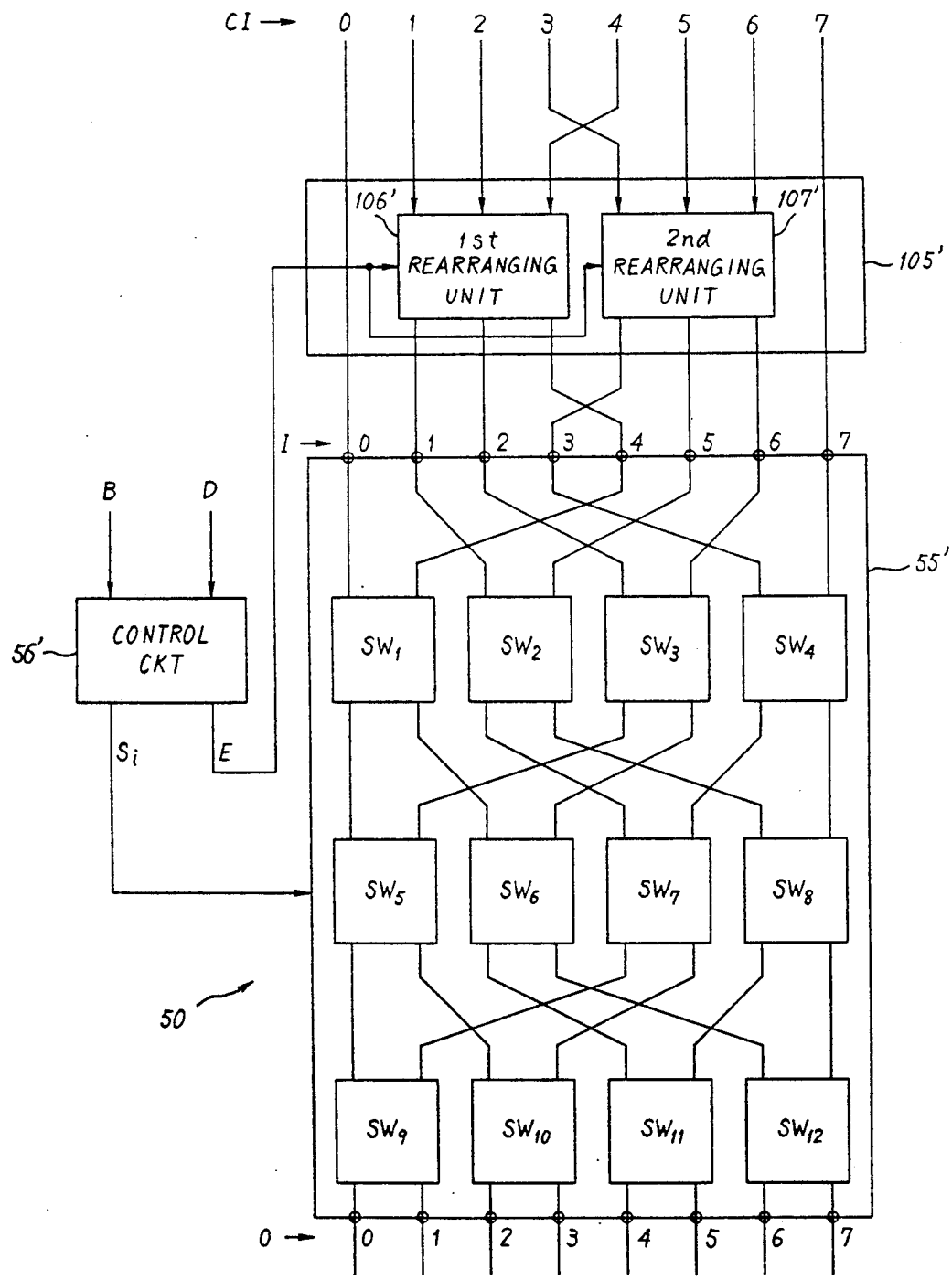
FIG. 23 is a block diagram of a circuit arrangement according to a third embodiment of this invention.

Referring to FIG. 23, a circuit arrangement according to a third embodiment of this invention is similar to that illustrated in FIG. 16 except that a rearranging circuit depicted at 105' is intermediate between the circuit input ports CI(0) to CI(7) and the input ports I(0) to I(7) and that a switching network 55' and a control signal 56' are somewhat different from those illustrated in FIG. 16, as will become clear as the description proceeds. The switching network 55' is equivalent to the switching network 55 (FIG. 1) wherein the input ports and the output ports are upset relative to each other. The switching network 55' comprises first through twelfth switch units $SW_1$ to $SW_{12}$ which are divided into first, second, and third stages in a manner similar to that illustrated in FIG. 1.

In FIG. 23, the output ports O(0) to O(7) are directly connected to the circuit output ports CO(0) to CO(7) which are omitted from FIG. 23, respectively. The first switch unit $SW_1$ is connected to the input ports I(0) and I(4) while the second switch unit $SW_2$ is connected to the input ports I(1) and I(5). Likewise, the third and fourth switch units $SW_3$ and $SW_4$ are connected to the input ports I(2) and I(6) and the input ports I(3) and I(7), respectively. The first through fourth switch units $SW_1$ to $SW_4$ (FIG. 23) may be made to correspond to the ninth through twelfth switch units $SW_9$ to $SW_{12}$ illustrated in FIG. 1 while the ninth through twelfth switch units $SW_9$ to $SW_{12}$ (FIG. 23) may be made to correspond to the first through fourth switch units $SW_1$ to $SW_4$ illustrated in FIG. 1.

Therefore, connections between the first and the second stages of switch units illustrated in FIG. 23 are equivalent to those between the third and second stages of the switch units illustrated in FIG. 1. Similarly, connections between the second and third stages of the switch units illustrated in FIG. 23 are equivalent to those between the second and first stages of switch units illustrated in FIG. 1.

In FIG. 23, the rearranging circuit 105' comprises first and second rearranging units 106' and 107', which are operable in response to the unit control signal E like the rearranging units 106 and 107 illustrated in FIG. 16. In short, when each circuit input port number is represented by a binary representation of three bits $A_0A_1A_2$, each rearranging unit connects the circuit input ports of $A_0A_1A_2$ to the input ports represented by $A_0A_1A_2$, respectively, when the unit control signal E takes $(0)_2$. Otherwise, the rearranging units 106' and 107' connect the circuit input ports of $A_0A_1A_2$ to the input ports represented by $A_2A_0A_1$. As a result, an arrangement or order of the circuit input port numbers 0 to 7 is rearranged by the first and second rearranging units 106' and 107'.

When the unit control signal E takes $(1)_2$, the input ports I(1), I(2), and I(4) are connected to the circuit input ports CI(2), CI(4), and CI(1) by the first rearranging unit 106', respectively, while the input ports I(3), I(5), and I(6) are connected to the circuit input ports CI(6), CI(5), and CI(5) by the second rearranging unit 107', respectively.

Each rearranging unit 106' and 107' can be realized by a logic circuit similar to that illustrated in FIG. 18.

It is mentioned here that the illustrated control circuit 56' is supplied from the central processing unit (not shown in this figure) with a leading input port signal which is representative of a leading input port number and which is depicted at B. The leading input port number is assigned to a leading one of the circuit input ports that is to be connected to the output port O(0) and that is supplied with a leading one of a vector signal sequence. In addition, the control circuit 56' is also given a port interval signal representative of an input port interval at which the input ports are accessed or selected. The input port interval is usually equal to an output port interval at which the output ports are selected. The input port interval is given as a port interval signal depicted at D.

In the example being illustrated, the leading input port signal B and the port interval signal D are represented in the form of $b_0b_1b_2$ and $d_0d_1d_2$, respectively, like in FIGS. 1 and 16, because each of the circuit input and output ports, namely, the input and the output ports is equal in number to eight.

Referring to FIG. 24 together with FIG. 23, the illustrated control circuit 56' delivers first through twelfth control signals $S_1$ to $S_{12}$ and a unit control signal E to the first through twelfth switch units $SW_1$ with algorithm shown in FIG. 24. As shown in FIG. 24(A), the unit control signal E takes $(1)_2$ only when the port interval D is equal to $(2)_{10}$ or $(6)_{10}$, like in FIG. 19(A) The first through fourth control signals $S_1$ to $S_4$ (FIG. 24(B)) are similar to the ninth through twelfth control signals $S_9$ to $S_{12}$ illustrated in FIG. 19(D), respectively. Likewise, the fifth through eighth control signals $S_5$ to $S_8$ and the ninth through twelfth control signals $S_9$ to $S_{12}$ (FIGS. 24(C) and (D)) are similar to the fifth through eighth control signals $S_5$ to $S_8$ (FIG. 19(C)) and to the first through fourth control signals $S_1$ to $S_4$ (FIG. 19(D)), respectively.

Therefore, the first through twelfth control signals $S_1$ to $S_{12}$ (FIG. 24) will not be described in detail any longer.

The circuit arrangement 50 illustrated in FIG. 23 is operable in a manner similar to that illustrated in FIG. 16. For example, let the leading input port signal B be $(2)_{10}$, namely, $(010)_2$ and the port interval signal D be representative of $(3)_{10}$, namely, $(011)_2$. Inasmuch as a relationship between the circuit input ports CI and the output ports O is given by:

$$I=(B+D\times O) \bmod 8, \qquad (2)$$

the output ports O(0) to O(7) are to be connected to the circuit input ports I(2), I(5), I(0), I(3), I(6), I(1), I(4), and I(7) in order, respectively.

Responsive to the leading input port signal B of $(010)_2$ and the port interval signal D of $(011)_2$, the control circuit 56' carries out calculation in compliance with the algorithm shown in FIG. 24 to produce the unit control signal E and the first through twelfth control signals $S_1$ to $S_{12}$. As readily understood from FIG. 24, the unit control signal E takes $(0)_2$ while the first through fourth control signals $S_1$ to $S_4$ are equal to $(0100)_2$, respectively. Likewise, the fifth and sixth control signals $S_5$ and $S_6$ are equal to $(1)_2$ while the seventh and eighth control signals $S_7$ and $S_8$ are equal to $(0)_2$, as seen from FIG. 24(C). The ninth through twelfth control signals $S_9$ to $S_{12}$ are equal to $(0)_2$.

Figure 25:
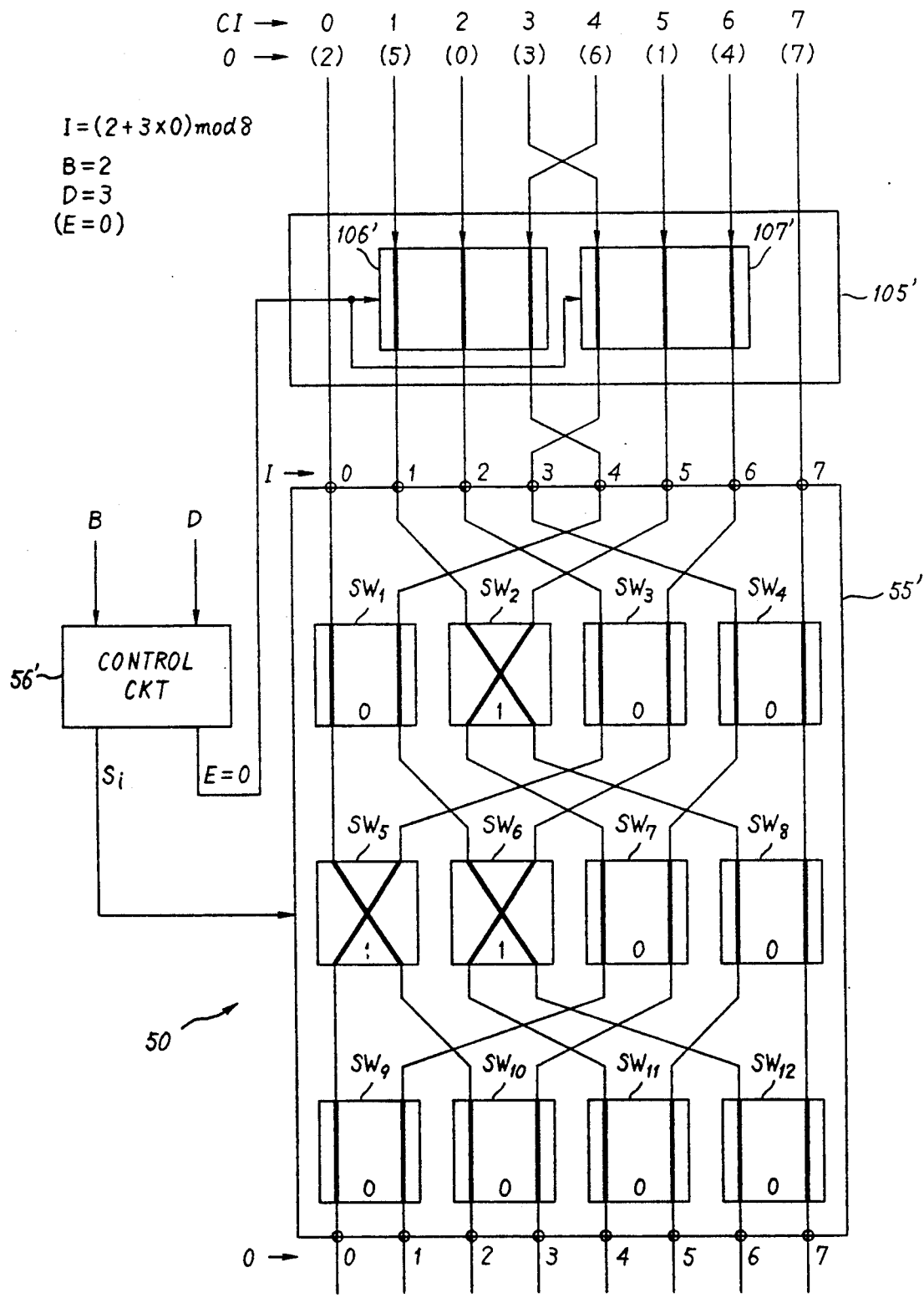
FIG. 25 is a block diagram for use in describing internal paths formed in the circuit arrangement illustrated in FIG. 23 on a preselected condition.

Referring to FIG. 25, the rearranging circuit 105' and the switching unit 55' form internal paths in response to the unit control signal E of $(0)_2$ and the above-mentioned first through twelfth control signals $S_1$ to $S_{12}$ of $(0100)_2$, $(1100)_2$, and $(0000)_2$, respectively. Since the unit control signal E is equal to $(0)_2$, the first and second rearranging units 106' and 107' connect the circuit input ports CI(1), (2), and (4) and (3), (5), and (6) to the corresponding input ports I(1), (2), and (4) and (3), (5), and (6), respectively.

As shown in FIG. 25, the output ports O(0) to O(7) are certainly linked to the circuit input ports I(2), I(5), I(0), I(3), I(6), I(1), I(4), and I(7), respectively. Similar connection of the eight output ports can be carried out when the port interval is represented by an odd number, such as 1, 5, and 7, irrespective of the leading input port number (B).

It is noted here that, when the port interval (D) is equal to an even number, any conflict of internal paths objectionably occurs in the switching circuit 55 (FIG. 23) in a manner similar to that illustrated in conjunction with FIG. 21. However, such an objectionable conflict can be avoided by the help of the rearranging circuit 105'. In this case, four of the output ports simultaneously become usable as is the case with FIG. 22.

Figure 26:
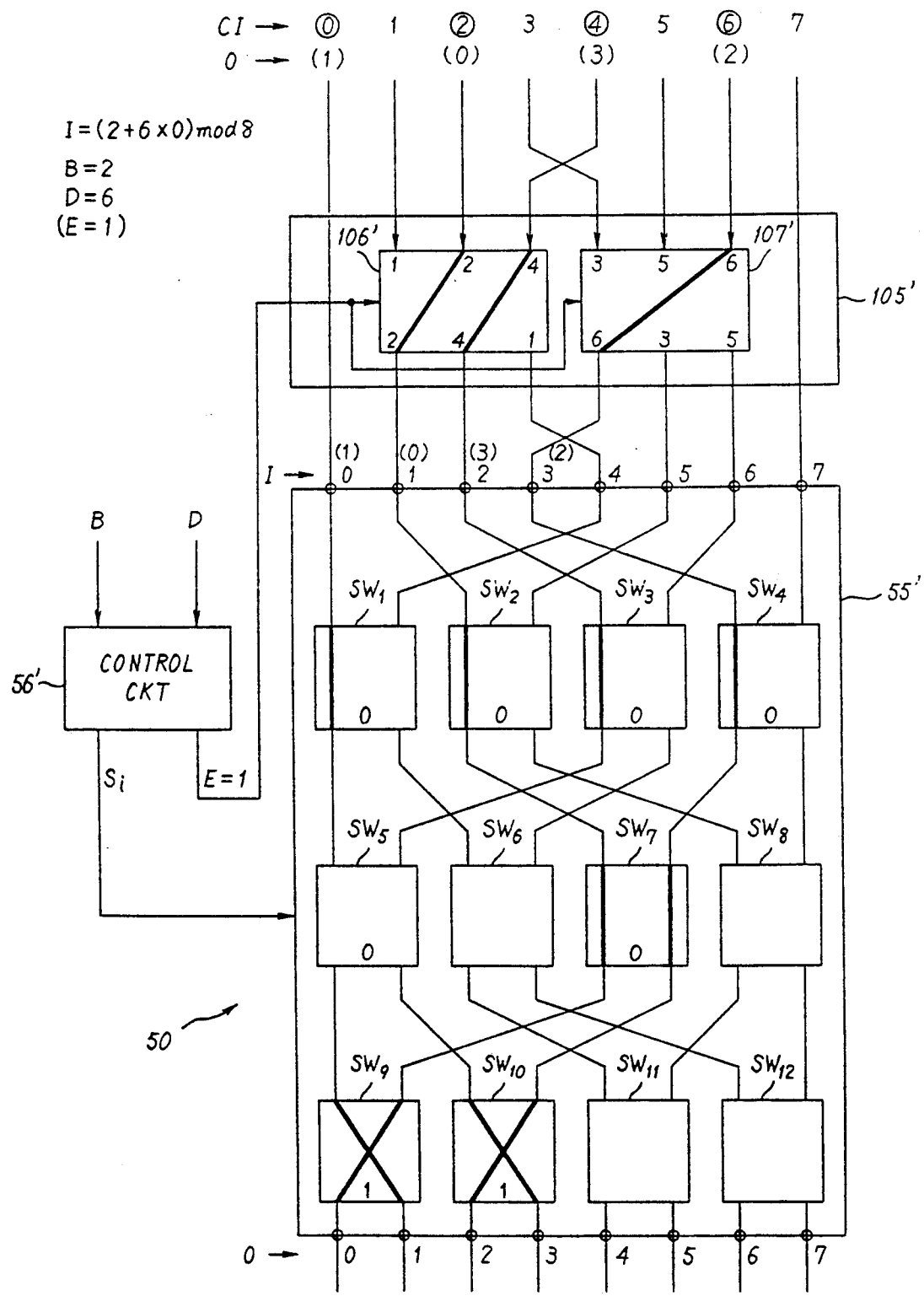
FIG. 26 is a block diagram for use in describing internal paths formed on another condition.

Referring to FIG. 26, it is assumed that the leading input port signal B is indicative of $(2)_{10}$, namely, $(010)_2$ and the port interval signal D is indicative of $(6)_{10}$, namely, $(110)_2$. In this case, the circuit input ports are indicated in the order of I(2), I(0), I(6), and I(4) which are to be connected to the output ports O(0) through O(3), respectively. Responsive to the port interval signal D of $(6)_{10}$, the first and second rearranging units 106' and 107' are switched to rearrange connections between the circuit input ports CI(1), (2), and (4) and CI(3), (5) and (6), respectively, in the manner described in conjunction with FIG. 23.

In FIG. 26, the circuit input ports CI(2), CI(4), and CI(6) in question are connected to the respective input ports I(1), I(2), and I(3) through the first and second rearranging units 106' and 107', as depicted at thick lines in FIG. 26 while the circuit input ports CI(1), CI(3), and CI(5) are connected through the first through second rearranging units 106' and 107' to the respective input ports I(4), I(5), and I(6), although not shown in FIG. 26. Thus, the rearranging circuit 105' serves to converge even number ports of the circuit input ports into the input ports I(0) to I(3) and to converge odd number ports of the circuit input ports into the input ports I(4) to I(7).

This means that, when the leading input port number is an even number, the input ports I(0) to I(3) become available and, otherwise, the input ports I(4) to I(7) become available.

The control circuit 56' processes the leading input port signal B and the port interval signal D by recognizing B and D as B/2 and D/2, respectively, like the control circuit 56 illustrated in FIG. 16.

Anyway, the control circuit 56' supplies the first through twelfth switch units $SW_1$ to $SW_{12}$ with the first through twelfth control signals $S_1$ to $S_{12}$ which are equal to $(0000)_2$, $(0000)_2$, and $(1111)_2$, respectively. As a result, four of the circuit input ports can simultaneously be connected to four of the output ports O(0) to O(4) even when the port interval (D) is equal to $(2)_{10}$ or $(6)_{10}$.

When the port interval (D) is equal to $(0)_{10}$ or $(4)_{10}$, a single one of the input ports I(0) to I(7) alone becomes available and can be connected to the output port O(0). However, it is possible to simultaneously connect two input ports to two of the output ports O(0) and O(1) in a manner similar to that described in conjunction with FIG. 16 even when the port interval (D) is equal to $(4)_{10}$.

Figure 27:
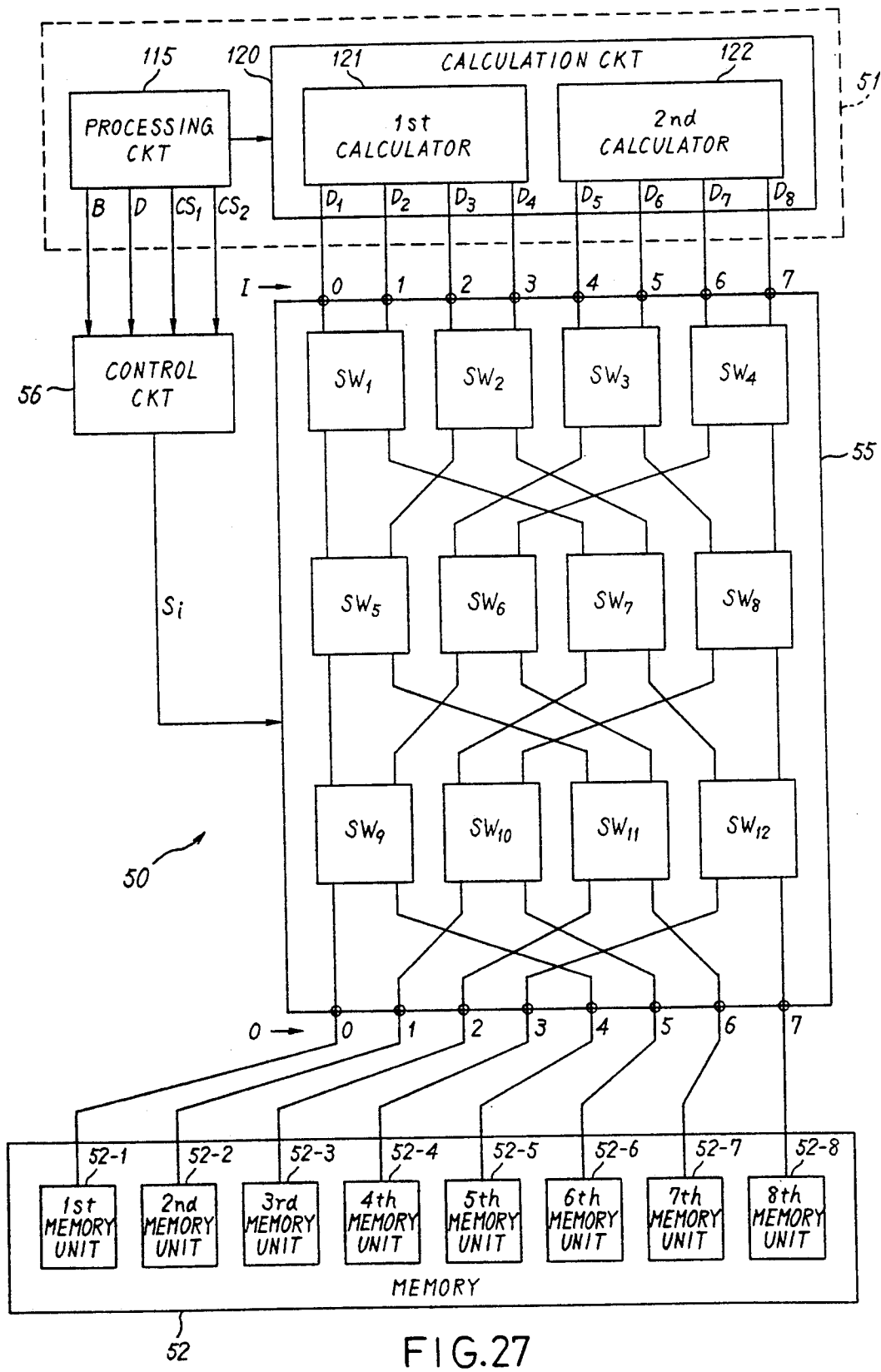
FIG. 27 is a block diagram of a circuit arrangement according to a fourth embodiment of this invention.

Referring to FIG. 27, a circuit arrangement according to a fourth embodiment of this invention is similar to that illustrated in FIG. 1 except that the illustrated central processing unit 51 and control circuit 56 are operated in a different manner from those illustrated in FIG. 1.

In FIG. 27, the central processing unit 51 comprises a processing circuit 115 and a calculation circuit 120 operable in cooperation with the processing unit 115. The calculation circuit 120 comprises first and second calculators 121 and 122 both of which can be put into an active state or each of which can individually be put into the active state. Each of the first and second calculators 121 and 122 carries out calculation in a manner similar to each other in the active state to simultaneously produce four array elements in parallel. The four array elements may be, for example, vector elements and are assumed to be delivered through the circuit arrangement 50 to the first through eighth memory units 52-1 to 52-8 to which memory addresses are assigned in the manner illustrated in FIG. 2(A). Like in FIGS. 1 and 2, the array elements are memorized in the memory units 52-1 to 52-8 at a predetermined address distance which may be called an element distance.

The input ports I(0) to I(3) of the switching network 55 are supplied from the first calculator 121 with the four array elements in the order assigned to them while the remaining input ports I(4) to I(7) are supplied from the second calculator 122 with the four array elements in a like manner.

The processing circuit 115 supplies the control circuit 56 with a leading address signal (depicted at B) specifying a leading address to which a leading one of the array elements is delivered from the first and/or second calculators 121 and 122. Thus, the leading address serves as a reference address and therefore may be referred to as reference information. In addition, the processing circuit 115 gives the control circuit 56 an address distance signal D indicative of the predetermined address distance of each array element from the preceding one of the array elements. Thus, the address distance signal D is representative of a displacement component between two adjacent ones of the array elements and therefore carries displacement information. Like in FIG. 1, the leading address signal B and the address distance signal D may be specified by three bits and are represented by $b_0b_1b_2$ and $d_0d_1d_2$, respectively.

Furthermore, the illustrated processing circuit 115 produces first and second condition signals $CS_1$ and $CS_2$ for standing for conditions or situations of the first and second calculators 121 and 122. Specifically, the first condition signal $CS_1$ specifies active one or ones of the first and second calculators 121 and 122 by two bits. In this connection, the first condition signal $CS_1$ takes $(11)_2$ when both the first and second calculators 121 and 122 are in the active states. On the other hand, the first condition signal $CS_1$ takes $(10)_2$ when the first calculator 121 alone is active while it takes $(01)_2$ when the second calculator 122 alone is active. Thus, the first condition signal $CS_1$ is indicative of a structure of the calculation circuit 120 and 122 and therefore conveys structural information concerned with the calculation circuit 120.

If each of the first and second calculators 121 and 122 is singly put into the active state, the memory 52 may be accessed two times by such a single calculator to deliver the eight array elements from the single calculator to the first through eighth memory units 52-1 to 52-8, respectively. In this connection, the second condition signal $CS_2$ is representative of the number of times or a repetition of accesses and is therefore valid only when a single one of the first and second calculators 121 and 122 is in the active state. In other words, the second condition signal $CS_2$ is neglected when the first condition signal $CS_1$ takes $(11)_2$.

Figure 28:
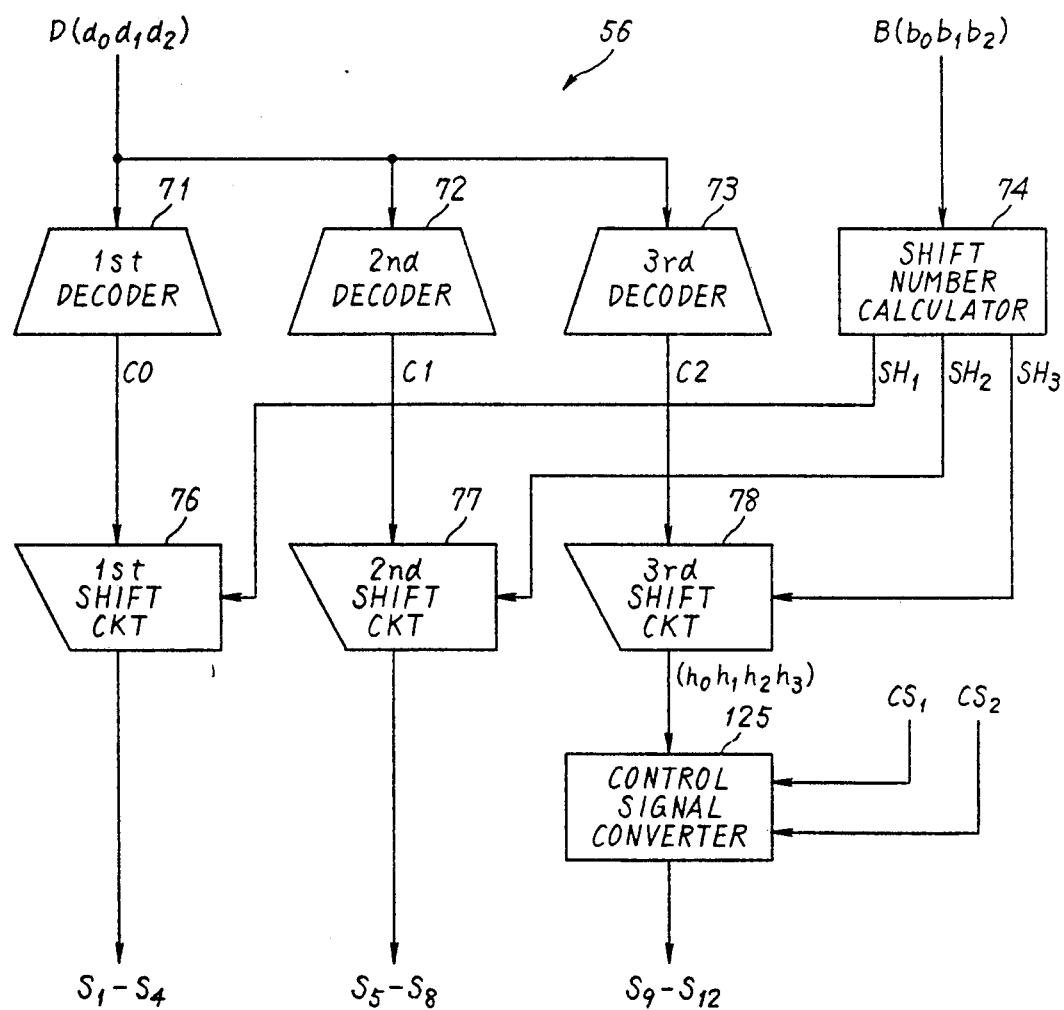
FIG. 28 is a block diagram of a control circuit for use in the circuit arrangement illustrated in FIG. 27.

Referring to FIGS. 28 and 29 together with FIG. 27, the control circuit 56 is similar in structure to that illustrated in FIG. 5 except that the third shift circuit 77 is connected to a control signal converter 125 operable in response to the first and second control signals $CS_1$ and $CS_2$. As mentioned with reference to FIGS. 3, 5, and 10, the third shift circuit 78 produces an output signal of four bits $(h_0h_1h_2h_3)_2$ which are arranged from the most significant bit $h_0$ to the least significant bit $h_3$ and which are successively delivered to the ninth through twelfth control signals $SW_9$ to $SW_{12}$ in order, respectively. The control signal converter 125 is operable to convert the four bits $h_0h_1h_2h_3$ of the output signal sent from the third shift circuit 77 to the ninth through twelfth control signals $S_9$ to $S_{12}$ in compliance with a conversion logic shown in FIG. 29.

As shown in FIG. 29, the four bits $h_0h_1h_2h_3$ of the output signal of the third shift circuit 78 are produced as the ninth through twelfth control signals $S_9$ to $S_{12}$ as they stand when the first condition signal $CS_1$ takes $(11)_2$. On the other hand, the four bits $h_0h_1h_2h_3$ are reversed in polarity to be produced as the ninth through twelfth control signals $S_9$ to $S_{12}$ when the first condition signal $CS_1$ takes $(10)_2$ or $(01)_2$.

In FIGS. 27 and 28, let the leading address signal B specify the second address $(2)_{10}$, namely, $(010)_2$ and the address distance signal D be indicative of the address distance of $(3)_{10}$, namely, $(011)_2$. In addition, the first condition signal $CS_1$ is assumed to be equal to $(11)_2$. Furthermore, it is surmised that the first calculator 121 delivers four array elements (depicted at $D_1$ to $D_4$) to the input ports I(0) to I(3) of the switching network 55, respectively, and that the second calculator 122 also delivers four array elements (depicted at $D_5$ to $D_8$) to the respective input ports I(4) to I(7).

In this event, the eight array elements $D_1$ to $D_8$ are to be stored in a sequence of addresses 2, 5, 8, 11, 14, 17, 20, and 23 which are allocated to the respective memory units 52-3, 52-6, 52-1, 52-4, 52-7, 52-2, 52-5, and 52-8, as seen from FIG. 2(A). Therefore, the input ports I(0) to I(7) are to be connected through the switching network 55 to the respective output ports O(2), O(5), O(0), O(3), O(6), O(1), O(4), and O(7).

The control circuit 56 illustrated in FIGS. 27 and 28 is operable in response to the leading address signal B, the address distance signal D, and the first and second condition signals $CS_1$ and $CS_2$. Inasmuch as the first condition signal $CS_1$ take $(11)_2$, the second condition signal $CS_2$ may be left out of consideration, as mentioned before.

The address distance signal D is delivered to the first through third decoders 71 to 73 which produce the first decoded signal C0 of two bits $C0_0$ and $C0_1$, the second decoded signal C1 of five bits $C1_0$, $C1_1$, $C1_2$, $C1_3$, and $C1_4$, and the third decoded signal C2 of eleven bits $C2_0$ to $C2_{10}$, as shown in FIG. 6. In the example being illustrated, the two bits $C0_0$ and $C0_1$ of the first decoded signal C0 take $(10)_2$. Since the address distance (D) is equal to $(011)_2$, the five bits $C1_0$ to $C1_4$ of the second decoded signal C1 take $(11001)_2$, respectively, while the eleven bits $C2_0$ to $C2_{10}$ take $(01011010010)_2$, respectively, as readily understood from FIGS. 6 and 7.

The above-mentioned first through third decoded signals C0, C1, and C2 are sent to the first through third shift circuits 76 to 78 which are supplied from the shift number calculator 74 with the first through third shift signals $SH_1$ to $SH_3$, respectively. In the example being illustrated, the first through third shift signals $SH_1$ to $SH_3$ are represented by $(0)_2$, $(10)_2$, and $(010)_2$, respectively, because the address distance (D) is equal to $(010)_2$.

Under the circumstances, the first shift circuit 76 produces the logic "0" level signal as the first through fourth control signals $S_1$ to $S_4$ by selecting the bit $C0_1$ of the first decoded signal C0, as seen from FIG. 8. The second shift circuit 77 produces the logic "1" level signal as the fifth and sixth control signals $S_5$ and $S_6$ and the logic "0" level signal as the seventh and eighth control signals $S_7$ and $S_8$ by selecting the bits $C1_1$ and $C1_2$, respectively, in the manner described with reference to FIG. 9.

The third shift circuit 78 selects the four bits $C2_5$, $C2_6$, $C2_7$, and $C2_8$ of the third decoded signal C2 in the manner described in conjunction with FIGS. 7(C) and 10. The above-mentioned four bits take $(0100)_2$ when the address distance (D) is equal to $(3)_{10}$, as shown in FIG. 7(C), and are produced as the output signal of the four bits $h_0 h_1 h_2 h_3$.

The four bits $h_0 h_1 h_2 h_3$ are sent to the control signal converter 125 responsive to the first and second condition signals $CS_1$ and $CS_2$ As shown in FIG. 29, the control signal converter 125 allows the four bits $h_0 h_1 h_2 h_3$ to pass therethrough as the ninth through twelfth control signals $S_9$ to $S_{12}$ when the first condition signal $CS_1$ takes $(11)_2$. As a result, the ninth through twelfth control signals $S_9$ to $S_{12}$ take $(0100)_2$.

Thus, the first through fourth control signals $S_1$ to $S_4$, the fifth through eighth control signals $S_5$ to $S_8$, and the ninth through twelfth control signals $S_9$ to $S_{12}$ are represented by $(0000)_2$, $(1100)_2$, and $(0100)_2$, respectively.

Figure 30:
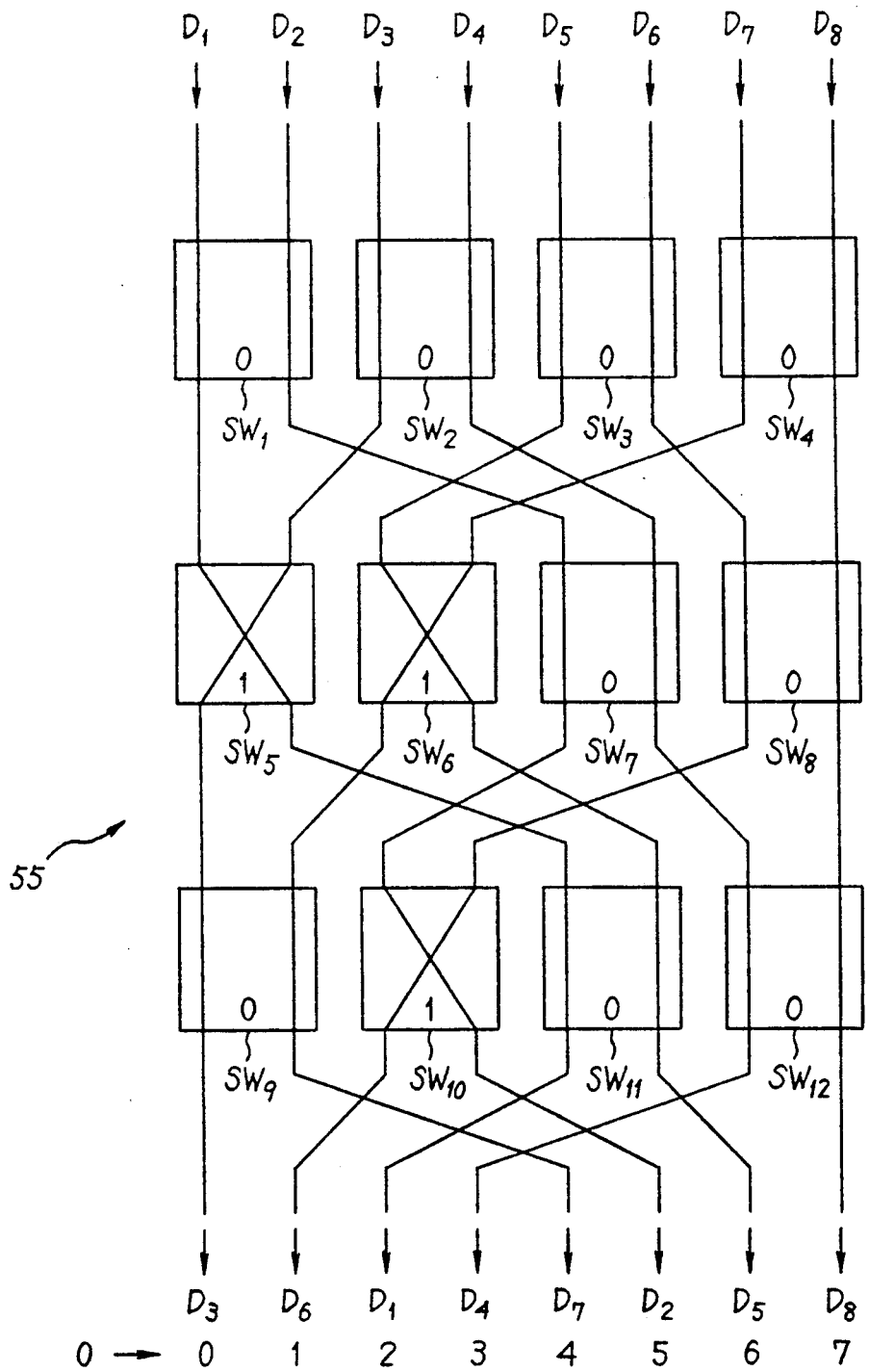
FIG. 30 is a block diagram for use in describing operation of the circuit arrangement which is carried out on a prescribed condition.

Referring to FIG. 30, the switching network 55 forms internal paths in response to the first through twelfth control signals $S_1$ to $S_{12}$ mentioned above. As shown in FIG. 30, the array elements $D_1$ to $D_4$ given from the first calculator 121 (FIG. 27) are delivered to the output ports O(2), O(5), O(0), and O(3), respectively, while the array elements $D_5$ to $D_8$ are delivered to the output ports O(6), O(1), O(4), and O(7), respectively.

Thus, the eight array elements $D_1$ to $D_8$ can certainly be stored in the respective memory addresses 2, 5, 8, 11, 14, 17, 20, and 23 in order.

It is assumed that the first condition signal $CS_1$ takes $(10)_2$ and therefore the first calculator 121 alone is usable. In addition, let the leading address (B) and the address distance (D) be $(2)_{10}$ and $(3)_{10}$ to access the memory addresses 2, 5, 8, 11, 14, 17, 20, and 23, respectively, like in the above-mentioned example.

The first calculator 121 simultaneously produces four array elements one at a time, as mentioned before. Therefore, the first calculator 121 can produce at first four preceding array elements ($D_1$ to $D_4$) to be delivered to the memory addresses 2, 5, 8, and 11 and thereafter produce, for the second time, four succeeding array elements ($D_5$ to $D_8$) to be delivered to the memory addresses 14, 17, 20, and 23, when the second calculator 122 is inactive. Such preceding and succeeding array elements are delivered through the input ports I(0) to I(3) in common.

In this event, the input ports I(0) to I(3) may at first be connected to the output ports O(2), O(5), O(0), and O(3) and thereafter to the output ports O(6), O(1), O(4), and O(7). Thus, only the input ports I(0) to I(3) are enabled in the illustrated example and may be called an enabled input port set. The leading address signal B and the address distance signal D may be invariable on delivery of the preceding and the succeeding array elements. Delivery of the preceding array elements will be referred to as first delivery while delivery of the succeeding array elements, second delivery.

In order to carry out the first and second deliveries, it is necessary to distinguish between the first and second deliveries. The second condition signal $CS_2$ serves to distinguish between the first and second deliveries and takes $(0)_2$ on the first delivery or $(1)_2$ on the second delivery.

In FIG. 28, the first and second control signals $CS_1$ and $CS_2$ are supplied from the processing circuit 115 to the control signal converter 125. On the first delivery of the preceding array elements, the control signal converter 125 produces the four bits $h_0 h_1 h_2 h_3$ of the output signal given from the third decoder 78 because of $CS_2 = (0)_2$ and $CS_1 = (10)_2$. Inasmuch as the four bits $h_0 h_1 h_2 h_3$ are equal to $(0100)_2$ when B=2 and D=3, as mentioned before, the ninth through twelfth control signals $S_9$ to $S_{12}$ are represented by $(0100)_2$, respectively. The remaining first though eighth control signals $S_1$ to $S_8$ are also identical with those described in the above-mentioned example and are represented by $(00001100)_2$. Therefore, the switching network 55 forms internal paths identical with those illustrated in FIG. 30.

On the second delivery of the succeeding array elements, the control signal converter 125 inverts the four bits $h_0 h_1 h_2 h_3$ into $\overline{h_0} \overline{h_1} \overline{h_2} \overline{h_3}$ to produce the four inverted bits as the ninth through twelfth control signals $S_9$ to $S_{12}$. Therefore, the ninth through twelfth control signals $S_9$ to $S_{12}$ are turned into $(1011)_2$, respectively. The first through eighth control signals $S_1$ to $S_8$ are kept unchanged on the second delivery.

Figure 31:
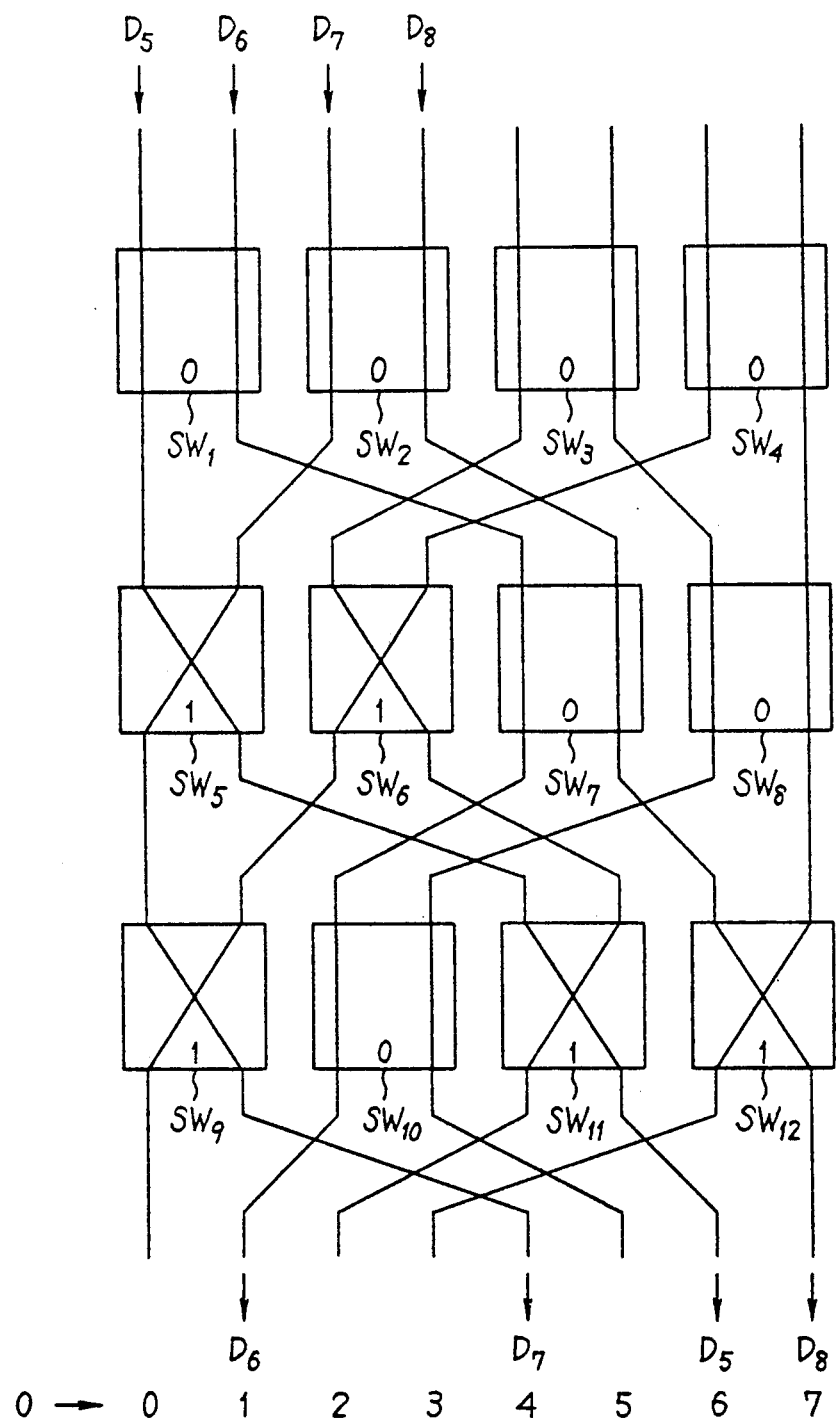
FIG. 31 is a block diagram for use in describing operation of the circuit arrangement which is carried out on another condition.

Referring to FIG. 31, the first through twelfth switch units $S_1$ to $S_{12}$ forms internal paths in response to the above-mentioned first through twelfth control signals $S_1$ to $S_{12}$ on the second delivery of the succeeding array elements $D_5$ to $D_8$. As shown in FIG. 31, paths of the ninth through twelfth switch units $SW_9$ to $SW_{12}$ are switched from those illustrated in FIG. 30 and the four succeeding array elements $D_4$ to $D_7$ are given to the output ports O(6), O(1), O(4), and O(7), respectively.

A similar operation is carried out in accordance with the algorithm illustrated in FIG. 29 when the second condition signal $CS_2$ takes $(01)_2$. For example, if $B=2$ and $D=3$, the internal paths are formed in the switching network 55 in the manner illustrated in FIG. 31 on the first delivery and in the manner illustrated in FIG. 30 on the second delivery.

Thus, the output ports connected to the first calculator 121 alternate with the output ports connected to the second calculator 122, if the leading address (B) and the address interval (D) are invariable.

Figure 32:
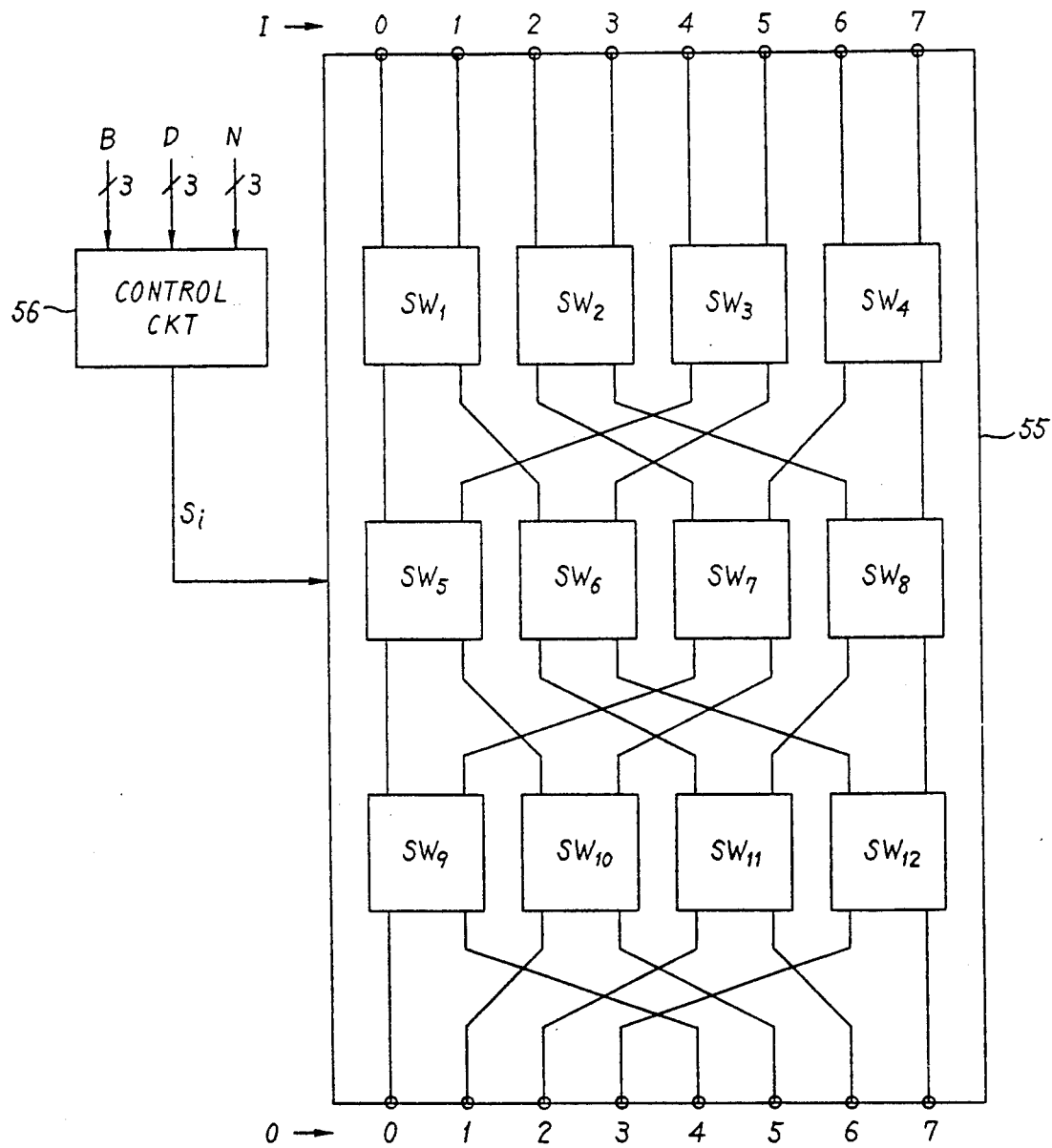
FIG. 32 is a block diagram of a circuit arrangement according to a fifth embodiment of this invention.

Referring to FIG. 32, a circuit arrangement according to a fifth embodiment of this invention is similar to that illustrated in FIG. 1 except that the control circuit 56 (FIG. 32) is operable in response to an input port number signal N, as will presently become clear, in addition to reference or leading information and displacement or distance information. In the example being illustrated, eight array elements can be given to consecutive ones of the input ports I(0) to I(7), respectively, in a manner as exemplified in FIG. 27. A leading one of the array elements is assigned to a leading one of the output ports while two adjacent ones of the array elements are given to two consecutive ones of the input ports and are delivered to two of the output ports remote from each other at a port interval.

Under the circumstances, the reference information is specified by a leading output port number assigned to the leading output port while the distance information is specified by the port interval. The leading output port number and the port interval are given from the central processing unit 51 (not shown in this figure) to the control circuit 56 in the form of a leading port signal B of $b_0b_1b_2$ and a port interval signal D of $d_0d_1d_2$, respectively, as are the cases with the other embodiments.

In this connection, the input port number signal N is indicative of an input port number assigned to an input port which is connected to the leading output port and is represented by a binary representation of three bits $(n_0n_1n_2)_2$.

Figure 33:
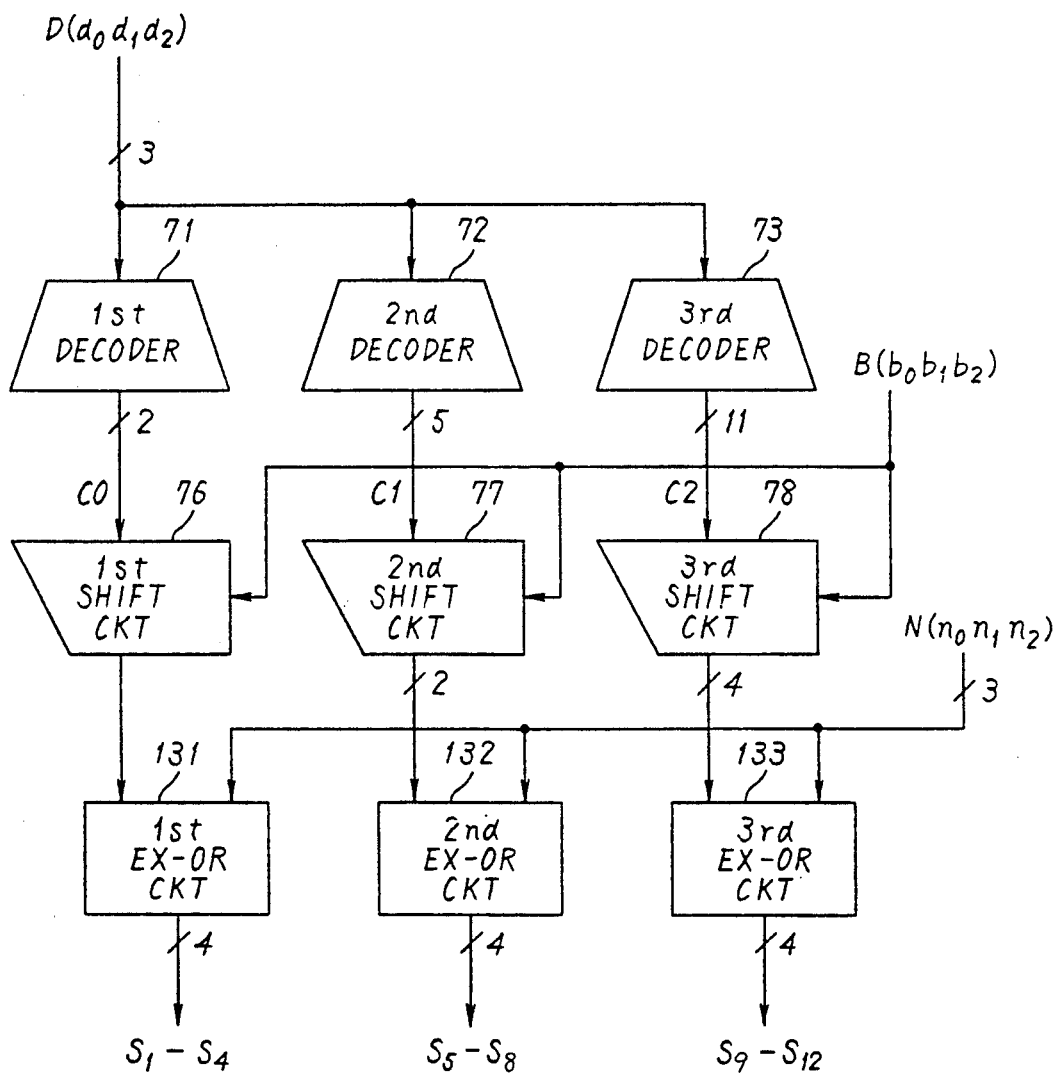
FIG. 33 is a block diagram of a control circuit for use in the circuit arrangement illustrated in FIG. 32.

Referring to FIG. 33 together with FIG. 32, the control circuit 56 is similar to that illustrated in FIG. 5 except that the first through third shift circuits 76 to 78 are connected to first through third Exclusive OR (EX-OR) circuits 131 to 133 and that the shift number calculator 74 (FIG. 5) is removed from FIG. 33. As shown in FIG. 33, the port interval signal D is supplied to the first through third decoders 71 to 73 to be decoded into the first, second, and third decoded signals C0, C1, and C2 in the manner described in conjunction with FIGS. 5 and 6. The first through third decoded signals C0, C1, and C2 are formed by two bits $C0_1$ and $C0_2$, five bits $C1_0$ to $C1_4$, and eleven bits $C2_0$ to $C2_{10}$, respectively.

The first through third shift circuits 76 to 78 select one bit of the first decoded signal C0, two bits of the second decoded signal C1, and four bits of the third decoded signal C2 with reference to the leading output port number represented by the leading port signal B. Such operation of the first through third shift circuits 76 to 78 is similar to that illustrated with reference to FIGS. 7 through 10. At any rate, first through third shift result signals are sent from the first through third shift circuits 76 to 78 to the first through third Exclusive OR circuits 131 to 133, respectively. The first through third shift result signals are similar to the control signals $S_1$ to $S_{12}$ illustrated in conjunction with FIGS. 8 to 10 and may therefore be of a single bit $(x_0)_2$, two bits $(y_0y_1)_2$, and four bits $(z_0z_1z_2z_3)_2$, respectively. The first through third shift result signals may be called first through third intermediate signals and are subjected to further processing by the first through third Exclusive OR circuits 131 to 133, respectively.

Specifically, the first Exclusive OR circuit 131 is supplied with the single bit $x_0$ of the first shift result signal and the least significant bit $n_2$ of the input port number signal N and performs Exclusive OR operation to produce the first through fourth control signals $S_1$ to $S_4$. Accordingly, the first through fourth control signals $S_1$ to $S_4$ are given by:

$$S_i = x_0 \oplus n_2 \qquad (3)$$

where i is representative of either one of 1, 2, 3, and 4. The first through fourth control signals $S_1$ to $S_4$ are delivered to the first through fourth switch units $SW_1$ to $SW_4$ in parallel.

The second Exclusive OR circuit 132 is supplied with the two bits $y_0y_1$ of the second result signal and the least significant bit but one $n_1$ of the input port number signal N to perform Exclusive OR operation and to produce the fifth through eighth control signals $S_5$ to $S_8$ given by:

$$\begin{matrix} S_5, S_6 = y_0 \oplus n_1, \\ \text{and} \\ S_7, S_8 = y_1 \oplus n_1. \end{matrix} \qquad (4)$$

The fifth through eighth control signals $S_5$ to $S_8$ are sent to the fifth through eighth switch units $SW_5$ to $SW_8$ in parallel, respectively.

The third Exclusive OR circuit 133 is operable in response to the four bits $x_0x_1x_2x_3$ and the most significant bit $n_0$ of the input port number signal N to perform Exclusive OR operation and to produce the ninth through twelfth control signals $S_9$ to $S_{12}$ given by:

$$\begin{matrix} S_9 = x_0 \oplus n_0, \\ S_{10} = x_1 \oplus n_0, \\ S_{11} = x_2 \oplus n_0, \\ \text{and} \\ S_{12} = x_3 \oplus n_0. \end{matrix} \qquad (5)$$

The ninth through twelfth control signals $S_9$ to $S_{12}$ are sent to the ninth through twelfth switch units $SW_9$ to $SW_{12}$ in parallel.

Operation of the circuit arrangement illustrated in FIGS. 32 and 33 will be described on condition that the input ports I(0) to I(7) are to be connected to the output ports O(0), O(3), O(6), O(1), O(4), O(7), O(2), and O(5) in order, respectively. Thus, the leading output port O(0) is to be connected to the input port I(0) while the two consecutive ones of the input ports are supplied with two of the array elements which are to be delivered to two of the output ports remote from each other by three. Therefore, the port interval signal D is representative of $(3)_{10}$, namely, $(011)_2$. In this event, the leading port signal B specifies the output port O(0) and is represented by $(000)_2$. Likewise, the input port number signal N specifies the input port I(0) and is therefore represented by $(000)_2$.

Responsive to the port interval signal D, the first through third decoders 71 to 73 produces the first decoded signal C0 of $(10)_2$, the second decoded signal C1 of $(11001)_2$, and the third decoded signal C2 of $(01011010010)_2$ in compliance with the algorithm shown by FIGS. 7(A), (B), and (C). Supplied with the leading port signal B of $(000)_2$, the first through third shift circuits 76 to 78 carry out no shift and select the lower bit $(0)_2$ of the first decoded signal C0, the two lower bits $(01)_2$ of the second decoded signal C1, and the four lower bits $(0010)_2$ of the third decoded signal C2 to produce $(0)_2$, $(01)_2$, and $(0010)_2$ as the first through third intermediate signals, respectively.

The first Exclusive OR circuit 131 carries out calculation of $(0 \oplus 0)$ in accordance with Equation (3) to produce the logic "0" level as the first through fourth control signals $S_1$ to $S_4$.

The second Exclusive OR circuit 132 carries out calculation in accordance with Equations (4) to produce the fifth and sixth control signals $S_5$ and $S_6$ and the seventh and eighth control signals $S_7$ and $S_8$. Each of the fifth and sixth control signals $S_5$ and $S_6$ is equal to $(0)_2$ because $y_0=0$ and $n_1=0$. On the other hand, each of the seventh and eighth control signals $S_7$ and $S_8$ is equal to $(1)_2$ because $y_1=1$ and $n_1=0$.

Likewise, the third Exclusive OR circuit 133 carries out calculation in accordance with Equations (5) to produce the ninth through twelfth control signals $S_9$ to $S_{12}$ Inasmuch as $x_0=0$, $x_1=1$, $x_2=0$, $x_3=0$, and $n_0=0$, the ninth through twelfth control signals $S_9$ to $S_{12}$ are given by $(0010)_2$, respectively.

Thus, the first through fourth control signals $S_1$ to $S_4$, the fifth through eighth control signals $S_5$ to $S_8$, and the ninth through twelfth control signals $S_9$ to $S_{12}$ become $(0000)_2$, $(0011)_2$, and $(0010)_2$, respectively.

Figure 34:
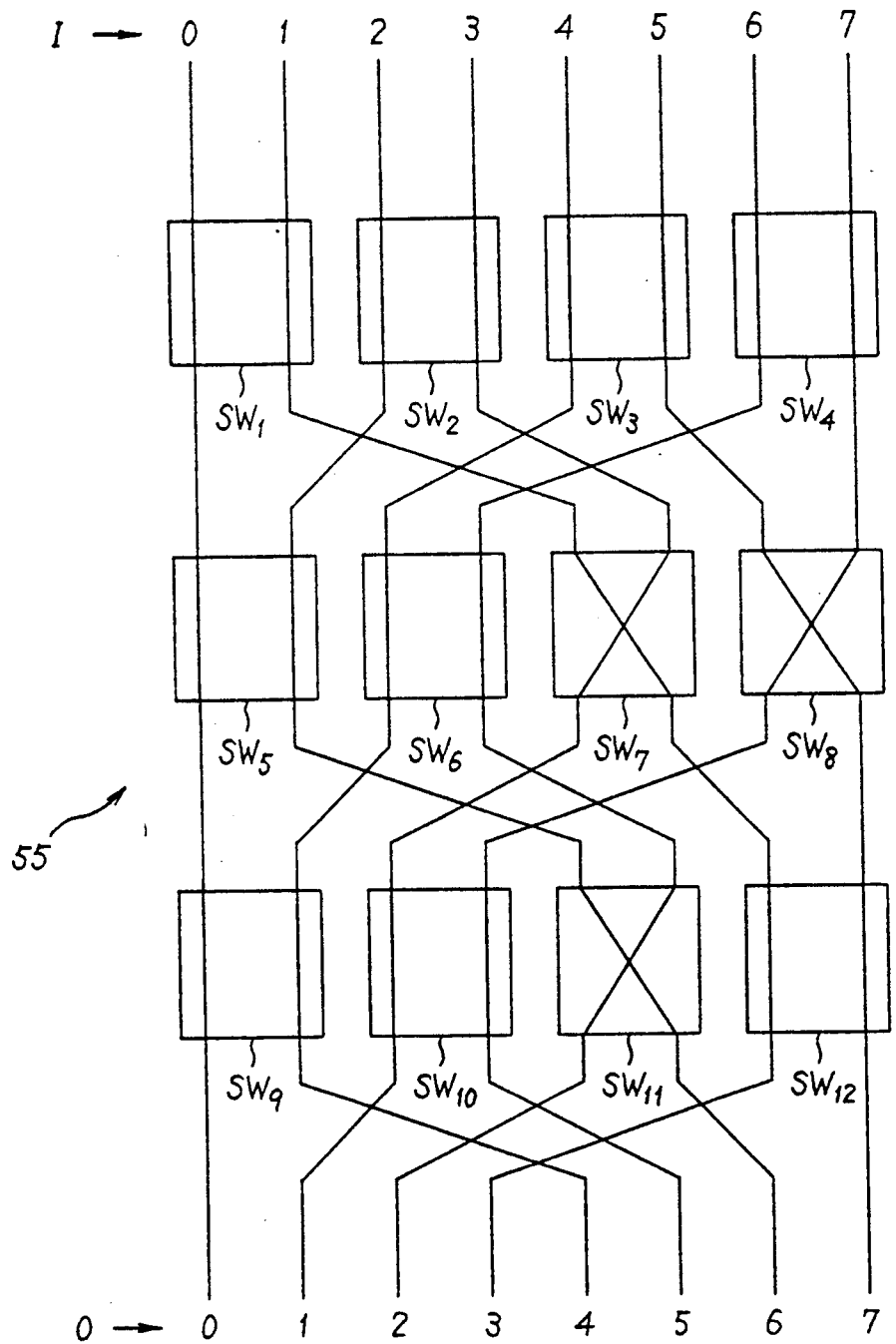
FIG. 34 is a block diagram for use in describing operation of the circuit arrangement which is carried out on a certain condition.

Referring to FIG. 34, the switching network 55 is controlled by the first through twelfth control signals $S_1$ to $S_{12}$ mentioned above and forms internal paths as illustrated in FIG. 34. The illustrated internal paths certainly connect the consecutive input ports I(0) to I(7) to the output ports O(0), O(3), O(6), O(1), O(4), O(7), O(2), and O(5), respectively.

When the port interval (D) is equal to an even number, such as $(2)_{10}$ and $(6)_{10}$, a conflict of internal paths objectionably occurs, as in FIG. 21. In order to avoid such an objectionable conflict, the illustrated circuit arrangement 50 successively connects a part of the input ports to the output ports in a time division fashion, as will be described below.

Briefly, the leading port signal B and the input port signal N are varied at every machine cycle in a manner to be described with the port interval signal D kept unchanged, if the port interval (D) is equal to an even number.

Let the port interval signal D be equal to $(6)_{10}$, namely, $(110)_2$. In addition, it is assumed that the leading port signal B and the input port signal N are represented by $(000)_2$ and $(000)_2$ at a first one of the machine cycles, respectively. The leading output port number represented by the leading port signal B is increased by $(6)_{10}$ at every machine cycle while the input port number represented by the input port signal N is increased by one at every machine cycle, as will become clear later.

During the first machine cycle, the first through third decoders 71 to 73 (FIG. 33) produce the first decoded signal C0 of $(10)_2$, the second decoded signal C1 of $(11001)_2$, and the third decoded signal C2 of $(11110000111)_2$, respectively. Responsive to the above-mentioned first through third decoded signals C0, C1, and C2, the first through third shift circuits 76 to 78 produce the first through third intermediate signals of $(0)_2$, $(01)_2$, and $(0111)_2$, respectively.

Under the circumstances, the first Exclusive OR circuit 131 gives the first through fourth control signals $S_1$ to $S_4$ each of which takes $(0)_2$. Likewise, the second Exclusive OR circuit 132 produces the fifth and sixth control signals $S_5$ and $S_6$ of $(0)_2$ and the seventh and the eighth control signals $S_7$ and $S_8$ of $(1)_2$ while the third Exclusive OR circuit 133 produces the ninth control signal $S_9$ of $(0)_2$, the tenth control signal $S_{10}$ of $(1)_2$, the eleventh control signal $S_{11}$ of control signal $S_{12}$ of $(1)_2$.

Figure 35:
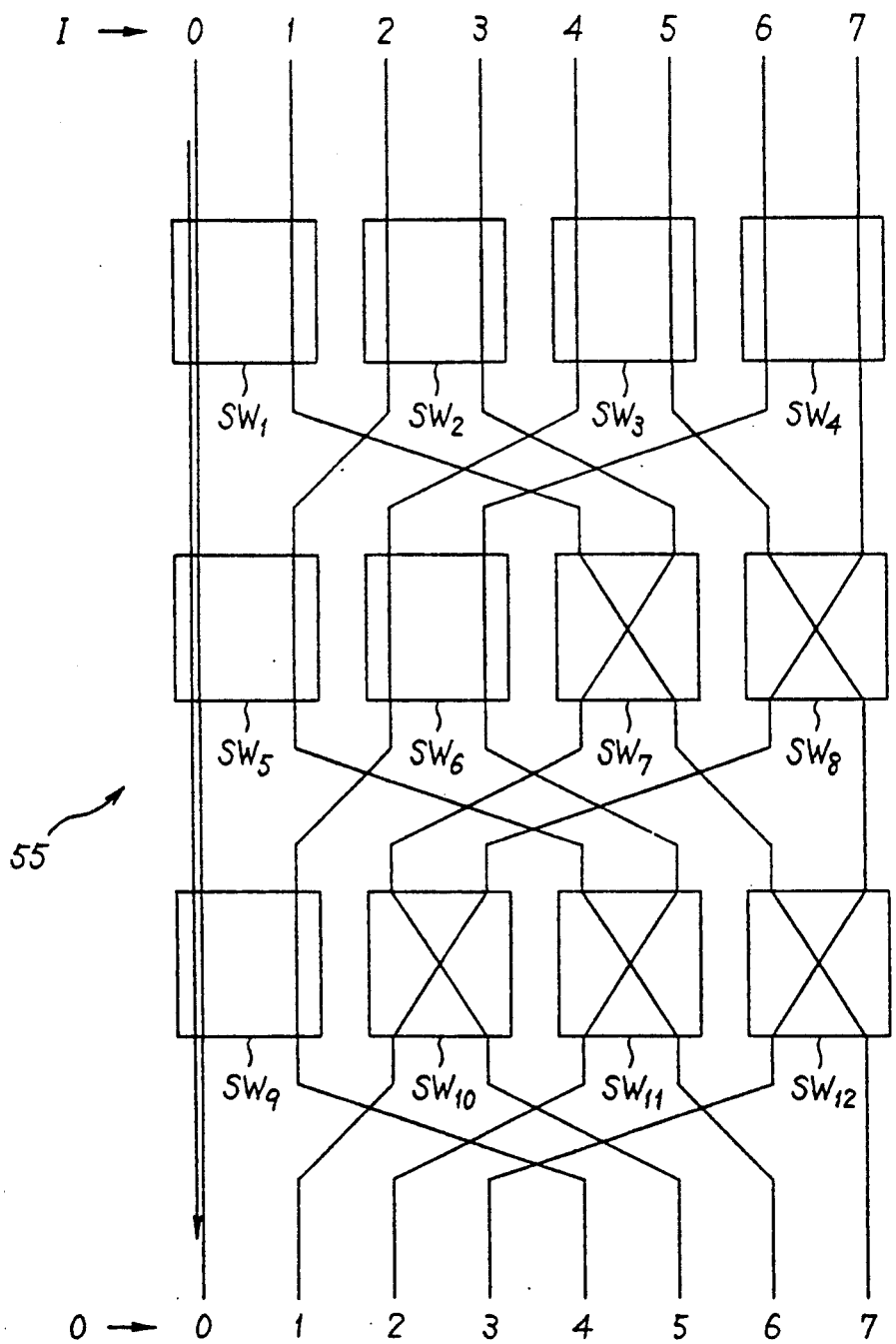
FIG. 35 is a block diagram for use in describing internal paths formed in the circuit arrangement during a first machine cycle.

Referring to FIG. 35, the first through twelfth switch units $SW_1$ to $SW_{12}$ connect the input ports I(0) to I(7) to the output ports O(0) to O(7) in response to the above-mentioned first through twelfth control signals $S_1$ to $S_{12}$, respectively. As shown in FIG. 35, the input port I(0) is certainly connected to the output port O(0).

During a second one of the machine cycles, the leading port number (B) is changed to $(6)_{10}$, namely, $(110)_2$ while the input port number (N) is changed to $(1)_{10}$, namely, $(001)_2$, with the port interval (D) of $(6)_{10}$ kept unchanged.

In this event, the first through third decoded signals C0, C1, and C2 are identical with those produced during the first machine cycle and are given by $(10)_2$, $(11001)_2$, and $(11110000111)_2$, respectively. The first shift circuit 76 carries out no shift operation in response to the least significant bit $(0)_2$ of the leading port signal B and extracts the least significant bit $(0)_2$ from the first decoded signal C0. The second shift circuit 77 shifts the second decoded signal C1 by two bits rightwards and extracts two lower bits $(10)_2$ from a shift result signal. The third shift circuit 78 shifts the third decoded signal C2 by six bit rightwards and extracts four lower bits $(1110)_2$ from a shift result signal.

The first through third Exclusive OR circuits 131 to 133 perform the Exclusive OR operations in compliance with Equations (3), (4), and (5). As a result, the first through fourth control signals $S_1$ to $S_4$ become equal to $(1)_2$. The fifth and sixth control signals $S_5$ and $S_6$ become equal to $(1)_2$ while the seventh and eighth control signals become equal to $(0)_2$. On the other hand, the ninth through twelfth control signals $S_9$ to $S_{12}$ take $(1110)_2$, respectively.

Figure 36:
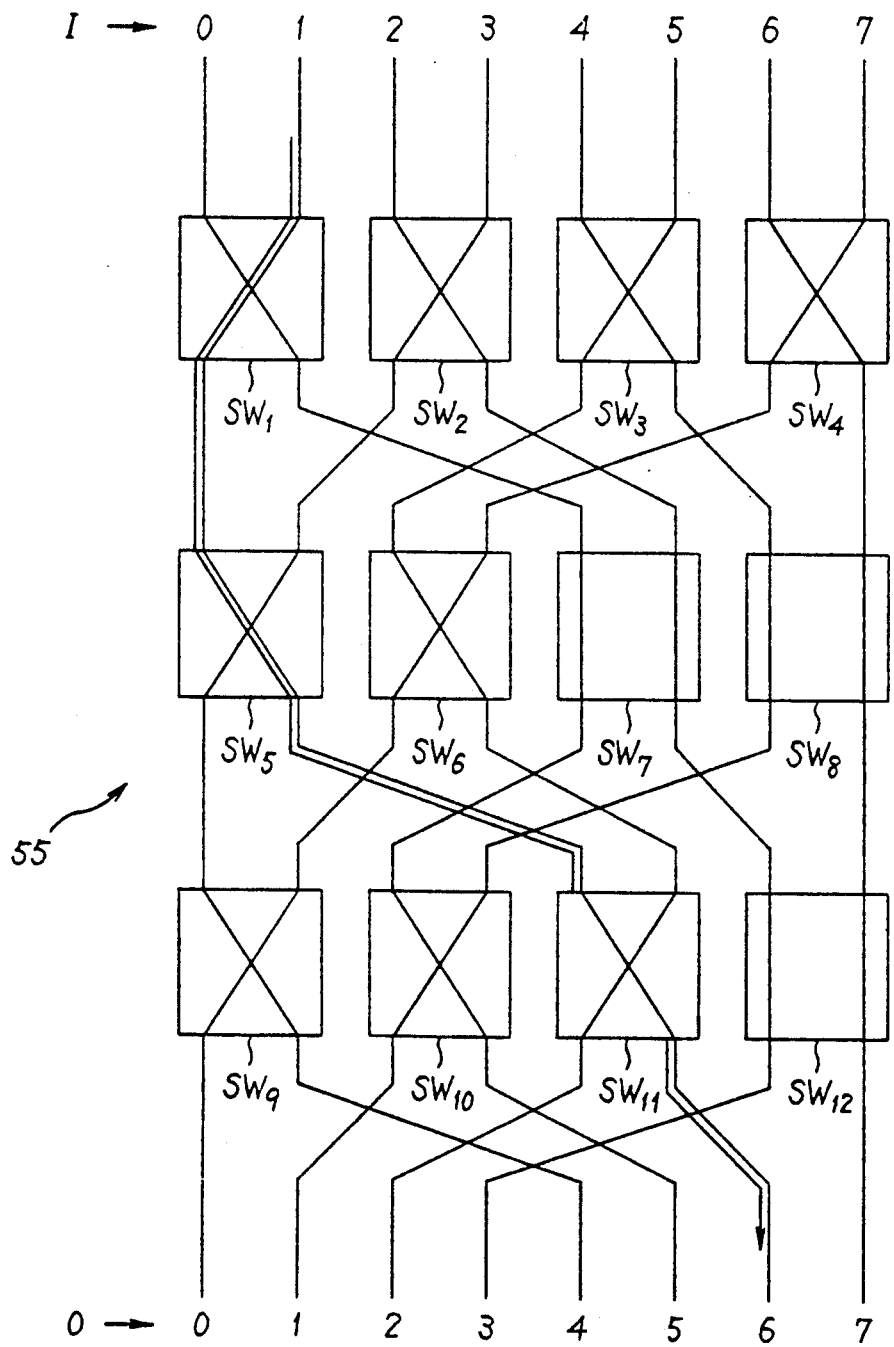
FIG. 36 is a block diagram for use in describing internal paths formed in the circuit arrangement during a second machine cycle.

Referring to FIG. 36, the first through twelfth switch units $SW_1$ to $SW_{12}$ are controlled by the first through twelfth control signals $S_1$ to $S_{12}$ of $(1111)_2$, $(1100)_2$, and $(1110)_2$, respectively, so as to form internal paths in the switching network 55. As shown in FIG. 36, the input port I(1) is connected to the output port O(6) during the second machine cycle.

During a third one of the machine cycles, the leading port number (B) is changed to $(4)_{10}$, namely, $(100)_2$ in consideration of the port interval $(6)_{10}$ while the input port number (N) is changed to $(2)_{10}$, namely, $(010)_2$.

Inasmuch as the port interval (D) of $(6)_{10}$ is kept unchanged, the first through third shift circuits 76 to 78 are supplied from the first through third decoders 71 to 73 with the first through third decoded signals C0 to C2 identical with those produced during the first and second machine cycles. The first through third shift circuits 76 to 78 produce the first through third intermediate signals in response to the least significant bit $b_2$, the two lower bits $b_1b_2$ and the three bits $b_0b_1b_2$ of the leading port signal B in a similar manner. As a result, the first and the second intermediate signals take $(0)_2$ and $(01)_2$, respectively, while the third intermediate signal takes $(1000)_2$.

Responsive to the first intermediate signal of $(0)_2$ and the least significant bit $n_2$ of $(0)_2$, the first Exclusive OR circuit 131 performs the Exclusive OR operation to produce the first through fourth control signals $S_1$ to $S_4$ of $(0)_2$. Likewise, the second Exclusive OR circuit 132 produces the fifth and sixth control signals $S_5$ and $S_6$ of $(1)_2$ in response to the higher bit $(0)_2$ of the second intermediate signal and eighth control signals $S_7$ and $S_8$ of $(0)_2$ in response to the lower bit $(1)_2$ of the second intermediate signal and the bit $n_1$ of $(1)_2$. In addition, the third Exclusive OR circuit 133 produces the ninth through twelfth control signals $S_9$ to $S_{12}$ which are represented by $(1000)_2$ in accordance with Equations (5).

Figure 37:
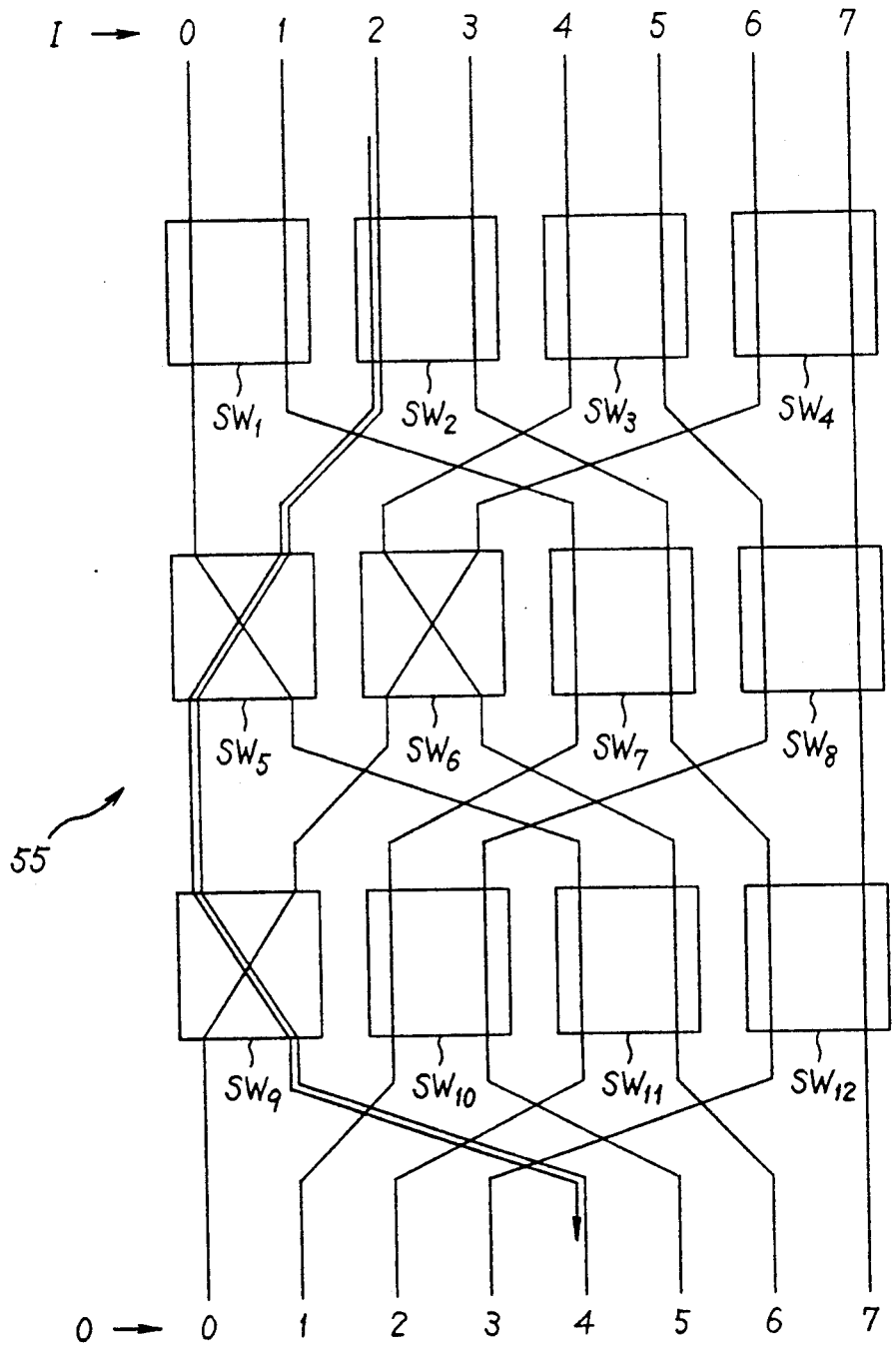
FIG. 37 is a block diagram for use in describing internal paths formed in the circuit arrangement during a third machine cycle.

Referring to FIG. 37, internal paths are illustrated which are formed in the switching network 55 in response to the first through fourth control signals $S_1$ to $S_4$ of $(0)_2$, the fifth and sixth control signals $S_5$ and $S_6$ of $(1)_2$, the seventh and eighth control signals $S_7$ and $S_8$ of $(0)_2$, and the ninth through twelfth control signals $S_9$ to $S_{12}$ of $(1000)_2$. As shown in FIG. 37, the input port I(2) is certainly connected to the output port O(4) during the third machine cycle.

Similar operation is successively carried out at every machine cycle with the leading port number (B) and the input port number (N) changed in the above-mentioned manner and with the port interval (D) kept unchanged.

In the example being illustrated, a single one of the input ports is connected to one of the output ports at every machine cycle in a time division fashion. However, two or four input ports may simultaneously be connected to the corresponding output ports in a time division fashion, unless such connections give rise to conflict of internal paths.

Figure 38:
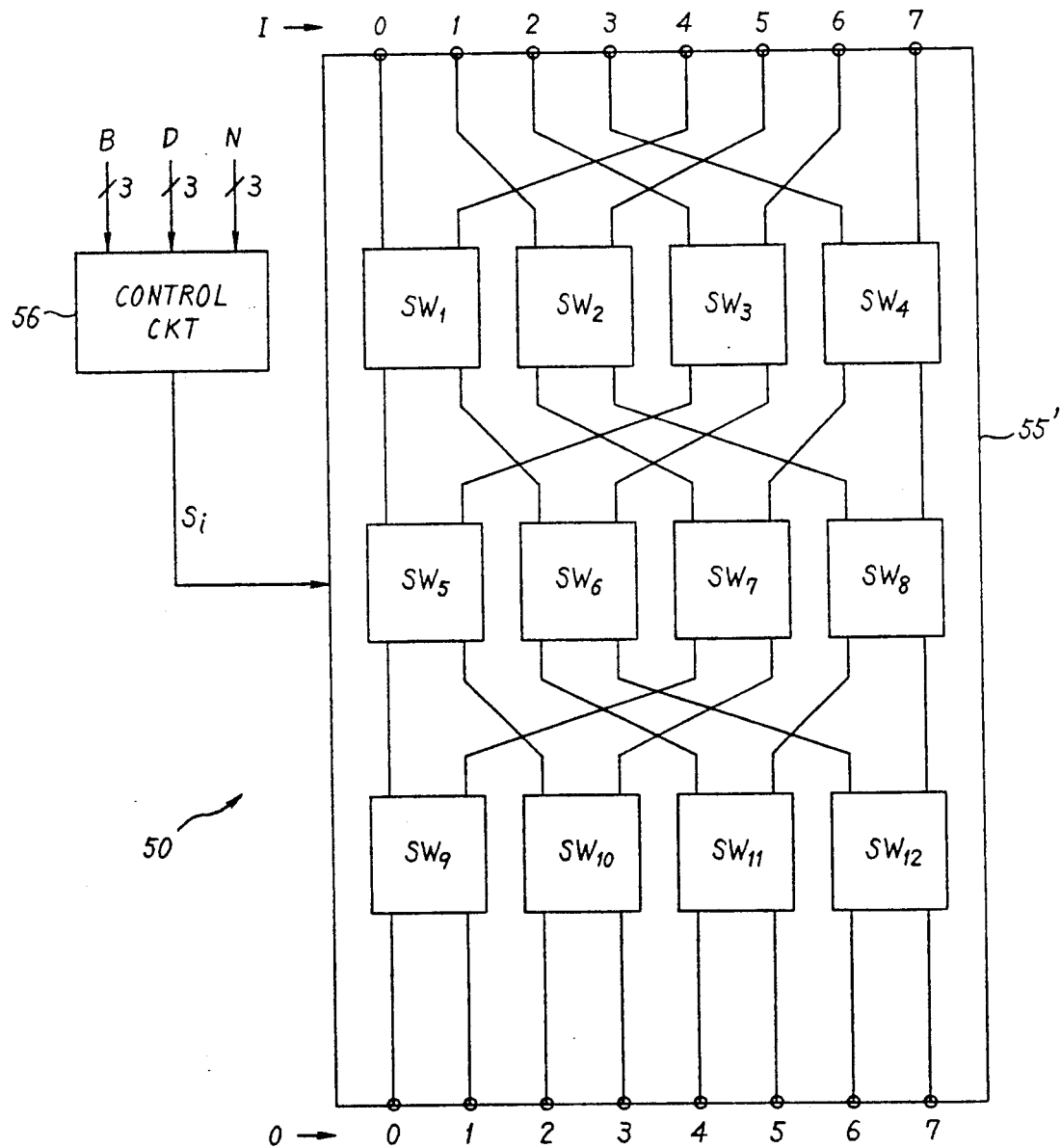
FIG. 38 is a block diagram of a circuit arrangement according to a sixth embodiment of this invention.

Referring to FIG. 38, a circuit arrangement 50 according to a sixth embodiment of this invention comprises a switching network 55' which is similar to that illustrated in FIG. 23. As shown in FIG. 38, the switching network 55' comprises the input ports I(0) to I(7), the output ports O(0) to O(7, and the first through twelfth switch units $SW_1$ to $SW_{12}$ placed between the input and output ports in the manner already described in conjunction with FIG. 23.

The circuit arrangement 50 illustrated in FIG. 38 is similar in operation to that illustrated in FIG. 32. However, it is to be noted here that eight array data or elements are delivered to consecutive ones of the output ports O(0) to O(7) in order and that a leading one of the array elements as delivered to a leading one (for example, O(0)) of the output ports from a leading input port which may be either one of the input ports I(0) to I(7). In addition, two consecutive ones of the array elements are given to two of the input ports remote from each other by an input port interval.

In this connection, a leading input port number assigned to the leading input port is indicated by a leading port signal depicted at B like in FIG. 32 while the input port interval is represented by a port interval signal depicted at D like in FIG. 32. Thus, the leading port signal B and the port interval signal D serve as reference information and distance information, respectively. Moreover, an output port number signal (depicted at N) is also given to the illustrated circuit arrangement 50 and is representative of an output port number assigned to the leading output port which is to be connected to the leading or reference input port. From this fact, it is to be understood that the leading output port may be changed in the illustrated circuit arrangement.

In the illustrated example, the leading port signal B, the port interval signal D, and the output port number signal N can be represented $b_0b_1b_2$, $d_0d_1d_2$, and $n_0n_1n_2$, respectively, because the number of each of the input and output ports is equal to eight.

Supplied with the leading port signal B, the port interval signal D, and the output port number signal N, a control circuit 56 carries out operation in a manner similar to that illustrated in FIG. 32 to supply the first through twelfth control signals $S_1$ to $S_{12}$ to the switching network 55'.

Figure 39:
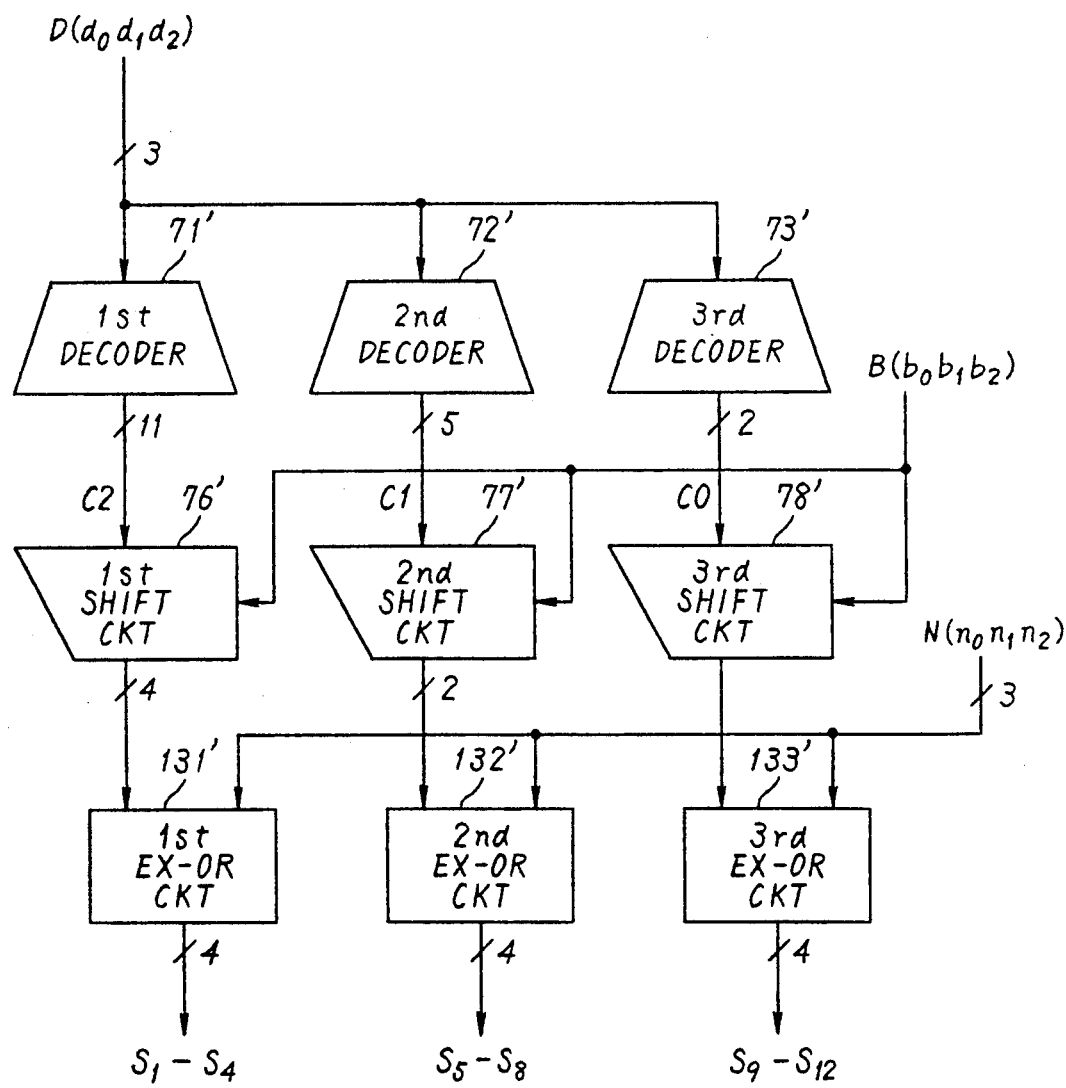
FIG. 39 is a block diagram of a control circuit for use in the circuit arrangement illustrated in FIG. 38.

Referring to FIG. 39 together with FIG. 38, the control circuit 56 comprises first through third decoders 71' to 73', first through third shift circuits 76' to 78', and first through third Exclusive OR circuits 131' to 133'.

In FIG. 39, the first decoder 71', the first shift circuit 76', and the first Exclusive OR circuit 131' are similar in operation to the third decoder 73, the third shift circuit 78, and the third Exclusive OR circuit 133 (FIG. 33), respectively, and serve to produce the first through fourth control signals $S_1$ to $S_4$. The second decoder 72', the second shift circuit 77', and the second Exclusive OR circuit 132' are similar to the second decoder 72, the second shift circuit 77, and the second Exclusive OR circuit 132 (FIG. 33), respectively, and serve to produce the fifth through eighth control signals $S_5$ to $S_8$. The third decoder 73', the third shift circuit 78', and the third Exclusive OR circuit 133' are similar to the first decoder 71, the first shift circuit 76, and the first Exclusive OR circuit 131 (FIG. 33), respectively, and serve to produce the ninth through twelfth control signals $S_9$ to $S_{12}$.

From this fact, it is readily understood that the first decoder 71' (FIG. 39) decodes the port interval signal D into a first additional decoded signal of eleven bits in a manner shown in FIG. 7(C) while the second and third decoders 72' and 73' (FIG. 39) produce a second additional decoded signal of five bits and a third additional decoded signals of two bits in accordance with FIGS. 7(B) and 7(A), respectively. For convenience of description, the first through third additional decoded signals will be indicated at C2, C1, and C0, respectively.

The first through third shift circuits 76' to 78' are operated in the manners described in conjunction with the third through first shift circuits 78 to 76 illustrated in FIG. 33 to produce a first intermediate signal of four bits $x_0x_1x_2x_3$, a second intermediate signal of two bits $y_0y_1$, and a third intermediate signal of a single bit $z_0$, respectively.

The first Exclusive OR circuit 131' is supplied with the four bits $x_0x_1x_2x_3$ and the most significant bit $n_0$ of the port number signal N to produce the first through fourth control signals $S_1$ to $S_4$ given by:

$$S_1 = x_0 \oplus n_0, \\ S_2 = x_1 \oplus n_1, \\ S_3 = x_2 \oplus n_2, \\ \text{and} \\ S_4 = x_3 \oplus n_3, \quad (6)$$

Likewise, the second Exclusive OR circuit 132' produces the fifth through eighth control signals $S_5$ to $S_8$ given by:

$$S_5, S_6 = y_0 \oplus n_1 \\ \text{and} \\ S_7, S_8 = y_1 \oplus n_1. \quad (7)$$

The third Exclusive OR circuit 133' produces the ninth through twelfth control signals $S_9$ to $S_{12}$ given by:

$$S_9, S_{10}, S_{11}, S_{12} = z_0 \oplus n_2. \quad (8)$$

The first through twelfth control signals $S_1$ to $S_{12}$ are delivered to the respective switch units $SW_1$ to $SW_{12}$.

It is assumed that the consecutive output ports (0) to O(7) are connected to the input ports I(0), I(3), I(6), I(1), I(4), I(7), I(2), and I(5) in order, respectively. In this case, the leading port signal B indicates the input port number $(0)_{10}$ assigned to the input port I(0) while the port number signal N indicates the leading output port number $(0)_{10}$ assigned to the leading output port O(0) which is to be connected to the input port I(0). In addition, the port distance signal indicates the port interval $(3)_{10}$, namely, $(011)_2$.

Under the circumstances, the first decoder 71' decodes the port distance signal D of $(011)_2$ into the first additional decoded signal C2 of $(01011010010)_2$, as shown in FIG. 7(C). The second and the third decoders 72' and 73' decodes the port distance signal D of $(011)_2$ into the second additional decoded signal C1 of $(11001)_2$ and into the third additional decoded signal C0 of $(10)_2$ in accordance with FIGS. 7(B) and 7(A), respectively.

Responsive to the leading port signal B and the above-mentioned first additional decoded signal C2, the first shift circuit 71' is operated in the manner described in conjunction with the third shift circuit 73 (FIG. 33) Since $B=(000)_2$, the first shift circuit 71' carries out no shift operation and extracts four lower bits $(0010)_2$ from the first additional decoded signal C2. In a similar manner, the second and the third shift circuits 72' and 73' extract two lower bits $(01)_2$ and a single lower bit $(0)_2$ from the second and the third decoded signals, respectively.

The first Exclusive OR circuit 131' performs the Exclusive OR operation in accordance with Equations (6) to produce the first through fourth control signals $S_1$ to $S_4$ which are represented by $(0010)_2$, respectively. The second Exclusive OR circuit 132' produces the fifth and sixth control signals $S_5$ and $S_6$ of $(0)_2$ and the seventh and eighth control signals $S_7$ and $S_8$ of $(1)_2$ in accordance with Equations (7). Likewise, the third Exclusive OR circuit 133' produces the ninth through twelfth control signals $S_9$ to $S_{12}$ of $(0)_2$ in compliance with Equation (8).

Figure 40:
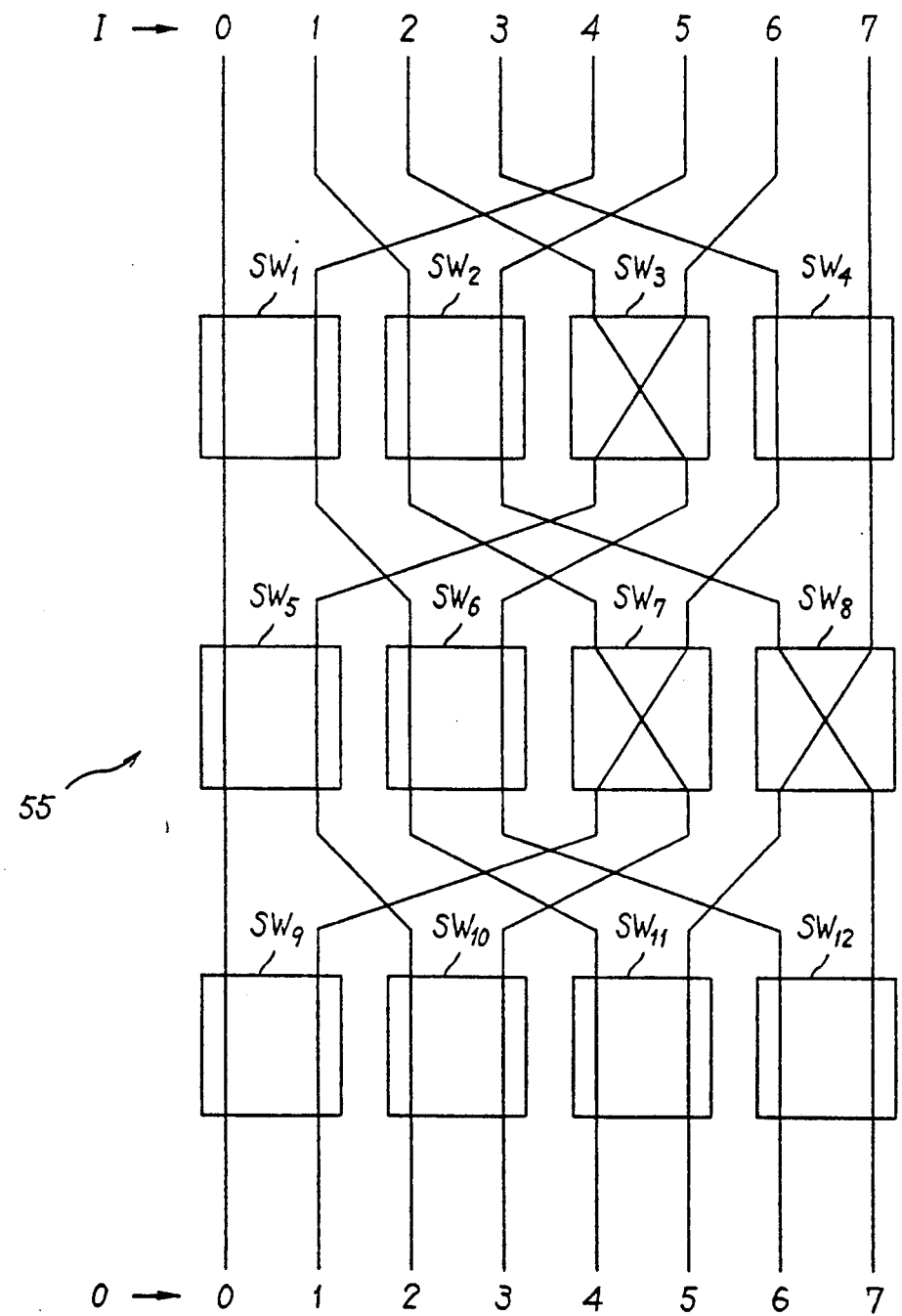
FIG. 40 is a block diagram for use in describing operation of the circuit arrangement which is carried out on a certain condition.

Referring to FIG. 40, the first through twelfth switch units $SW_1$ to $SW_{12}$ are controlled by corresponding control signals mentioned above to form internal paths in the switching network 55. As shown in FIG. 40, the consecutively numbered output ports O(0) to O(6) are actually connected from the input port I(0) to the input port I(5) at the port interval of $(3)_{10}$.

Like in FIG. 32, an objectionable conflict takes place in internal paths when the port interval (D) is equal to an even number, such as 2, 6. In the example being illustrated in FIG. 38, a single one of the output ports is successively connected to a single one of the input ports in a time division fashion as described in conjunction with FIGS. 35 to 37. Such operation is possible by renewing the leading port signal B and the output port number signal N at every machine cycle with the port interval signal D kept unchanged, like in FIGS. 35 to 37.

More particularly, let the port interval (D) be equal to $(6)_{10}$, namely, $(110)_2$. The leading port number (B) and the input port number (N) are assumed to be $(000)_2$ and $(000)_2$ during a first one of the machine cycles. In this event, the first through third decoded signals C2, C1, and C0 are given by $(11110000111)_2$, $(11001)_2$, and $(10)_2$ from which the first through third intermediate signals of $(0111)_2$, $(01)_2$, and $(0)_2$ are extracted by the first through third shift circuits 76' to 78', respectively.

Inasmuch as the output port number signal N specifies $(000)_2$, the first Exclusive OR circuit 131' produces the first through fourth control signals $S_1$ to $S_4$ of $(0111)_2$ while the second Exclusive OR circuit 132' produces the fifth and sixth control signals $S_5$ and $S_6$ of $(0)_2$ and the seventh and eighth control signals $S_7$ and $S_8$ of $(1)_2$. Similarly, the ninth through twelfth control signals $S_9$ to $S_{12}$ become equal to $(0)_2$.

Figure 41:
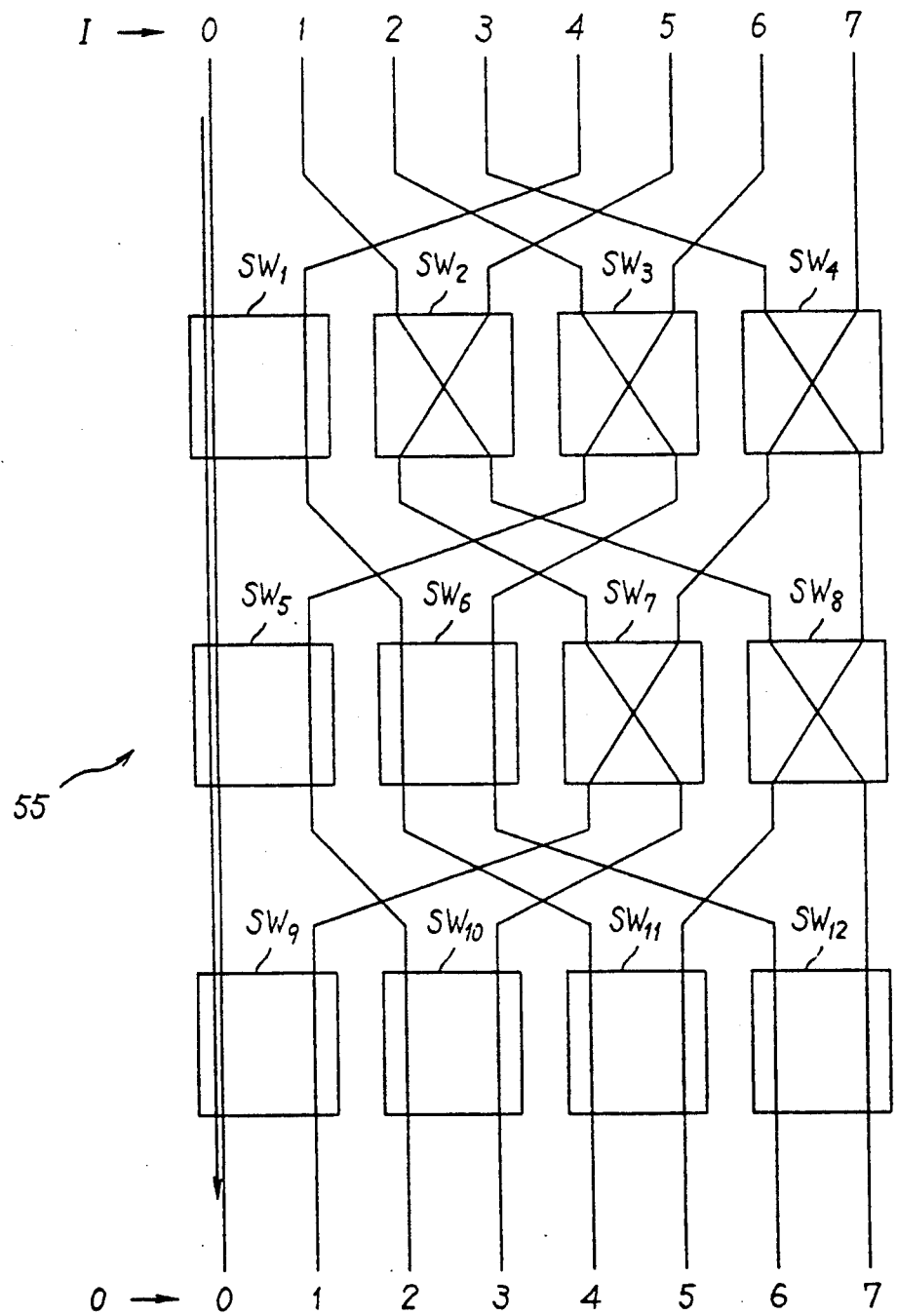
FIG. 41 is a block diagram for use in describing operation of the circuit arrangement that is carried out during a first machine cycle on a specific condition.

Referring to FIG. 41, the above-mentioned first through twelfth control signals $S_1$ to $S_{12}$ connect the input ports to the output ports in the illustrated manner during the first machine cycle. As shown in FIG. 41, the above-mentioned control signals assure a connection between the input port I(0) and the output port O(0). Therefore, the leading array element can be delivered from the input port I(0) to the output port O(0) during the first machine cycle.

Subsequently, the leading port number (B) and the output port number (N) are renewed at a second one of the machine cycles to be changed to $(110)_2$ and $(001)_2$, respectively. The first through third shift circuits 76' to 78' are supplied with the leading port number (B) of $(110)_2$ and with the first through third additional decoded signals C2, C1, and C0 identical with those described in conjunction with the first machine cycle. The first shift circuit 76' shifts the first additional decoded signal by six bits rightward to extract four lower bits from a shifted result and to produce the first intermediate signal of $(1110)_2$. The second shift circuit 77' produces the second intermediate signal of $(10)_2$ by shifting $(11001)_2$ by two bits rightwards to form an additional shifted result and by extracting two lower bits from the additional shifted result. The third shift circuit 78' produces the third intermediate signal of $(0)_2$ by carrying out no shift of $(10)_2$ and by selecting the least significant bit of the third additional decoded signal C0.

As a result, the first through third Exclusive OR circuits 131' to 133' give the first through fourth control signals $S_1$ to $S_4$ of $(1110)_2$, the fifth through eighth control signals $S_5$ to $S_8$ of $(1100)_2$, and the ninth through twelfth control signals $S_9$ to $S_{12}$ of $(1)_2$.

Figure 42:
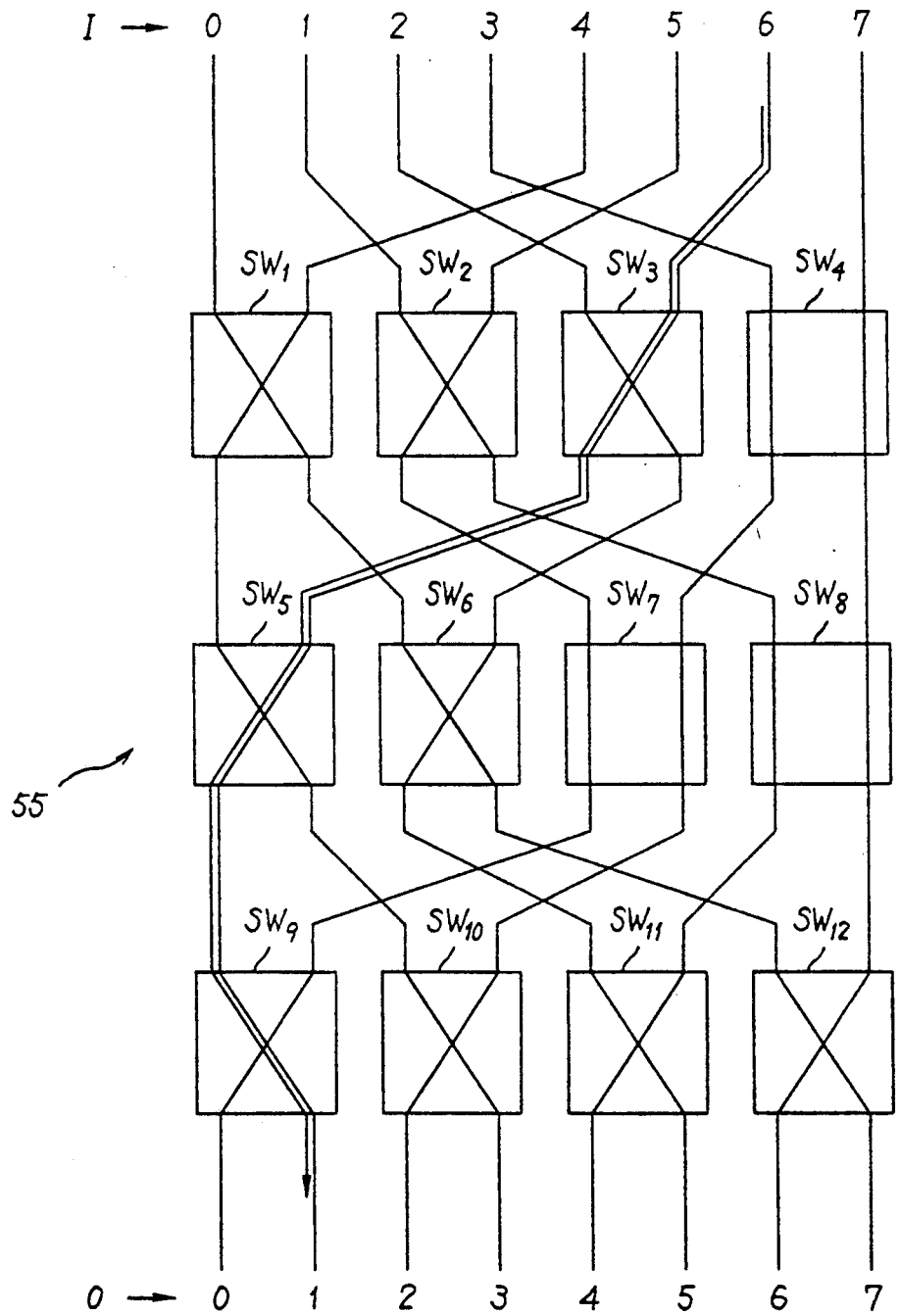
FIG. 42 is a block diagram for use in describing operation carried out in the circuit arrangement during a second machine cycle.

Referring to FIG. 42, the switching network 55 connects the input ports I(0) through I(7) to the output ports O(0) through O(7) in response to the above-mentioned control signals. As is apparent from FIG. 42, the output port O(1) is connected to the input port I(6) spaced from the input port I(0) by the port interval of $(6)_{10}$. Thus, a second one of the array elements can be delivered from the input port I(6) to the output port O(1) during the second machine cycle.

During a third one of the machine cycles, the leading port number (B) and the output port number (N) are changed to $(4)_{10}$, namely, $(100)_2$ and $(2)_{10}$, namely, $(010)_2$, with the port interval (D) kept unchanged. In this event, the first through third shift circuits 76' to 78' produce $(1000)_2$, $(01)_2$, and $(0)_2$ as the first through third additional decoded signals in the above-mentioned manner. Supplied with the output port number (N) of $(010)_2$ and with $(1000)_2$, $(01)_2$, and $(0)_2$, the first through third Exclusive OR circuits 131' to 133' produce the first through fourth control signals $S_1$ to $S_4$ of $(1000)_2$, the fifth through eighth control signals $S_5$ to $S_8$ of $(1100)_2$, and the ninth through twelfth control signals $S_9$ to $S_{12}$ of $(0000)_2$ so as to form internal paths illustrated in FIG. 43.

Figure 43:
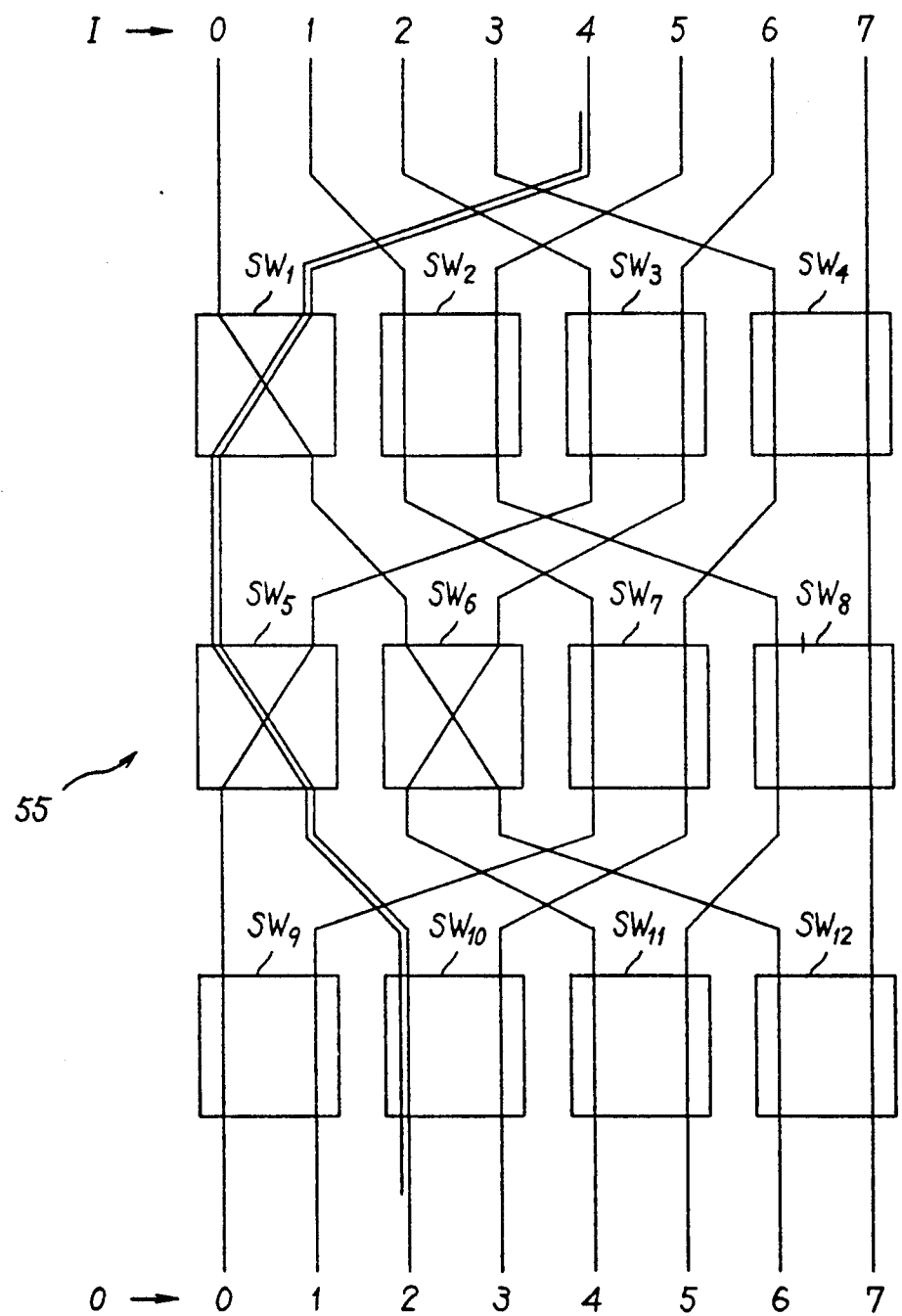
FIG. 43 is a block diagram for use in describing operation carried out during a third machine cycle.

As shown in FIG. 43, the output port O(2) is assuredly connected to the input port I(4) during the third machine cycle. Similar connection is made in a time division fashion to successively connect the input ports at the port interval of $(6)_{10}$.

Two or four input ports can be connected to two of the output ports in a time division fashion, if no conflict takes place in internal paths.

While this invention has thus far been described in conjunction with several embodiments thereof, it will readily be possible for those skilled in the art to put this invention into practice in various other manners. For example, the number of each of the input ports and the output ports may be restricted to eight. Each memory unit 52-1 to 52-8 may be replaced by an array processor or the like.

What is claimed is:

1. A memory accessing system, comprising:
a memory including a plurality of memory units;
a switching network for accessing said memory, comprising
   a first port set including consecutively numbered input ports,
   a second port set including consecutively numbered output ports connected to said memory units, respectively,
   ports of one set of said first port set and said second port set including a reference port having a reference port number,
   ports of another set of said first port set and said second port set being arranged in a numerical order, and
   a plurality of switching units for forming internal paths between said input ports and said output ports for selectively accessing said memory units,
   said switching units connecting said ports of said one set to said ports of said another set at a predetermined port interval relative to said reference port,
   said switching units forming said internal paths on the basis of a predetermined relationship between said reference port number and said predetermined port interval;
a control circuit for producing a control signal set including a set of control signals based upon said reference port number and said predetermined port interval; and
delivering means for delivering said control signal set to said switching units independently of said input ports and internal paths;
said control circuit performing concentrated control of said switching network with said control signals to cause said switching network to synchronously operate to simultaneously connect said input ports and said output ports to provide access to said memory units at said input ports.

2. The system as in claim 1, wherein:
said input ports comprise said ports of said one set and include said reference port,
said reference port having a reference address,
said output ports being equal in number to said input ports and comprising said ports of said another set.

3. The system as in claim 2, wherein:
said control circuit produces said control signal set additionally with reference to an indication signal representing accessible memory units of said memory.

4. The system as in claim 3, wherein said control circuit comprises:
decoding means for decoding a preselected distance signal into a set of decoded signals by using a logic operation and
control signal producing means coupled to said decoding means and responsive to a reference address signal and said set of decoded signals for producing said control signal set.

5. The system as in claim 3, wherein said control circuit comprises:
decoding means for decoding a preselected distance signal into a set of decoded signals with reference to said indication signal by using a logic operation and
control signal producing means coupled to said decoding means and responsive to a reference address signal for producing said control signal set.

6. The system as in claim 1, further comprising:
means for inputting vector data elements to said input ports;
said switching network transferring said vector data elements to said memory; and
said memory units of said memory receiving and storing said vector data elements at addresses at a predetermined element distance corresponding to said predetermined port interval to enable simultaneous access to said vector data elements stored in said memory units.

7. A memory accessing system, comprising:
a memory including a plurality of memory units;
a switching network for accessing said memory comprising
   a first port set including consecutively numbered input ports,
   a second port set including consecutively numbered output ports, said output ports being connected to said memory units, respectively,
   ports of one set of said first port set and said second port set including a reference port, and
   a plurality of switching units responsive to a set of control signals for forming internal paths between said input ports and said output ports for simultaneously connecting all said ports of said one set with a predetermined port interval from said reference port to ports of another set of said first port set and said second port set, said ports of said another set being arranged in numerical order; and a control circuit coupled to said switching units for concentratedly delivering said set of control signals to said switching units independently of said input ports and said internal paths, based upon said reference port and said predetermined port interval.

8. The system as in claim 7, wherein said control circuit comprises decoding means for decoding a predetermined port interval signal into a set of decoded signals by using a preselected logic operation, and control signal producing means coupled to said decoding means and responsive to a reference port signal and said set of decoded signals for producing said set of control signals.

9. The system as in claim 8, wherein:

said switching units connect said reference port to a leading port of said ports of said another set, said control signal producing means producing said set of control signals with reference to said leading port.

10. The system as in claim 9, wherein said control signal producing means comprises:

selecting means coupled to said decoding means for selecting each decoded signal of said decoded signals by using said reference port signal to produce a set of intermediate signals, and calculating means coupled to said selecting means for carrying out a predetermined calculation with reference to a leading port signal at said leading port and said set of intermediate signals.

11. The system as in claim 10, wherein:

said control circuit delivers said set of control signals to said switching network at prescribed intervals of time, and said control circuit changes said reference port and said leading port by one port at each of said prescribed intervals of time in a time division mode when said predetermined port interval would otherwise bring about an objectionable conflict among said internal paths.

12. The system as in claim 11, wherein said input ports comprise an enabled partial input port set;

said control circuit delivering said set of control signals to said switching units based upon said enabled partial input port set.

13. The system as in claim 12, wherein said switching units providing repeated connection of said enabled partial input port set to said output ports;

said control circuit delivering said set of control signals to said switching units with reference to said enabled partial input port set and causing said switching units to perform said repeated connection with reference to said reference port and said predetermined port interval.

14. The system as in claim 13, wherein said control circuit comprises:

decoding means for decoding a predetermined port interval signal into a group of decoded signals by using a preselected logic operation; and control signal producing means coupled to said decoding means and responsive to a reference port signal for producing said set of control signals with reference to said reference port, with reference to said enabled partial input port set and with reference to said repeated connection to cause said switching units to connect said enabled partial input port set to different output ports at every repetition of said repeated connection.

15. The system as in claim 7, wherein said one set is said second port set and said output ports are consecutively numbered from zero to M;

said switching network connecting each output port of said output ports to each input port of said input ports of a number I defined by $$O=(B+I\times D) \bmod M,$$

wherein O represents a number assigned to said each output port, B represents a number assigned to said reference port and D represents said predetermined port interval.

16. The system as in claim 7, wherein said one set is said first port set and said input ports are consecutively numbered from O to M;

said switching network connecting each input port of said input ports to each output port of said output ports of a number O defined by $$I=(B+O\times D) \bmod M;$$

wherein I represents a number assigned to said each input port, B represents a number assigned to said reference port and D represents said predetermined port interval.

17. The system as in claim 7, further comprising:

a plurality of consecutively numbered circuit outputting ports;

a rearranging circuit coupled between said output ports and said circuit outputting ports for providing rearranged connections between said output ports and said circuit outputting ports in response to an additional control signal;

said control circuit, when a conflict occurs between said internal paths, adjusting said predetermined port interval to an adjusted port interval and providing said additional control signal to said rearranging circuit to cause said rearranging circuit to provide said rearranged connections, said additional control signal varying dependent upon said predetermined port interval.

18. The system as in claim 7, further comprising:

a plurality of consecutively numbered circuit inputting ports;

a rearranging circuit coupled between said circuit inputting ports and said input ports for providing rearranged connections between said circuit inputting ports and said input ports in response to an additional control signal;

said control circuit, when a conflict occurs between said internal paths, adjusting said predetermined port interval to an adjusted port interval and providing said additional control signal to said rearranging circuit to cause said rearranging circuit to provide said rearranged connections, said additional control signal varying dependent upon said predetermined port interval.

19. The system as in claim 7, further comprising:

means for inputting vector data elements to said input ports;

said switching network transferring said vector data elements to said memory; and said memory units of said memory receiving and storing said vector data elements at addresses at a predetermined element distance corresponding to said predetermined port interval to enable simultaneous access to said vector data elements stored in said memory units.

20. A method of accessing selected addresses of a plurality of memory units of a memory under control by a control circuit, said selected addresses being numbered with a preselected distance between adjacent selected addresses, comprising the steps:

providing a switching network connected to said memory units, said switching network comprising
a first port set of consecutively numbered input ports,
a second port set of consecutively numbered output ports connected to said operational units and
a plurality of switching units connected between said input ports and said output ports;

establishing interval paths between said input ports and said output ports through said switching units by said control circuit;

selecting one port set of said first port set and said second port set, said one port set having a reference port and a predetermined port interval, by said control circuit;

connecting said reference port to ports of another port set of said first port set and said second port set by said switching units;

producing a control signal set based on said reference port and said predetermined port interval by said control circuit;

delivering said control signal set to said switching units independently of said input ports and said interval paths to simultaneously form said internal paths by said control circuit;

operating said switching network by synchronously indicating said input ports and said output ports by said control circuit; and subjecting said switching network to concentrated control by said control signal set produced by said control circuit.

21. The method as in claim 20, further comprising the steps:

inputting vector data elements to said input ports;

transferring said vector data elements to said memory through said switching network; and storing said vector data elements at addresses in said memory units at a predetermined element distance corresponding to said predetermined port interval to enable simultaneous access to said vector data elements stored in said memory units.

* * * * *